(12) United States Patent
Nishino et al.

(10) Patent No.: US 9,181,359 B2
(45) Date of Patent: Nov. 10, 2015

(54) METHOD OF PRODUCTION OF ETHYLENE-BASED POLYMER PARTICLES AND STRETCH-MOLDED ARTICLE OBTAINED FROM ETHYLENE-BASED POLYMER PARTICLES

(75) Inventors: Fumiaki Nishino, Ichihara (JP); Takeshi Karino, Ichihara (JP); Takayuki Onogi, Chiba (JP); Susumu Murata, Chiba (JP); Naoto Matsukawa, Ichihara (JP); Yasunori Yoshida, Ichihara (JP); Yasushi Nakayama, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 141 days.

(21) Appl. No.: 13/880,248

(22) PCT Filed: Jul. 15, 2011

(86) PCT No.: PCT/JP2011/066195
§ 371 (c)(1),
(2), (4) Date: Apr. 18, 2013

(87) PCT Pub. No.: WO2012/053261
PCT Pub. Date: Apr. 26, 2012

(65) Prior Publication Data
US 2013/0209805 A1  Aug. 15, 2013

(51) Int. Cl.
*C08F 4/50* (2006.01)
*C08F 4/52* (2006.01)
(Continued)

(52) U.S. Cl.
CPC . *C08F 4/76* (2013.01); *B29C 55/04* (2013.01); *C08F 10/00* (2013.01); *C08J 3/12* (2013.01);
(Continued)

(58) Field of Classification Search
CPC .......... C08F 4/50; C08F 4/52; C08F 4/60048
USPC ............. 526/124.3, 124.2, 124.1, 123.1, 172, 526/161, 160, 943
See application file for complete search history.

(56) References Cited

U.S. PATENT DOCUMENTS

| 4,990,640 A | 2/1991 | Tsutsui et al. |
| 5,070,051 A | 12/1991 | Masi et al. |

(Continued)

FOREIGN PATENT DOCUMENTS

| EP | 1829900 | 9/2007 |
| JP | 1-156347 A | 6/1989 |

(Continued)

OTHER PUBLICATIONS

Extended European Search Report issued on Jun. 3, 2014, by the European Patent Office, in corresponding European Patent Application No. 11834103.1 (5 pages).

(Continued)

*Primary Examiner* — Rip A Lee
(74) *Attorney, Agent, or Firm* — Buchanan, Ingersoll & Rooney PC

(57) ABSTRACT

A method of production of ethylene-based polymer particles includes the steps of: homopolymerizing ethylene or copolymerizing ethylene and a linear or branched α-olefin having 3 to 20 carbon atoms in the presence of an olefin polymerization catalyst including: (A) fine particles having an average particle diameter greater than or equal to 1 nm and less than or equal to 300 nm obtained at least by the following two steps: (Step 1) causing contact between a metal halide and an alcohol in a hydrocarbon solvent; (Step 2) causing contact between a component obtained by (Step 1) and an organoaluminum compound and/or an organoaluminumoxy compound; and (B) a transition metal compound represented in General Formula (I) or (II), and (E) an intrinsic viscosity [η] of the ethylene-based polymer particles, measured in decalin at 135° C., is from 5 to 50 dL/g.

9 Claims, 18 Drawing Sheets

(51) Int. Cl.

| | |
|---|---|
| *C08F 4/64* | (2006.01) |
| *C08F 4/76* | (2006.01) |
| *B29C 55/04* | (2006.01) |
| *C08F 10/00* | (2006.01) |
| *C08J 3/12* | (2006.01) |
| *B29K 23/00* | (2006.01) |

(52) U.S. Cl.
CPC .......... *B29K 2023/0666* (2013.01); *C08F 4/50* (2013.01); *C08F 4/52* (2013.01); *C08J 2323/04* (2013.01); *Y10T 428/2982* (2015.01)

(56) References Cited

U.S. PATENT DOCUMENTS

| | | | |
|---|---|---|---|
| 5,703,181 | A | 12/1997 | Tashiro et al. |
| 6,939,928 | B1 | 9/2005 | Kawai et al. |
| 7,253,132 | B2 * | 8/2007 | Nakayama et al. ........... 502/115 |
| 7,393,965 | B2 | 7/2008 | Tohi et al. |
| 7,449,533 | B2 | 11/2008 | Kawai et al. |
| 7,452,946 | B2 * | 11/2008 | Matsuura et al. ............ 526/114 |
| 7,601,423 | B2 | 10/2009 | Nakayama et al. |
| 2002/0055600 | A1 | 5/2002 | Fujita et al. |
| 2002/0115557 | A1 | 8/2002 | Fujita et al. |
| 2005/0124771 | A1 | 6/2005 | Fujita et al. |

FOREIGN PATENT DOCUMENTS

| | | |
|---|---|---|
| JP | 02-078687 A | 3/1990 |
| JP | 2-107605 A | 4/1990 |
| JP | 3-130116 A | 6/1991 |
| JP | 6-172434 | 6/1994 |
| JP | 7-156173 A | 6/1995 |
| JP | 9-254252 A | 9/1997 |
| JP | 11-315109 A | 11/1999 |
| JP | 2000-297114 A | 10/2000 |
| JP | 2005-029775 A | 2/2005 |
| JP | 2006-206768 A | 8/2006 |
| JP | 2006-274175 A | 10/2006 |
| WO | WO 01/27124 A1 | 4/2001 |
| WO | WO 2004/029062 A1 | 4/2004 |
| WO | WO 2009/007045 A1 | 1/2009 |
| WO | WO 2010/074073 A1 | 7/2010 |

OTHER PUBLICATIONS

Office Action issued on Jun. 3, 2014, by the Japanese Patent Office in corresponding Japanese Patent Application No. 2012-539629.(2 pages).

International Search Report (PCT/ISA/210) issued on Oct. 11, 2011, by the Japanese Patent Office as the International Searching Authority for International Application No. PCT/JP2011/066195.

* cited by examiner

METHOD OF PRODUCTION OF ETHYLENE-BASED POLYMER PARTICLES AND STRETCH-MOLDED ARTICLE OBTAINED FROM ETHYLENE-BASED POLYMER PARTICLES

TECHNICAL FIELD

The present invention relates to a production method capable of obtaining ultrahigh molecular weight ethylene-based polymer particles having excellent stretch moldability and further having excellent handleability industrially. Moreover, the present invention relates to a stretch-molded article produced using such particles and a stretch-molded article that is preferably produced by a solid-phase stretch-molding method.

BACKGROUND ART

So-called ultrahigh molecular weight ethylene-based polymers, which have extremely high molecular weight, are excellent in impact resistance, abrasion resistance, chemical resistance, strength and the like, as compared with general-purpose ethylene-based polymers, and thus have excellent characteristics as engineering plastics.

On the other hand, it is said that ultrahigh molecular weight ethylene-based polymers are not suitable for melt molding, which is a general resin molding method, because of their high molecular weight. For this reason, molding methods of ultrahigh molecular weight ethylene-based polymers have been developed such as a method in which an ultrahigh molecular weight ethylene-based polymer is dissolved in a solvent and molded, a solid-phase stretch-molding method in which the ultrahigh molecular weight ethylene-based polymer particles are stretched after compression-bonding at a temperature equal to or below the melting point of the polymer, and the like.

Patent Document 1 discloses that strength of the molded article molded by the solid-phase stretch-molding method using ultrahigh molecular weight polyethylene obtained using a post-metallocene catalyst described in Patent Document 2 ([3-t-Bu-2-O—$C_6H_3CH$=$N(C_6F_5)]_2TiCl_2$) becomes greater than or equal to 3 GPa. However, according to the polymerization method described in Patent Document 1, there is no use of a carrier, such as an inorganic solid component and the like, for support of the aforementioned catalyst component. Thus, during the polymerization reaction, it is anticipated that there will be the occurrence of the phenomenon of attachment of the polymer to the polymerization reactor walls, agitator blades, or the like, i.e. so-called fouling. It is therefore assumed that stable industrial production would be extremely difficult using the ethylene-based polymer production method described in Patent Document 1. Furthermore, a large amount of expensive organoaluminumoxy compound is required as a co-catalyst in order to exert high catalytic activity in this method. Thus a separate deashing step becomes necessary in order to remove the inorganic components contained in the polymer, and it is anticipated that cost will become extremely high during industrial production.

On the other hand, suppression of fouling in production of an ultrahigh molecular weight ethylene-based polymer is possible by use of a supported type catalyst such as a titanium-based supported type catalyst using a magnesium compound as a support as described in Patent Documents 3, 4, or the like, or, by use of a supported type catalyst in which a transition metal compound is supported on an inorganic solid component formed from $SiO_2$ treated with an organoaluminumoxy compound as described in Patent Document 5, or the like. Industrial production is known to be possible due to the ability to suppress fouling by the use of a supported type catalyst. However, a molded article with sufficient strength is not obtained using the ultrahigh molecular weight ethylene-based polymer particles produced using this type of supported type catalyst, even when the ultrahigh molecular weight ethylene-based polymer particles are solid-phase stretch-molded (Patent Document 6 or the like).

PATENT DOCUMENTS

Patent Document 1: WO2009/007045 Pamphlet
Patent Document 2: Japanese H11-315109A
Patent Document 3: Japanese H3-130116A
Patent Document 4: Japanese H7-156173A
Patent Document 5: Japanese 2000-297114A
Patent Document 6: Japanese H9-254252A

DISCLOSURE OF THE INVENTION

Problems to be Solved by the Invention

From the standpoint of the aforementioned background technology, the problem to be solved by the present invention is to provide a production method capable of obtaining ultrahigh molecular weight ethylene-based polymer particles having excellent stretch moldability and handleability industrially, and further capable of obtaining such particles inexpensively. A further problem of the present invention is to provide a stretch-molded article produced using such particles.

Means for Solving the Problem

As a result of investigations to solve the aforementioned problems, the present invention was accomplished by the inventors by discovery of a method of production of ethylene-based polymer particles in the presence of an olefin polymerization catalyst including a specific transition metal compound and fine particles obtained through a specific process. Furthermore, the Patent Documents 1 to 6 contain no mention of an example combining the transition metal compound and fine particles of the present invention, neither disclose or suggest that the ethylene-based polymer particles obtained using the olefin polymerization catalyst obtained by this combination are preferred for physical properties after stretch-molding.

That is to say, the method of production of the ethylene-based polymer particles of the present invention includes the step of:

homopolymerizing ethylene or copolymerizing ethylene and a linear or branched α-olefin having 3 to 20 carbon atoms in the presence of an olefin polymerization catalyst comprising:

(A) fine particles having an average particle diameter greater than or equal to 1 nm and less than or equal to 300 nm obtained by at least the following steps:

(Step 1) causing contact between a metal halide and an alcohol in a hydrocarbon solvent;

(Step 2) causing contact between a component obtained by (Step 1) and an organoaluminum compound and/or an organoaluminumoxy compound; and (B) a transition metal compound represented in following General Formula (I) or (II):

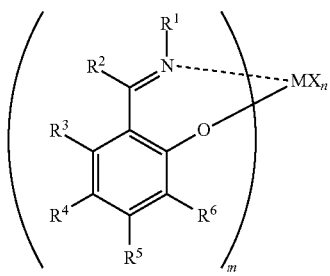

(I)

(in Formula (I), M is a transition metal atom of Group 4 or 5 in the periodic table;

m is an integer ranging from 1 to 4;

$R^1$ to $R^5$ are the same or different and are a hydrogen atom, halogen atom, hydrocarbon group, heterocyclic compound residue, oxygen-containing group, nitrogen-containing group, boron-containing group, sulfur-containing group, phosphorous-containing group, silicon-containing group, germanium-containing group, or tin-containing group, wherein a ring is optionally formed by bonding together of at least 2 such groups;

$R^6$ is selected from the group consisting of a hydrogen atom, hydrocarbon groups having 1 to 4 carbon atoms and composed of only primary or secondary carbon atoms, aliphatic hydrocarbon groups having at least 4 carbon atoms, aryl group-substituted alkyl groups, monocyclic or bicyclic alicyclic hydrocarbon groups, aromatic hydrocarbon groups, and halogen atoms;

n is a number satisfying valance number of M;

X is a hydrogen atom, halogen atom, hydrocarbon group, oxygen-containing group, sulfur-containing group, nitrogen-containing group, boron-containing group, aluminum-containing group, phosphorous-containing group, halogen-containing group, heterocyclic compound residue, silicon-containing group, germanium-containing group, or tin-containing group; where multiple groups indicated by X may be the same or different when n is greater than or equal to 2; and optionally multiple groups indicated by X form a ring by mutual bonding)

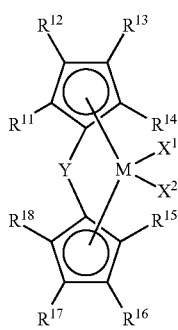

(II)

(in Formula (II), M is titanium, zirconium, or hafnium;

$R^{11}$ to $R^{18}$ may be the same or different and are a hydrogen atom, halogen atom, hydrocarbon group, heterocyclic compound residue, oxygen-containing group, nitrogen-containing group, boron-containing group, sulfur-containing group, phosphorous-containing group, silicon-containing group, germanium-containing group, or tin-containing group, wherein two or more adjacent groups may be optionally bonded together to form a ring;

$X^1$ and $X^2$ are the same or different and are a hydrocarbon group, oxygen-containing group, sulfur-containing group, silicon-containing group, hydrogen atom, or halogen atom; and Y is a divalent hydrocarbon group, divalent halogenated hydrocarbon group, divalent silicon-containing group, divalent germanium-containing group, divalent tin-containing group, —O—, —CO—, —S—, —SO—, —SO$_2$—, —Ge—, —Sn—, —NR—, —P(R)—, —P(O)(R)—, —BR—, or —AlR— [wherein R is the same or different and is a hydrogen atom, halogen atom, hydrocarbon group, halogenated hydrocarbon group, or alkoxy group]); and (E) an intrinsic viscosity [η] of the ethylene-based polymer particles, measured in decalin at 135° C., is from 5 to 50 dL/g.

In the present invention, the alcohol used in Step 1 in obtaining the (A) fine particles is preferably a combination of two types of alcohols selected from alcohols having 1 to 25 carbon atoms, and difference in carbon number of the two types of alcohols is preferably greater than or equal to 4. Moreover, these alcohols are preferably a combination of an alcohol having 2 to 12 carbon atoms and an alcohol having 13 to 25 carbon atoms, or alternatively, are a combination of two types of alcohols selected from alcohols having 2 to 12 carbon atoms.

In the present invention, for the (B) transition metal compound, M in General Formula (I) preferably is a transition metal atom of Group 4 in the periodic table; m preferably is 2; $R^1$ preferably is a group selected from linear or branched hydrocarbon groups having 1 to 20 carbon atoms, alicyclic hydrocarbon groups having 3 to 20 carbon atoms, and aromatic hydrocarbon groups having 6 to 20 carbon atoms; $R^2$ to $R^5$ may be the same or different and preferably are a hydrogen atom, halogen atom, or hydrocarbon group; $R^6$ preferably is selected from aliphatic hydrocarbon groups having at least 5 carbon atoms, aryl group-substituted alkyl groups, monocyclic or bicyclic alicyclic hydrocarbon groups, and aromatic hydrocarbon groups; and X preferably is a hydrogen atom, halogen atom, or hydrocarbon group.

In the present invention, the homopolymerization of ethylene, or the copolymerization of ethylene and a linear or branched α-olefin having 3 to 20 carbon atoms, is preferably performed in a multi-stage polymerization.

The ethylene-based polymer particles of the present invention are characterized by being obtained by the production method, and an average particle diameter of the ethylene-based polymer particles being within a range greater than or equal to 10 nm and less than 3,000 nm.

The method for production of a stretch-molded article according to the present invention is characterized by using ethylene-based polymer particles obtained by the production method.

In the present invention, the stretch-molded article is preferably obtained by a solid-phase stretch-molding method.

The stretch-molded article of the present invention is obtained by the production method for the stretch-molded article.

Effect of the Invention

By including the fine particles obtained via a specific process as an essential constituent component of the olefin polymerization catalyst, the method of production of ethylene-based polymer particles of the present invention can suppress fouling of the polymerization reactor walls, agitator blade, or the like by the ethylene-based polymer particles to the minimum degree, and is further capable of obtaining a molded article with high strength by stretch-molding the ethylene-based polymer particles obtained by this method. In this manner, the present invention balances to a high degree industrial advantage in the production of the ethylene-based polymer particles and superiority in physical properties of the ethylene-based polymer particles.

BEST MODE FOR CARRYING OUT THE INVENTION

Figure 1:
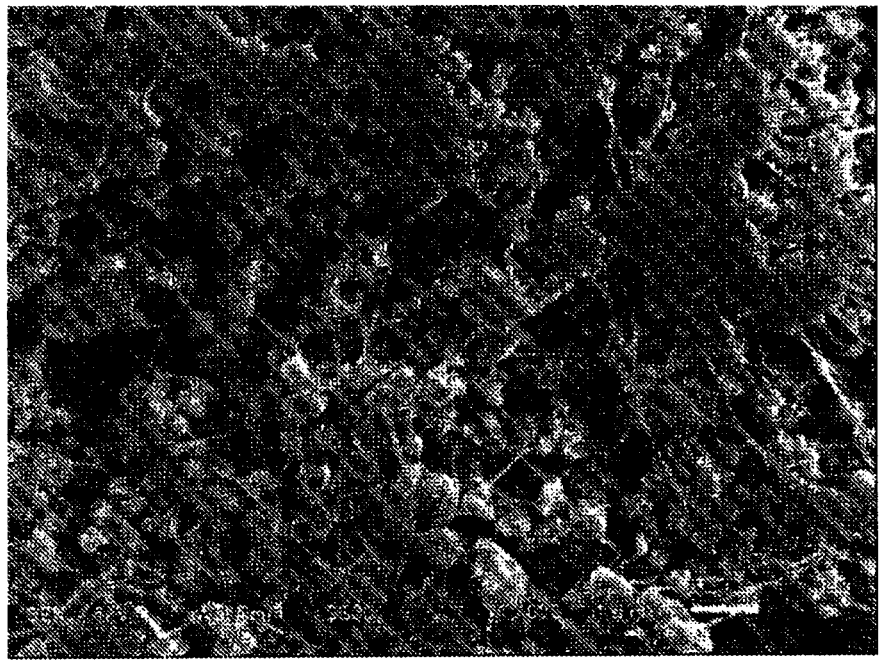
FIG. 1 is an SEM photograph of the ethylene polymer particles of Example 1.

The method of production of ethylene-based polymer particles according to the present invention, the ethylene-based polymer particles obtained by this production method, and the stretch-molded article manufactured from these ethylene-based polymer particles are explained below in further detail. The "ethylene-based polymer particles" of the present invention are taken to mean polymer particles having ethylene as a main component, and the "ethylene-based polymer particles" includes both ethylene homopolymer particles and ethylene/α-olefin copolymer particles.
<Olefin Polymerization Catalyst>
The olefin polymerization catalyst used for the method of production of ethylene-based polymer particles according to the present invention is characterized by including:
(A) fine particles obtained by a specific process and having an average particle diameter greater than or equal to 1 nm and less than or equal to 300 nm, and
(B) a transition metal compound represented in General Formula (I) or General Formula (II).
The (A) and (B) components, as well as other components capable of use as may be required, will be explained below in detail.
[(A) Fine Particles Having an Average Particle Diameter Greater than or Equal to 1 nm and Less than or Equal to 300 nm]
The fine particles used in the present invention and having an average particle diameter greater than or equal to 1 nm and less than or equal to 300 nm are obtained by at least the following two steps:
(Step 1) a step of causing contact between a metal halide and an alcohol in a hydrocarbon solvent, and (Step 2) a step of causing contact between the component obtained in (Step 1) and an organoaluminum compound and/or an organoaluminumoxy compound.

The details of each step and the compounds used in each step will be explained below.

Step 1

Step 1 is a step for causing contact between a metal halide and an alcohol in a hydrocarbon solvent and forming an alcohol complex of the metal halide in the liquid state.

Although no particular limitation is placed on the reaction conditions of Step 1 as long as these reaction conditions are normal for production of the metal halide in the liquid state, the reaction is normally performed under heating at atmospheric pressure or elevated pressure. If heating at atmospheric pressure is used, any temperature may be selected up to the boiling point of the utilized hydrocarbon solvent. If heating at elevated pressure is used, the temperature may be selected arbitrarily up to the boiling point of the utilized hydrocarbon solvent or alcohol under elevated pressure.

The metal halide and the alcohol can be brought into contact in the hydrocarbon solvent in Step 1 by normal stirring and mixing. Generally used and known agitators or the like may be used as the apparatus for stirring.

Metal Halide

Preferred examples of the metal halide used in the present invention include ionic bonded compounds having a $CdCl_2$ type or $CdI_2$ type layered crystal structure. Specific examples of compounds having a $CdCl_2$ type crystal structure include $CdCl_2$, $MnCl_2$, $FeCl_2$, $CoCl_2$, $NiI_2$, $NiCl_2$, $MgCl_2$, $ZnBr_2$, $CrCl_3$ or the like. Specific examples of compounds having a $CdI_2$ type crystal structure include $CdBr_2$, $FeBr_2$, $CoBr_2$, $NiBr_2$, $CdI_2$, $MgI_2$, $CaI_2$, $ZnI_2$, $PbI_2$, $MnI_2$, $FeI_2$, $CoI_2$, $Mg(OH)_2$, $Ca(OH)_2$, $Cd(OH)_2$, $Mn(OH)_2$, $Fe(OH)_2$, $CO(OH)_2$, $Ni(OH)_2$, $ZrS_4$, $SnS_4$, $TiS_4$, $PtS_4$ or the like.

Preferred compounds among such examples are $CdBr_2$, $FeBr_2$, $CoBr_2$, $NiBr_2$, $CdI_2$, $MgI_2$, $CaI_2$, $ZnI_2$, $PbI_2$, $MnI_2$, $FeI_2$, $CoI_2$, $CdCl_2$, $MnCl_2$, $FeCl_2$, $CoCl_2$, $NiI_2$, $NiCl_2$, $MgCl_2$, $ZnBr_2$. Further preferred examples are $MnCl_2$, $FeCl_2$, $CoCl_2$, $NiCl_2$, and $MgCl_2$. $MgCl_2$ is most preferred.

As long as the ionic bonded compound is included in the final catalyst, there is no need to use the ionic bonded compound itself. Thus, during preparation of the catalyst, it is permissible to use compounds capable of forming the ionic bonded compound and finally to cause the ionic bonded compound to be present in the catalyst. That is to say, it is permissible to use a compound that has neither a $CdCl_2$ type crystal structure nor a $CdI_2$ type crystal structure, during preparation of the catalyst to cause reaction by contact together of this compound and a halogen-containing compound or a hydroxyl-group containing compound, and to produce the ionic bonded compound finally in the obtained catalyst.

For example, in the case of forming $MgCl_2$ or $MgI_2$ and making this compound exist among the final catalyst components, it is possible to use magnesium compounds both having reducibility and having no reducibility as raw material. Magnesium compounds having reducibility are exemplified by the organomagnesium compounds represented in following formula.

$X_nMgR_{2-n}$ (in the formula; n satisfies $0 \leq n < 2$; R is a hydrogen atom or an alkyl group having 1 to 20 carbon atoms, an aryl group having 6 to 21 carbon atoms, or a cycloalkyl group having 5 to 20 carbon atoms, where two R may be the same or different when n is 0; and X is a halogen)

Specific examples of the organomagnesium compound having reducibility include dialkyl magnesium compounds such as dimethylmagnesium, diethylmagnesium, dipropylmagnesium, dibutylmagnesium, diamylmagnesium, dihexylmagnesium, didecylmagnesium, octylbutylmagnesium, ethylbutylmagnesium, and the like; alkyl magnesium halides such as ethylmagnesium chloride, propylmagnesium chloride, butylmagnesium chloride, hexylmagnesium chloride, amylmagnesium chloride, and the like; alkyl magnesium alkoxides such as butylethoxymagnesium, ethylbutoxymagnesium, octylbutoxymagnesium, or the like; as well as alkyl magnesium hydrides such as ethylmagnesium hydride, propylmagnesium hydride, butylmagnesium hydride, and the like.

Specific examples of the organomagnesium compound having no reducibility include alkoxymagnesium halides such as methoxymagnesium chloride, ethoxymagnesium chloride, isopropoxymagnesium chloride, butoxymagnesium chloride, octoxymagnesium chloride, and the like; aryloxymagnesium halides such as phenoxymagnesium chloride, methylphenoxymagnesium chloride, and the like; alkoxymagnesiums such as ethoxymagnesium, isopropoxymagnesium, butoxymagnesium, n-octoxymagnesium, 2-ethylhexoxymagnesium, and the like; aryloxymagnesiums such as diphenoxymagnesium, methylphenoxymagnesium, and the like; and carboxylic acid salts of magnesium such as magnesium laurate, magnesium stearate, and the like.

Other magnesium metal, magnesium hydride, or the like also can be used. Such magnesium compounds having no reducibility may be compounds derived from the aforementioned magnesium compounds having reducibility or may be compounds derived during the preparation of the catalyst. In order to derive the magnesium compound having no reducibility from the magnesium compound having reducibility, for example, the magnesium compound having reducibility may be contacted with a polysiloxane compound, halogen-containing silane compound, halogen-containing aluminum compound, ester, alcohol, halogen-containing compound, or a compound having an OH group or an active carbon-oxygen bond.

The magnesium compounds having reducibility and magnesium compounds having no reducibility may form complex compounds or double compounds together with organometallic compounds of other metals such as aluminum, zinc, boron, beryllium, sodium, potassium, and the like, or may be mixed with these organometallic compounds. Furthermore, the magnesium compound may be used singly or in combination of two or more kinds. Moreover, the magnesium compound may be used in the liquid state or solid state. When the magnesium compound having reducibility or magnesium compound having no reducibility is a solid, the magnesium compound is preferably dissolved using the below described alcohol.

Alcohol

The alcohol used in the present invention is exemplified by alcohols having 1 to 25 carbon atoms. Specific examples of the alcohols include alcohols having 1 to 25 carbon atoms, such as methanol, ethanol, propanol, butanol, pentanol, hexanol, 2-ethylhexanol, octanol, dodecanol, octadecyl alcohol, oleyl alcohol, 2-butyloctanol, 2-hexyldecanol, 2-hexyldodecanol, 2-octyldecanol, 2-octyldodecanol, isohexadecanol, isoeicosanol, benzyl alcohol, phenylethyl alcohol, cumyl alcohol, isopropyl alcohol, isobutyl alcohol, and isopropylbenzyl alcohol; halogen-containing alcohols having 1 to 25 carbon atoms, such as trichloromethanol, trichloroethanol, and trichlorohexanol; phenols having 6 to 25 carbon atoms and optionally having a lower alkyl group, such as phenol, cresol, xylenol, ethyl phenol, propyl phenol, nonyl phenol, cumyl phenol, and naphthol.

Such alcohols may be used singly or in combination of two or more kinds. From the below described standpoint, a mixture of two kinds of alcohols is preferably used.

The two kinds of alcohols are classified according to differences of reactivity with the alcohol complex of the metal halide in which the alcohol is included, and the below described organoaluminum compound and/or organoaluminumoxy compound. The following is inferred as the reason for preferred use of the combination of such two types of alcohols.

For the alcohol complex of the metal halide obtained from the alcohol having high reactivity with the organoaluminum compound and/or organoaluminumoxy compound, the alcohol is extracted from the alcohol complex of the metal halide due to contact and reaction with the organoaluminum compound and/or organoaluminumoxy compound, and it is possible to rapidly generate a parts that form the nuclei of the fine particle of metal halide.

On the other hand, for the alcohol complex of the metal halide obtained from the alcohol having relatively low reactivity with the organoaluminum compound and/or organoaluminumoxy compound, after formation of the parts that form the nuclei of the fine particles, the alcohol is extracted from the alcohol complex of the metal halide, the metal halide precipitates to the outside of the nuclei of the fine particles, and it is thought that fine particles are formed that have an average particle diameter as defined for the (A) component of the present invention.

It is thus possible to anticipate a small diameter and narrow particle size distribution for the fine particles that are the (A) component of the present invention, and it may be assumed that there will be little contamination of extremely fine particles, such as byproduct particles having the particle size of the nuclei.

The below described ethylene-based polymer particles are quite readily affected by the particle diameter of these fine particles, and thus if the fine particles that are the (A) component of the present invention are used as a constituent element of the olefin polymerization catalyst, it is thought that generation of irregularly shaped ethylene-based polymer particles be difficult, and fouling of the reactor or the like does not occur easily even when the polymer particles are nano-sized.

It is possible to assume that the differences in the reactivity of the alcohol with the organoaluminum compound and/or organoaluminumoxy compound are attributed to differences in the molecular structure of the alcohol as represented in (i) to (iv):

(i) differences between linear and branching structures,
(ii) differences among aliphatic, alicyclic, and aromatic structures,
(iii) differences in the number of carbon atoms, and
(iv) a combination of the (i) to (iii).

Among these differences, for example, if the (iii) difference in the number of carbon atoms is indicated using the number of carbon atoms of R where the alcohol is represented as R—OH, it is possible to distinguish between alcohols having a relatively low number of carbon atoms and alcohols having a relatively large number of carbon atoms. In this case, the alcohols having a relatively low number of carbon atoms generally have high reactivity with the organoaluminum compound and/or organoaluminumoxy compound. On the other hand, the alcohols having a relatively large number of carbon atoms correspond to alcohols having low reactivity with the organoaluminum compound and/or organoaluminumoxy compound.

According to the classification based on the number of carbon atoms, in an embodiment, alcohols having a relatively low number of carbon atoms may be recognized as alcohols having a relatively large number of carbon atoms, depending on the kind of the other alcohols. For example, in the case of using 2-ethylhexanol, when 2-octyldodecanol is used as the other alcohol, the 2-ethylhexanol corresponds to an alcohol having a relatively low number of carbon atoms. When isobutyl alcohol is used as the other alcohol, the 2-ethylhexanol corresponds to an alcohol having a relatively large number of carbon atoms. Since this classification is focused just on reactivity, no problems arise even if a single kind of alcohol is classified as either classification.

Here, when the two kinds of alcohols are used in a combination, upon consideration of the effects that occur from the standpoint of the reactivity, the difference in carbon number between these two kinds of alcohols is preferably greater than or equal to 4.

Specific examples of combinations of alcohols include a combination of an alcohol having 2 to 12 carbon atoms and an alcohol having 13 to 25 carbon atoms, a combination of two kinds of alcohols having 2 to 12 carbon atoms, or the like.

Here, the alcohol having 2 to 12 carbon atoms is preferably an alcohol having 2 to 10 carbon atoms, and is particularly preferably selected from ethanol, propanol, butanol, pentanol, hexanol, 2-ethylhexanol, heptanol, and octanol.

Moreover, the alcohol having 13 to 25 carbon atoms is preferably an alcohol having 15 to 25 carbon atoms. Alcohols having 16 to 25 carbon atoms are further preferred, and particularly preferred alcohols are selected from 2-hexyldecanol, 2-hexyldodecanol, 2-octyldecanol, 2-octyldodecanol, isohexadecanol, isoeicosanol, octadecyl alcohol, and oleyl alcohol.

When an alcohol having a relatively large number of carbon atoms, such as the alcohol having 13 to 25 carbon atoms, is present in the olefin polymerization catalyst, it is possible to anticipate that the ethylene polymerization reaction will proceed mildly and that localization of heat generation during the polymerization will be suppressed. The suppression of localization of heat generation during polymerization is thought to be related to the suppression of entanglement of the generated polymer chains, and as a result, performance of the stretch-molded article, such as solid-phase stretch-molded article, can be improved.

No particular limitation is placed on the amount of alcohol used to make the metal halide in a liquid state as long as the amount dissolves the metal halide. However, the amount of the alcohol per 1 mol of metal halide is 0.1 to 50 mol, preferably is 0.5 to 30 mol, more preferably is 1 to 20 mol, and further preferably is 2 to 15 mol. When a mixture of two kinds of alcohol are used as in the preferred embodiment, as long as the amount of alcohol dissolves the metal halide, no particular limitation is placed on the ratio of the alcohol having a relatively low number of carbon atoms and the ratio of the alcohol having a relatively large number of carbon atoms. However, the lower limit of the ratio of the alcohol having a relatively large number of carbon atoms is 10 mol %, preferably is 20 mol %, and further preferably is 30 mol %, and the upper limit of the ratio is 95 mol %, preferably is 90 mol %, and further preferably is 85 mol %.

Hydrocarbon Solvent

No particular limitation is placed on the hydrocarbon solvent used in the present invention. Specific examples include aliphatic hydrocarbons such as hexane, heptane, octane, decane, dodecane, kerosene, and the like; alicyclic hydrocarbons such as cyclopentane, cyclohexane, methylcyclopentane, and the like; aromatic hydrocarbons such as benzene, toluene, xylene, and the like; halogenated hydrocarbons such as ethylene chloride, chlorobenzene, dichloromethane, and the like; and a mixture thereof.

Of these, from the standpoints of solubility and reaction temperature, use of decane, dodecane, toluene, xylene, and chlorobenzene is preferred.

No particular limitation is placed on the amount of the hydrocarbon solvent used to make the metal halide in a liquid state as long as the amount dissolves the metal halide. However, the amount of the hydrocarbon solvent per 1 mol of the metal halide is preferably 0.1 to 100 mol, more preferably is 0.2 to 50 mol, further preferably is 0.3 to 40 mol, and most preferably is 0.5 to 30 mol.

Step 2

In Step 2, the organoaluminum compound and/or organoaluminumoxy compound are contacted with alcohol complex of the metal halide in the liquid state obtained during Step 1, the dissolved metal halide is precipitated out, and fine particles are produced.

Step 2 is performed under normal reaction conditions for precipitation of a dissolved metal halide. However, this precipitation is preferably performed at a temperature of −50 to 200° C., more preferably at a temperature of −20 to 150° C., and most preferably at a temperature of 0 to 120° C.

Moreover, in the Step 2, the organoaluminum compound and/or organoaluminumoxy compound is added to the solution while mixing and stirring solution within a reactor. Stirring and mixing may be performed under normal stirring conditions, although high speed stirring-mixing may be required.

The apparatus used for high-speed stirring is not particularly limited as long as the apparatus is a general commercial emulsifier or disperser, as exemplified by: batch emulsifiers such as Ultra-Turrax (IKA Works), Polytron (Kinematica, Inc.), TK Autohomomixer (Tokushu Kika Kogyo Co., Ltd.), National Cooking Mixer (Matsushita Electric Industrial Co., Ltd.), and the like; continuous emulsifiers such as Ebara Milder (Ebara Corp.), TK Pipeline Homo Mixer, TK Homomic Line Flow (Tokushu Kika Kogyo Co., Ltd.), Colloid Mill (Nippon Seiki Co., Ltd.), Thrasher, Trigonal Wet Pulverizer (Mitsui Miike Chemical Engineering Machinery), Cavitron (Eurotech Company), Fine Flow Mill (Pacific Machinery & Engineering Co., Ltd.), and the like; batch or continuous dual-mode emulsifiers such as CLEARMIX (M Technique Co., Ltd.), Filmix (Tokushu Kika Kogyo Co., Ltd.), and the like; high pressure emulsifiers such as Microfluidizer (Mizuho Industrial Co., Ltd.), Nanomaker, Nanomizer (Nanomizer Inc.), APV Gaulin (Gaulin), and the like; membrane emulsifiers such as Membrane Emulsifier (Reika Kogyo Co., Ltd.) and the like; vibrating emulsifiers such as Vibromixer (Reika Kogyo Co., Ltd.) and the like; and ultrasonic emulsifiers such as Ultrasonic Homogenizer (Branson) and the like; and the like. When high speed stirring-mixing is performed, the stirring speed is preferably greater than or equal to 5,000 rpm.

Organoaluminum Compound

The organoaluminum compound capable of use in the present invention is exemplified by the compounds represented in following Formulae (Al-1), (Al-2), and (Al-3).

$$R^a{}_n AlX_{3-n} \tag{Al-1}$$

(in Formula (Al-1), $R^a$ is a hydrocarbon group having 1 to 12 carbon atoms; X is a halogen atom or hydrogen atom; and n ranges from 1 to 3)

Examples of the hydrocarbon group having 1 to 12 carbon atoms include alkyl groups, cycloalkyl groups, and aryl groups. Specific examples of the hydrocarbon group include the methyl group, ethyl group, n-propyl group, isopropyl group, isobutyl group, pentyl group, hexyl group, octyl group, cyclopentyl group, cyclohexyl group, phenyl group, tolyl group, or the like.

Specific examples of this type of organoaluminum compound include following compounds: trialkyl aluminum compounds such as trimethylaluminum, triethylaluminum, triisopropylaluminum, triisobutylaluminum, trioctylaluminum, tri-2-ethylhexylaluminum, and the like; alkenyl aluminum compounds such as isoprenylaluminum and the like; dialkyl aluminum halides such as dimethylaluminum chloride, diethylaluminum chloride, diisopropylaluminum chloride, diisobutylaluminum chloride, dimethylaluminum bromide, and the like; alkyl aluminum sesquihalides such as methylaluminum sesquichloride, ethylaluminum sesquichloride, isopropylaluminum sesquichloride, butylaluminum sesquichloride, ethylaluminum sesquibromide, and the like; alkyl aluminum dihalides such as methylaluminum dichloride, ethylaluminum dichloride, isopropylaluminum dichloride, ethylaluminum dibromide, and the like; and alkyl aluminum hydrides such as diethylaluminum hydrides, diisobutylaluminum hydrides, or the like.

Moreover, an organoaluminum compound represented in following formula may be used.

$$R^a{}_n AlY_{3-n} \tag{Al-2}$$

(in Formula (Al-2), $R^a$ has the same meaning as that of Formula (Al-1); Y is an —$OR^b$ group, —$OSiR^c{}_3$ group, —$OAlR^d{}_2$ group, —$NR^e{}_2$ group, —$SiR^f{}_3$ group, or —$N(R^g)AlR^h{}_2$ group; n is 1 to 2; $R^b$, $R^c$, $R^d$ and $R^h$ are a methyl group, ethyl group, isopropyl group, isobutyl group, cyclohexyl group, phenyl group, or the like; $R^e$ is a hydrogen, methyl group, ethyl group, isopropyl group, phenyl group, trimethylsilyl group, or the like; and $R^f$ and $R^g$ are a methyl group, ethyl group, or the like.)

Specific examples of the organoaluminum compound represented in Formula (Al-2) include following compounds:

(i) compounds represented by formula: $R^a{}_n Al(OR^b)_{3-n}$, as exemplified by alkyl aluminum alkoxides such as dimethylaluminum methoxide, diethylaluminum ethoxide, diisobutylaluminum methoxide, diethylaluminum-2-ethylhexoxide, and the like;

(ii) compounds represented by formula: $R^a{}_n Al(OSiR^c{}_3)_{3-n}$, as exemplified by $Et_2Al(OSiMe_3)$, $(iso-Bu)_2Al(OSiMe_3)$, $(iso-Bu)_2Al(OSiEt_3)$ or the like;

(iii) compounds represented by formula: $R^a{}_n Al(OAlR^d{}_2)_{3-n}$, as exemplified by $Et_2AlOAlEt_2$, $(iso-Bu)_2AlOAl(iso-Bu)_2$ or the like;

(iv) compounds represented by formula: $R^a{}_n Al(NR^e{}_2)_{3-n}$, as exemplified by $Me_2AlNEt_2$, $Et_2AlNHMe$, $Me_2AlNHEt$, $Et_2AlN(Me_3Si)_2$, $(iso-Bu)_2AlN(Me_3Si)_2$ or the like;

(v) compounds represented by formula: $R^a{}_n Al(SiR^f{}_3)_{3-n}$, as exemplified by $(iso-Bu)_2AlSiMe_3$ or the like; and (vi) compounds represented by formula: $R^a{}_n Al[N(R^g)—AlR^h{}_2]_{3-n}$, as exemplified by $Et_2AlN(Me)-AlEt_2$, $(iso-Bu)_2AlN(Et)Al(iso-Bu)_2$ or the like.

It is further possible to use as the organoaluminum compound a compound represented in following Formula (Al-3), which is an alkyl complex compound of aluminum and a Group I metal.

$$M^1 AlR^j{}_4 \tag{Al-3}$$

(in Formula (Al-3), $M^1$ is Li, Na, or K; and $R^j$ is a hydrocarbon group having 1 to 15 carbon atoms)

Examples thereof include $LiAl(C_2H_5)_4$ and $LiAl(C_7H_{15})_4$ or the like.

Among the aforementioned organoaluminum compounds, trimethylaluminum, triethylaluminum, triisobutylaluminum, trihexylaluminum, trioctylaluminum, diethylaluminum chloride, ethylaluminum sesquichloride, ethylaluminum dichloride, and diisobutylaluminum hydride are particularly preferred.

During precipitation of the dissolved metal halide and production of the fine particles, the utilized amount of the organoaluminum compound per 1 mol of the metal halide is preferably 0.1 to 50 mol, further preferably is 0.2 to 30 mol, more preferably is 0.5 to 20 mol, and most preferably is 1.0 to 10 mol.

Organoaluminumoxy Compound

The organoaluminumoxy compound used in the present invention may be any previously known aluminoxane, or may be a benzene-insoluble organoaluminumoxy compound such as that disclosed in Japanese H2-78687. Specific examples of the organoaluminumoxy compound include methylaluminoxane, ethylaluminoxane, isobutylaluminoxane, or the like.

For example, conventional aluminoxane can be prepared by the following processes, and is generally obtained as a solution in a hydrocarbon solvent.

(1) An organoaluminum compound such as trialkylaluminum is added to a hydrocarbon medium suspension of a compound containing absorbed water or a salt containing water of crystallization, e.g., magnesium chloride hydrate, copper sulfate hydrate, aluminum sulfate hydrate, nickel sulfate hydrate or cerous chloride hydrate, to allow the organoaluminum compound to react with the absorbed water or the water of crystallization.

(2) Water, ice or water vapor is allowed to react directly with an organoaluminum compound such as trialkylaluminum in a medium such as benzene, toluene, ethyl ether or tetrahydrofuran.

(3) An organotin oxide such as dimethyltin oxide or dibutyltin oxide is allowed to react with an organoaluminum compound such as trialkylaluminum in a medium such as decane, benzene or toluene.

The aluminoxane may contain a small amount of an organometallic component. Further, it is possible that the solvent or the unreacted organoaluminum compound is distilled off from the recovered solution of aluminoxane and the remainder is redissolved in a solvent or suspended in a poor solvent for aluminoxane.

Specific examples of the organoaluminum compounds used in the preparation of aluminoxanes include the organoaluminum compounds described above for the organoaluminum compounds.

Of these, trialkylaluminums and tricycloalkylaluminums are preferable, and trimethylaluminum is particularly preferable.

The organoaluminum compounds are used singly, or two or more kinds are used in combination.

Examples of the solvents used in the preparation of aluminoxanes include aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cyclohexane, cyclooctane and methylcyclopentane; petroleum fractions such as gasoline, kerosine and light oil; and halides such as chlorides and bromides of these aromatic, aliphatic and alicyclic hydrocarbons. Ethers such as ethyl ether and tetrahydrofuran are also employable. Of the solvents, the aromatic hydrocarbons or the aliphatic hydrocarbons are particularly preferable.

In the benzene-insoluble organoaluminumoxy compound used in the present invention, the content of the Al component that is soluble in benzene at 60° C. is usually less than or equal to 10%, preferably is less than or equal to 5%, and particularly preferably is less than or equal to 2%, in terms of Al atom. That is, the benzene-insoluble organoaluminumoxy compound is preferably insoluble or hardly soluble in benzene.

The organoaluminumoxy compound employable in the present invention is, for example, an organoaluminumoxy compound containing boron and represented in following General Formula (III).

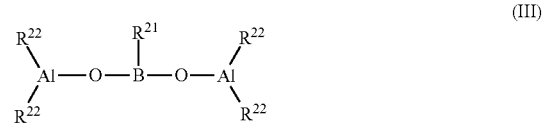
(III)

(in General Formula (III), $R^{21}$ is a hydrocarbon group having 1 to 10 carbon atoms; four $R^{22}$ groups may be the same or different and are a hydrogen atom, halogen atom, or hydrocarbon group having 1 to 10 carbon atoms)

The boron-containing organoaluminumoxy compounds represented by General Formula (III) can be prepared by allowing an alkylboronic acid represented by following General Formula (IV) to react with an organoaluminum compound under an inert gas atmosphere in an inert solvent for 1 minute to 24 hours at a temperature of −80° C. to room temperature.

(IV)

(in General Formula (IV), $R^{22}$ is the same group as $R^{22}$ in General Formula (III))

Specific examples of the alkylboronic acids represented in General Formula (IV) include methylboronic acid, ethylboronic acid, isopropylboronic acid, n-propylboronic acid, n-butylboronic acid, isobutylboronic acid, n-hexylboronic acid, cyclohexylboronic acid, phenylboronic acid, 3,5-difluorophenylboronic acid, pentafluorophenylboronic acid and 3,5-bis(trifluoromethyl)phenylboronic acid. Of these, methylboronic acid, n-butylboronic acid, isobutylboronic acid, 3,5-difluorophenylboronic acid and pentafluorophenylboronic acid are preferable. These are employed singly or in combination of two or more kinds.

Specific examples of the organoaluminum compounds to be reacted with the alkylboronic acids include the organoaluminum compounds described above for the organoaluminum compounds. The organoaluminum compound is preferably trialkyl aluminum or tricycloalkyl aluminum, and particularly preferably is trimethylaluminum, triethylaluminum, or triisobutylaluminum. These are employed singly or in combination of two or more kinds.

The organoaluminumoxy compounds mentioned above are used singly, or two or more kinds are used in combination.

During precipitation of the dissolved metal halide and production of the fine particles, the utilized amount of the organoaluminumoxy compound per 1 mol of the metal halide is preferably 0.1 to 50 mol, further preferably is 0.2 to 30 mol, more preferably is 0.5 to 20 mol, and most preferably is 1.0 to 10 mol.

Furthermore, the amount of the organoaluminumoxy compound used when causing precipitation of the metal halide is a small amount in comparison to the amount of organoaluminoxy compound used as a co-catalyst as described in Patent Document 1.

Fine Particles

The fine particles having undergone at least the Step 1 and Step 2 have an average particle diameter, as measured by the dynamic light scattering method, of greater than or equal to 1 nm and less than or equal to 300 nm, preferably is greater than or equal to 1 nm and less than or equal to 250 nm, more preferably is greater than or equal to 1 nm and less than or equal to 200 nm, further preferably is greater than or equal to 1 nm and less than or equal to 150 nm, yet further preferably is greater than or equal to 1 nm and less than or equal to 100 nm, and most preferably is greater than or equal to 1 nm and less than or equal to 50 nm.

Reasons that may be considered for the use of fine particles having this type of size are listed below. Due to the specific surface area of the support becoming large by using the fine particles as a support for the catalyst, when the below described (B) transition metal compound is supported, the distance between the active sites of the generated ethylene polymerization becomes long. When the distance between active sites becomes long in this manner, the generated heat around the active sites decreases, the crystallization temperature of the generated ethylene-based polymer becomes low, and the lamellar thickness decreases. Moreover, it becomes possible to decrease the entanglement of the polymer chains of the generated ethylene-based polymer. Due to such characteristics, when the fine particles of the present invention are used as a catalyst support, the crystal portion of the obtained ethylene-based polymer particles readily breaks down during stretching, and thus stretchability becomes high. As a result, the degree of orientation becomes high, and it is anticipated that high strength will be realized.

By using fine particles having this type of size as the catalyst support, due to specific surface area of the support becoming high in the above described manner, if distance between active sites is secured in the same manner as for the conventional support, it is possible to increase the amount of transition metal compound supported per support particle and to increase the olefin polymerization activity per unit of catalyst mass. Moreover, the monomer diffuses well during the polymerization. Moreover, if the below described (C) compound forming an ion pair by reaction with the transition metal compound or the (D) organoaluminoxy compound is used as a component of the olefin polymerization catalyst, active sites are thought to be formed efficiently due to high probability of contact between these compounds and the (B) transition metal compound supported on the support. Based on such characteristics, it is anticipated to be possible to improve catalytic activity by using the fine particles of the present invention as the support for the catalyst.

[(B) Transition Metal Compound]

As long as it is possible to realize the below described intrinsic viscosity, crystallinity, or the like of the ethylene-based polymer particles, the transition metal compound used in the present invention may be any transition metal compound without limitation, such as a known metallocene compound or a so-called post-metallocene or the like specific organo-transition metal complex compound.

The organo-transition metal complex described in Patent Document 2 (i.e. so-called organo-transition metal complex having a phenoxy-imine ligand) is preferred as the (B) transition metal compound included in the olefin polymerization catalyst in the present invention. Specifically, preferred embodiments of the organo-transition metal complex are exemplified by organo-transition metal complexes having a structural formula such as that represented in following General Formula (I).

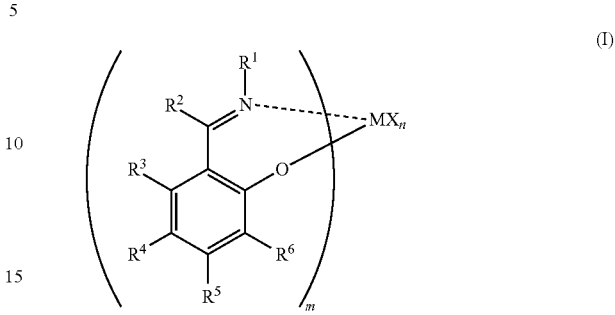

In General Formula (I), M is a transition metal atom of Group 4 or 5 in the periodic table and preferably is a transition metal atom of Group 4. Specific examples of the transition metal atom are titanium, zirconium, hafnium, vanadium, niobium, tantalum, or the like. Further preferred examples are titanium, zirconium, and hafnium. Particularly preferred examples are titanium and zirconium.

The dotted line between N and M in General Formula (I) indicates that N is generally coordinated on M, although coordination is optional in the present invention.

In General Formula (I), m is an integer from 1 to 4, preferably an integer from 2 to 4, and further preferably 2.

In General Formula (I), $R^1$ to $R^5$ may be the same or different and are a hydrogen atom, halogen atom, hydrocarbon group, heterocyclic compound residue, oxygen-containing group, nitrogen-containing group, boron-containing group, sulfur-containing group, phosphorous-containing group, silicon-containing group, germanium-containing group, or tin-containing group, where two or more such groups may be bonded together to form a ring.

Examples of the halogen atom include fluorine, chlorine, bromine, and iodine.

The hydrocarbon group is exemplified by linear or branched aliphatic hydrocarbon groups having 1 to 30 carbon atoms, cyclic hydrocarbon groups having 3 to 30 carbon atoms, and aromatic hydrocarbon groups having 6 to 30 carbon atoms. Specific examples include: linear or branched alkyl groups having 1 to 30 carbon atoms, preferably having 1 to 20 carbon atoms, and further preferably having 1 to 10 carbon atoms, such as a methyl group, ethyl group, n-propyl group, isopropyl group, n-butyl group, isobutyl group, sec-butyl group, t-butyl group, neopentyl group, n-hexyl group and the like;

linear or branched alkenyl groups having 2 to 30 carbon atoms and preferably having 2 to 20 carbon atoms, such as a vinyl group, allyl group, isopropenyl group, and the like;

linear or branched alkynyl groups having 2 to 30 carbon atoms, preferably having 2 to 20 carbon atoms, and further preferably having 2 to 10 carbon atoms, such as an ethynyl group, propargyl group, and the like;

cyclic saturated hydrocarbon groups having 3 to 30 carbon atoms, preferably having 3 to 20 carbon atoms, and further preferably having 3 to 10 carbon atoms, such as a cyclopropyl group, cyclobutyl group, cyclopentyl group, cyclohexyl group, cycloheptyl group, adamantyl group, and the like;

cyclic unsaturated hydrocarbon groups having 5 to 30 carbon atoms, such as a cyclopentadienyl group, indenyl group, fluorenyl group, and the like;

aryl groups having 6 to 30 carbon atoms, preferably having 6 to 20 carbon atoms, and further preferably having 6 to 10 carbon atoms, such as a phenyl group, naphthyl group, biphenyl group, terphenyl group, phenanthryl group, anthracenyl group, and the like; and alkyl-substituted aryl groups, such as a tolyl group, isopropylphenyl group, t-butylphenyl group, dimethylphenyl group, di-t-butylphenyl group, and the like.

In the hydrocarbon group, a hydrogen atom may be substituted with halogen atoms, as exemplified by halogenated hydrocarbon groups of 1 to 30 carbon atoms, and preferably 1 to 20 carbon atoms, such as a trifluoromethyl group, pentafluorophenyl group, chlorophenyl group, and the like.

The hydrocarbon group may also be substituted with another hydrocarbon group. Examples of such hydrocarbon groups substituted by a hydrocarbon group include aryl-substituted alkyl groups such as the benzyl group, cumyl group, and the like.

The hydrocarbon group may optionally include: heterocyclic compound residues;

oxygen-containing groups such as an alkoxy group, aryloxy group, ester group, ether group, acyl group, carboxyl group, carbonate group, hydroxy group, peroxy group, carboxylic acid anhydride group, and the like;

nitrogen-containing groups such as an amino group, imino group, amide group, imide group, hydrazino group, hydrazono group, nitro group, nitroso group, cyano group, isocyano group, cyanic acid ester group, amidino group, diazo group, ammonium salts of amino group, and the like;

boron-containing groups such as a boranediyl group, boranetriyl group, diboranyl group, and the like;

sulfur-containing groups such as a mercapto group, thioester group, dithioester group, alkylthio group, arylthio group, thioacyl group, thioether group, thiocyanic acid ester group, isothiocyanic acid ester group, sulfonic ester group, sulfonic amide group, thiocarboxyl group, dithiocarboxyl group, sulfo group, sulfonyl group, sulfinyl group, sulfenyl group, and the like;

phosphorus-containing groups such as a phosphide group, phosphoryl group, thiophosphoryl group, phosphato group, and the like;

silicon-containing groups; germanium-containing groups; and tin-containing groups.

Examples of the heterocyclic compound residue include residues of nitrogen-containing compounds such as pyrrole, pyridine, pyrimidine, quinoline and triazine, oxygen-containing compounds such as furan and pyran, and sulfur-containing compounds such as thiophene; and groups in which these heterocyclic compound residues are further substituted with substituents such as alkyl groups and alkoxy groups having 1 to 30 carbon atoms, and preferably 1 to 20 carbon atoms.

Examples of the silicon-containing groups include a silyl group, siloxy group, hydrocarbon-substituted silyl groups, hydrocarbon-substituted siloxy groups, and the like. Further specific examples include a methylsilyl group, dimethylsilyl group, trimethylsilyl group, ethylsilyl group, diethylsilyl group, triethylsilyl group, diphenylmethylsilyl group, triphenylsilyl group, dimethylphenylsilyl group, dimethyl-t-butylsilyl group, dimethyl(pentafluorophenyl)silyl group, and the like. Preferred groups among these examples include the methylsilyl group, dimethylsilyl group, trimethylsilyl group, ethylsilyl group, diethylsilyl group, triethylsilyl group, dimethylphenylsilyl group, triphenylsilyl group, and the like. Particularly preferred groups among these examples include the trimethylsilyl group, triethylsilyl group, triphenylsilyl group, and dimethylphenylsilyl group. The trimethylsiloxy group or the like may be exemplified as a specific example of the above-described hydrocarbon-substituted siloxy group.

The germanium-containing groups and the tin-containing groups include the above-mentioned silicon-containing groups in which silicon is replaced with germanium or tin, respectively.

Among the groups optionally included in the hydrocarbon group, specific examples of the alkoxy group include a methoxy group, ethoxy group, n-propoxy group, isopropoxy group, n-butoxy group, isobutoxy group, t-butoxy group, or the like.

Specific examples of the aryloxy groups include a phenoxy group, 2,6-dimethylphenoxy group, 2,4,6-trimethylphenoxy group, or the like.

Specific examples of the ester groups include an acetyloxy group, benzoyloxy group, methoxycarbonyl group, phenoxycarbonyl group, p-chlorophenoxycarbonyl group, or the like.

Specific examples of the acyl groups include a formyl group, acyl group, benzoyl group, p-chlorobenzoyl group, p-methoxybenzoyl group, or the like.

Specific examples of the amino group include a dimethylamino group, ethylmethylamino group, diphenylamino group, or the like.

Specific examples of the imino group include a methylimino group, ethylimino group, propylimino group, butylimino group, phenylimino group, or the like.

Specific examples of the amide group include an acetamide group, N-methylacetamide group, N-methylbenzamide group, or the like.

Specific examples of the imide group include an acetimide group, benzimide group, or the like.

Specific examples of the thioester group include an acetylthio group, benzoylthio group, methylthiocarbonyl group, phenylthiocarbonyl group, or the like.

Specific examples of the alkylthio group include a methylthio group, ethylthio group, or the like.

Specific examples of the arylthio group include a phenylthio group, methylphenylthio group, naphthylthio group, or the like.

Specific examples of the sulfoester group include a methyl sulfonate group, ethyl sulfonate group, phenyl sulfonate group, or the like.

Specific examples of the sulfonamide group include a phenylsulfonamide group, N-methylsulfonamide group, N-methyl-p-toluenesulfonamide group, or the like.

Particularly preferred examples of the hydrocarbon group are: linear or branched alkyl groups having 1 to 30 carbon atoms, preferably 1 to 20 carbon atoms, such as a methyl group, ethyl group, n-propyl group, isopropyl group, n-butyl group, isobutyl group, sec-butyl group, t-butyl group, neopentyl group, n-hexyl group, and the like;

aryl groups having 6 to 30 carbon atoms, preferably 6 to 20 carbon atoms, such as a phenyl group, naphthyl group, biphenyl group, terphenyl group, phenanthryl group, anthracenyl group, and the like; and a substituted aryl group where these aryl groups are substituted by 1 to 5 substituents such as a halogen atom, alkyl group or alkoxy group having 1 to 30 carbon atom, preferably 1 to 20 carbon atom, aryl group or aryloxy group having 6 to 30 carbon atoms, preferably 6 to 20 carbon atoms, and the like.

In the aforementioned manner, $R^1$ to $R^5$ may be a heterocyclic compound residue, oxygen-containing group, nitrogen-containing group, boron-containing group, sulfur-containing group, phosphorous-containing group, silicon-containing group, germanium-containing group, or tin-containing group. However, examples of these groups are the same as those mentioned in the above description of the hydrocarbon groups.

From the standpoint of providing a high molecular weight ethylene-based polymer and from the standpoint of olefin polymerization catalytic activity, among $R^1$ to $R^5$ of General Formula (I), $R^1$ is preferably a group selected from linear or branch hydrocarbon groups having 1 to 20 carbon atoms, alicyclic hydrocarbon groups having 3 to 20 carbon atoms, and aromatic hydrocarbon groups having 6 to 20 carbon atoms.

In General Formula (I), $R^6$ is selected from a hydrogen atom, hydrocarbon groups having 1 to 4 carbon atoms and composed of only primary or secondary carbon atoms, aliphatic hydrocarbon groups having at least 4 carbon atoms, aryl group-substituted alkyl groups, monocyclic or bicyclic alicyclic hydrocarbon groups, aromatic hydrocarbon groups, and halogen atoms. Among these groups, from the standpoints of olefin polymerization catalytic activity, providing a high molecular weight ethylene polymer, and hydrogen tolerance during polymerization, $R^6$ is preferably selected from aliphatic hydrocarbon groups having at least 4 carbon atoms, aryl-substituted alkyl groups, monocyclic or bicyclic alicyclic hydrocarbon groups, and aromatic hydrocarbon groups. Further preferred examples of $R^6$ are branched hydrocarbon groups such as a t-butyl group and the like; aryl-substituted alkyl groups such as a benzyl group, 1-methyl-1-phenylethyl group (cumyl group), 1-methyl-1,1-diphenylethyl group, 1,1,1-triphenylmethyl group (trityl group), and the like; and alicyclic hydrocarbon groups having an alicyclic or multicyclic structure and having 6 to 15 carbon atoms such as a cyclohexyl group having a hydrocarbon group at 1-position, norbornyl group, adamantyl group, and tetracyclododecyl group, or the like.

In General Formula (I), n is a number that satisfies the valance number of M.

In General Formula (I), X is a hydrogen atom, halogen atom, hydrocarbon group, oxygen-containing group, sulfur-containing group, nitrogen-containing group, boron-containing group, aluminum-containing group, phosphorous-containing group, halogen-containing group, heterocyclic compound residue, silicon-containing group, germanium-containing group or tin-containing group. When n is greater than or equal to 2, multiple groups indicated by X may be the same or different, and the multiple groups indicated by X may be bonded together to form a ring.

The halogen atom, hydrocarbon group, heterocyclic compound residue, oxygen-containing group, nitrogen-containing group, boron-containing group, sulfur-containing group, phosphorous-containing group, silicon-containing group, germanium-containing group, and tin-containing group of X are the same as those cited in the description of $R^1$ to $R^5$. Among these examples, halogen atoms and hydrocarbon groups are preferred.

In the present invention, the transition metal compound represented in General Formula (I) may be produced without limitation by the production method described in the Patent Document 3.

Moreover, the metallocene type compounds represented in following General Formula (II) are cited as the transition metal compound included in the olefin polymerization catalyst of the present invention.

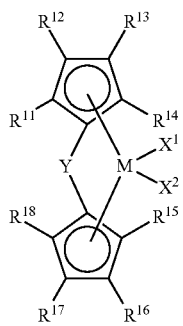

(II)

In General Formula (II), M is titanium, zirconium, or hafnium.

In General Formula (II), $R^{11}$ to $R^{18}$ may be the same or different and are a hydrogen atom, halogen atom, hydrocarbon group, heterocyclic compound residue, oxygen-containing group, nitrogen-containing group, boron-containing group, sulfur-containing group, phosphorous-containing group, silicon-containing group, germanium-containing group, or tin-containing group, where two or more adjacent groups may be optionally bonded together to form a ring.

The halogen atom, hydrocarbon group, heterocyclic compound residue, oxygen-containing group, nitrogen-containing group, boron-containing group, sulfur-containing group, phosphorous-containing group, silicon-containing group, germanium-containing group, or tin-containing group of $R^{11}$ to $R^{18}$ are the same as those cited in the description of $R^2$ to $R^5$ of General Formula (I).

In General Formula (II), $X^1$ and $X^2$ may be the same or different and are a hydrocarbon group, oxygen-containing group, sulfur-containing group, silicon-containing group, hydrogen atom, or halogen atom.

In General Formula (II), Y is a divalent hydrocarbon group, divalent halogenated hydrocarbon group, divalent silicon-containing group, divalent germanium-containing group, divalent tin-containing group, —O—, —CO—, —S—, —SO—, —SO$_2$—, —Ge—, —Sn—, —NR—, —P(R)—, —P(O)(R)—, —BR—, or —AlR— [where R may be the same or different and is a hydrogen atom, halogen atom, hydrocarbon group, halogenated hydrocarbon group, or alkoxy group]. The hydrocarbon group, oxygen-containing group, sulfur-containing group, silicon-containing group, and halogen atom of Y are the same as those cited in the description of $R^1$ to $R^5$ of General Formula (I).

Preferred examples of the metallocene type compound are compounds having the structures described in WO01/027124 pamphlet, WO2004/029062 pamphlet, or the like.

Of these, examples of metallocene type compounds that can be particularly preferably used in the present invention include diphenylmethylene(cyclopentadienyl)(2,7-di-tert-butylfluorenyl) zirconium dichloride, diphenylmethylene(cyclopentadienyl)(3,6-di-tert-butylfluorenyl) zirconium dichloride, diphenylmethylene(cyclopentadienyl)(octamethyloctahydrodibenzofluorenyl) zirconium dichloride, di(p-tolyl)methylene(cyclopentadienyl)(2,7-di-tert-butylfluorenyl) zirconium dichloride, di(p-tolyl)methylene(cyclopentadienyl)(3,6-di-tert-butylfluorenyl) zirconium dichloride, di(p-tolyl)methylene(cyclopentadienyl)(octamethyloctahydrodibenzofluorenyl) zirconium dichloride, di(p-chlorophenyl)methylene(cyclopentadienyl)(3,6-di-tert-butylfluorenyl) zirconium dichloride, di(p-chlorophenyl)

methylene(cyclopentadienyl) (octamethyloctahydrodibenzofluorenyl) zirconium dichloride, or the like.

Compounds where "zirconium" is replaced with "hafnium" or "titanium" in the aforementioned compounds and compounds where "cyclopentadienyl" is replaced with "3-tert-butyl-5-methyl-cyclopentadienyl," "3,5-dimethyl-cyclopentadienyl," "3-tert-butyl-cyclopentadienyl," "3-methyl-cyclopentadienyl," or the like are cited as preferred examples.

[Other Components Capable of Use in the Olefin Polymerization Catalyst]

The olefin polymerization catalyst used in the method of production of ethylene-based polymer particles of the present invention contains the aforementioned (A) and (B) components as essential components.

In addition to the (A) and (B) components, other components may be added and used in the olefin polymerization catalyst with the object of adjusting physical properties of the obtained ethylene-based polymer particles and of performing this method of production of the ethylene-based polymer particles with high catalytic activity.

As long as performance of the olefin polymerization catalyst including the (A) and (B) components is not impaired, no particular limitation is placed on such other components. Typical other such components capable of use are: (C) compounds forming an ion pair by reaction with the (B) component, and (D) organoaluminumoxy compounds, and these components will be explained below.

[(C): Compounds Forming an Ion Pair by Reaction with the (B) Component]

The (C) compound forming the ion pair by reaction with the (B) component and capable of use as a component of the olefin polymerization catalyst of the present invention is exemplified by organoaluminum compounds, halogenated boron compounds, halogenated phosphorous compounds, halogenated sulfur compounds, halogenated titanium compounds, halogenated silane compounds, halogenated germanium compounds, halogenated tin compounds, or the like.

Of these, preferred organoaluminum compounds may be exemplified by the aforementioned organoaluminum compounds used in the production of the (A) fine particles.

Specific example compounds for use as the halogenated boron compounds, halogenated phosphorous compounds, halogenated sulfur compounds, halogenated titanium compounds, halogenated silane compounds, halogenated germanium compounds, halogenated tin compounds are listed below.

Halogenated boron compounds such as trifluoroboron, trichloroboron, tribromoboron, and the like;

halogenated phosphorous compounds such as phosphorous trichloride, phosphorous tribromide, phosphorous triiodide, phosphorous pentachloride, phosphorous pentabromide, phosphorous oxychloride, phosphorous oxybromide, methyldichlorophosphine, ethyldichlorophosphine, propyldichlorophosphine, butyldichlorophosphine, cyclohexyldichlorophosphine, phenyldichlorophosphine, methyldichlorophosphine oxide, ethyldichlorophosphine oxide, butyldichlorophosphine oxide, cyclohexyldichlorophosphine oxide, phenyldichlorophosphine oxide, methylphenylchlorophosphine oxide, dibromotriphenylphosphorane, tetraethylphosphonium chloride, dimethyldiphenylphosphonium iodide, ethyltriphenylphosphonium chloride, allyltriphenylphosphonium chloride, benzyltriphenylphosphonium chloride, allyltriphenylphosphonium bromide, butyltriphenylphosphonium bromide, benzyltriphenylphosphonium bromide, and the like;

halogenated sulfur compounds such as sulfur dichloride, thionyl chloride, sulfuryl chloride, thionyl bromide, and the like;

halogenated titanium compounds such as titanium tetrafluoride, titanium tetrachloride, titanium tetrabromide, titanium tetraiodide, methoxytrichlorotitanium, ethoxytrichlorotitanium, butoxytrichlorotitanium, ethoxytribromotitanium, butoxytribromotitanium, dimethoxydichlorotitanium, diethoxydichlorotitanium, dibutoxydichlorotitanium, diethoxydibromotitanium, trimethoxychlorotitanium, triethoxychlorotitanium, tributoxychlorotitanium, triethoxybromotitanium and the like;

halogenated silane compounds such as silicon tetrachloride, silicon tetrabromide, silicon tetraiodide, methoxytrichlorosilane, ethoxytrichlorosilane, butoxytrichlorosilane, ethoxytribromosilane, butoxytribromosilane, dimethoxydichlorodsilane, diethoxydichlorosilane, dibutoxydichlorosilane, diethoxydibromosilane, trimethoxychlorosilane, triethoxychlorosilane, tributoxychlorosilane, triethoxybromosilane, methyltrichlorosilane, ethyltrichlorosilane, butyltrichlorosilane, phenyltrichlorosilane, dimethyldichlorosilane, diethyldichlorosilane, dibutyldichlorosilane, diphenyldichlorosilane, trimethylchlorosilane, triethylchlorosilane, tributylchlorosilane, triphenylchlorosilane, and the like;

halogenated germanium compounds such as germanium tetrafluoride, germanium tetrachloride, germanium tetraiodide, methoxytrichlorogermanium, ethoxytrichlorogermanium, butoxytrichlorogermanium, ethoxytribromogermanium, butoxytribromogermanium, dimethoxydichlorogermanium, diethoxydichlorogermanium, dibutoxydichlorogermanium, diethoxydibromogermanium, trimethoxychlorogermanium, triethoxychlorogermanium, tributoxychlorogermanium, triethoxybromogermanium, and the like; and halogenated tin compounds such as tin tetrafluoride, tin tetrachloride, tin tetrabromide, tin tetraiodide, methoxytrichlorotin, ethoxytrichlorotin, butoxytrichlorotin, ethoxytribromotin, butoxytribromotin, dimethoxydichlorotin, diethoxydichlorotin, dibutoxydichlorotin, diethoxydibromotin, trimethoxychorotin, triethoxychlorotin, tributoxychlorotin, triethoxybromotin, methyltrichlorotin, ethyltrichlorotin, butyltrichlorotin, phenyltrichlorotin, dimethyldichlorotin, diethyldichlorotin, dibutyldichlorotin, diphenyldichlorotin, trimethylchlorotin, triethylchlorotin, tributylchlorotin, triphenylchlorotin, and the like.

These compounds may be used alone or in combination of two or more kinds. Moreover, dilution is permissible using a hydrocarbon or halogenated hydrocarbon.

Of these compounds exemplified as the (C) component, preferred examples include trialkylaluminums, alkenylaluminums, dialkylaluminum halides, alkylaluminum sesquihalides, alkylaluminum dihalides, alkylaluminum hydrides, alkylaluminum alkoxides, (iso-Bu)$_2$Al(OSiMe$_3$), (iso-Bu)$_2$Al(OSiEt$_3$), Et$_2$AlOAlEt$_2$, (iso-Bu)$_2$AlOAl(iso-Bu)$_2$, LiAl(C$_2$H$_5$)$_4$, halogenated silane compounds, and halogenated titanium compounds. Further preferred examples are trialkylaluminums, alkenylaluminums, dialkylaluminum halides, alkylaluminum sesquihalides, alkylaluminum dihalides, alkylaluminum hydrides, and alkylaluminum alkoxides. Still further preferred examples are trialkylaluminums and alkylaluminum halides. Still further preferred examples are triethylaluminum, triisobutylaluminum, trihexylaluminum, trioctylaluminum, diethylaluminum monochloride, diisobutylaluminum monochloride, ethylaluminum sesquichloride, and ethylaluminum dichloride.

[(D) Organoaluminumoxy Compound]

The (D) organoaluminumoxy compound capable of use as a component of the olefin polymerization catalyst in the present invention may be the same organoaluminumoxy compounds used in Step 2 for production of the aforementioned (A) fine particles.

<Method of Production of the Ethylene-Based Polymer>

The method of production of ethylene-based polymer particles according to the present invention conducts, in the presence of the olefin polymerization catalyst including the (A) fine particles and the (B) transition metal compound as described above, homopolymerization of ethylene or copolymerization of ethylene and a linear or branched α-olefin having 3 to 20 carbon atoms.

In the method of production of ethylene-based polymer particles of the present invention, polymerization may be performed by either a gas phase polymerization method or liquid phase polymerization method, such as suspension polymerization and the like. Specific examples of the inert hydrocarbon solvent capable of use in the liquid phase polymerization method include aliphatic hydrocarbons such as propane, butane, pentane, hexane, heptane, octane, decane, dodecane, kerosene, and the like; alicyclic hydrocarbons such as cyclopentane, cyclohexane, methylcyclopentane, and the like; aromatic hydrocarbons such as benzene, toluene, xylene, and the like; halogenated hydrocarbons such as ethylene chloride, chlorobenzene, dichloromethane, and the like; and mixtures of such hydrocarbons. Olefin can also be used as the solvent.

In the olefin polymerization using the aforementioned type of olefin polymerization catalyst, the utilized amount of the (B) component relative to 1 L reaction volume is normally $10^{-11}$ to 10 mmol, and preferably is $10^{-9}$ to 1 mmol in terms of metal element within the (B) component. The amount of the (B) component per 1 g of the (A) component is normally $10^{-4}$ to 100 mmol, and preferably is $10^{-3}$ to 50 mmol.

Moreover, when the (C) component is used, the mole ratio [(C)/M] of the (C) component to the total transition metal atom (M) in the (C) component and (B) component is normally 0.01 to 100,000, and preferably is 0.05 to 50,000.

Moreover, when the (D) component is used, the mole ratio [(D)/M] of the (D) component to the total transition metal atom (M) in the (D) component and (B) component is normally 0.01 to 100,000, and preferably is 0.05 to 50,000.

Lower limit of the polymerization temperature of the olefin using this type of olefin polymerization catalyst is −20° C., preferably is 0° C., further preferably is 20° C., and particularly further preferably is 30° C. The upper limit of the polymerization temperature of the olefin is 150° C., preferably is 120° C., further preferably is 100° C., and particularly preferably is 80° C.

Particularly when the ethylene-based polymer particles obtained by the present invention are used for solid-phase stretch-molding, the aforementioned range of polymerization temperature is thought to be particularly preferred from the standpoint of a balance between catalytic activity and suppression of entanglement of the polymer chains.

Pressure of polymerization is normally atmospheric pressure to 10 MPa, and preferably is atmospheric pressure to 5 MPa.

The production method of the ethylene-based polymer of the present invention may use a reaction divided into two or more stages having different polymerization reaction conditions, i.e. the so-called multi-stage polymerization method.

When the multi-stage polymerization method is adopted, intrinsic viscosity [η] of the ethylene-based polymer obtained in a certain single stage of the multi-stage polymerization process is greater than or equal to 2 dL/g and less than or equal to 30 dL/g, preferably is greater than or equal to 3 dL/g and less than or equal to 28 dL/g, and further preferably is greater than or equal to 5 dL/g and less than or equal to 25 dL/g.

More specifically, a preferred embodiment of the method of production of the ethylene-based polymer of the present invention includes the below described step (a) and step (b) as an example of the so-called two-stage polymerization. More in detail, ethylene-based polymer produced in the step (a) preferably has an intrinsic viscosity [η] greater than or equal to 2 dL/g and less than or equal to 30 dL/g, preferably greater than or equal to 3 dL/g and less than or equal to 28 dL/g, and further preferably greater than or equal to 5 dL/g and less than or equal to 25 dL/g. In the other step (abbreviated hereinafter as the step (b)), the ethylene-based polymer is preferably produced under conditions such that the intrinsic viscosity [η] exceeds 15 dL/g and is less than or equal to 50 dL/g, preferably exceeds 20 dL/g and is less than or equal to 48 dL/g, and further preferably exceeds 23 dL/g and is less than or equal to 45 dL/g. The step (a) and step (b) preferably produce polymers having different [η] values.

Although no particular limitation is placed on the order of performance of the step (a) and step (b), when the step (a) is the step for producing the relatively low molecular weight ethylene-based polymer component, this step (a) is preferably performed first, and the step (b) for producing the relatively high molecular weight ethylene-based polymer component is preferably performed thereafter. In this case, the intrinsic viscosity of the component produced in step (a) may be obtained as a measured value by sampling part of the component. Intrinsic viscosity of the component produced in the step (b) is calculated based on the below listed formula.

Moreover, although the upper and lower limits of the mass ratio of the component (a) formed in the step (a) and the component (b) formed in step (b) are determined by the intrinsic viscosities of the respective components, the upper limit of the component (a) is preferably 50%, further preferably is 40%, and particularly further preferably is 35%. The lower limit is preferably 5%, and further preferably is 10%. On the other hand, the upper limit of the component (b) is preferably 95%, and more preferably 90%, and the lower limit is 50%, preferably 60%, and more preferably 65%.

This mass ratio can be determined by a method in which an ethylene absorption is measured in each step, or a method in which the resins in the respective steps are sampled in a small prescribed amount, and the resin production amount in each step is calculated from the mass, the slurry concentration, and the content of catalyst components in the resin, and the like. Further, the intrinsic viscosity of the polymer produced in the second stage is calculated based on the following formula.

$$[\eta](1) \times w(1) + [\eta](2) \times w(2) = [\eta](t)$$

(in the formula, [η] (1) is the intrinsic viscosity of the polymer produced in step (a), [η](2) is intrinsic viscosity of the polymer produced in step (b), [η](t) is the intrinsic viscosity of the final product, w(1) is the mass fraction in the step (a), and w(2) is the mass fraction in step (b))

The following is inferred as the reason why the ethylene-based polymer of the present invention is preferably produced by two-stage polymerization as describe above.

When the polymerization reaction using the olefin polymerization catalyst of the present invention is carried out to polymerize ethylene (and another utilized olefin, as may be required), the polymerization reaction occurs at catalyst active sites within the catalyst component. Because the generated polymer leaves the active site, the polymer generated at the initial stage of the polymerization reaction is assumed to be disproportionally located at the surface part of the generated ethylene-based polymer particle, and the polymer generated at the later stage of the polymerization reaction is assumed to be disproportionally located at the inner part of the composition particle. That is to say, the generated ethylene-based polymer particles are thought to have a structure resembling tree rings.

Therefore, when the ethylene-based polymer is produced by the present invention using two or more stages having separate reaction conditions, and when the ethylene-based polymer is produced under conditions such that intrinsic viscosity [η] of the ethylene-based polymer produced in the first stage becomes lower than intrinsic viscosity [η] of the finally produced ethylene-based polymer, it is thought that there is a high possibility of the presence of relatively low molecular weight polymer at the composite particle surface, and pressure bonding is thought to thus occur easily between particles during solid-phase stretch-molding. Since the ethylene-based polymer is obtained using a specific catalyst as described above according to the present invention, the ethylene-based polymer is assumed to be prepared so as to readily partially melt.

Moreover, the olefin polymerization catalyst used in the present invention is a so-called single site catalyst. Thus, the parts of the structure where the high molecular weight part and low molecular weight parts are disproportionally present are anticipated to be rather uniformly and finely distributed. Thus, during the below described solid-phase stretch-molding, stretching occurs uniformly, and breakage during stretching does not occur easily. It is thus thought that a high stretch ratio is exerted.

The polymerization reaction of the ethylene-based polymer of the present invention may be performed by the batch method, semi-continuous method, or continuous method. The batch method is preferably adopted when the ethylene-based polymer is produced by a multi-stage polymerization process in the aforementioned manner. The ethylene-based polymer obtained by the batch method is thought to be advantageous due to low particle-to-particle variance in the ethylene-based polymers obtained in the first stage polymerization step and in the second stage polymerization step so that there is a uniformly dispersed structure.

Molecular weight of the obtained olefin polymer may be adjusted using hydrogen in the polymerization system or may be adjusted by changing the polymerization temperature or polymerization pressure. Furthermore, molecular weight of the obtained olefin polymer may be adjusted by changing the amount of the (C) component or (D) component present in the olefin polymerization catalyst.

Examples of the olefins polymerized in the present invention are linear or branched α-olefins having 2 to 30 carbon atoms, and preferably 2 to 20 carbon atoms, and at least including ethylene, as exemplified by ethylene, propylene, 1-butene, 2-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, and 1-eicosene; and cycloolefins having 3 to 30 carbon atoms, and preferably 3 to 20 carbon atoms, as exemplified by cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; polar monomers such as α- and β-unsaturated carboxylic acids as exemplified by acrylic acid, methacrylic acid, fumaric acid, maleic anhydride, itaconic acid, itaconic anhydride, and bicyclo(2,2,1)-5-heptene-2,3-dicarboxylic acid; metallic salts of these α- and β-unsaturated carboxylic acids such as sodium salts, potassium salts, lithium salts, zinc salts, magnesium salts, calcium salts, and the like; α- and β-unsaturated carboxylic esters such as methyl acrylate, ethyl acrylate, n-propyl acrylate, isopropyl acrylate, n-butyl acrylate, isobutyl acrylate, tert-butyl acrylate, 2-ethylhexylacrylate, methyl methacrylate, ethyl methacrylate, n-propyl methacrylate, isopropyl methacrylate, n-butyl methacrylate, isobutyl methacrylate, and the like; vinyl esters such as vinyl acetate, vinyl propionate, vinyl caproate, vinyl caprate, vinyl laurate, vinyl stearate, vinyl trifluoroacetate, and the like; and unsaturated glycidyl esters such as glycidyl acrylate, glycidyl methacrylate, monoglycidyl itaconate, and the like. Furthermore, vinylcyclohexane, dienes, polyenes, or the like are also employable. The dienes and the polyenes are cyclic or linear compounds having 4 to 30 carbon atoms, and preferably 4 to 20 carbon atoms, and having two or more double bonds. Specific examples of such compounds include butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene, and dicyclopentadiene; 7-methyl-1,6-octadiene, 4-ethylidene-8-methyl-1,7-nonadiene, and 5,9-dimethyl-1,4,8-decatriene; as well as aromatic vinyl compounds such as mono- or polyalkylstyrenes (e.g., styrene, o-methylstyrene, m-methylstyrene, p-methylstyrene, o,p-dimethylstyrene, o-ethylstyrene, m-ethylstyrene, p-ethylstyrene, or the like), functional group-containing styrene derivatives (e.g., methoxystyrene, ethoxystyrere, vinylbenzoic acid, methyl vinylbenzoate, vinylbenzyl acetate, hydroxystyrene, o-chlorostyrene, p-chlorostyrene, divinylbenzene, or the like); and 3-phenylpropyrene, 4-phenylpropyrene, α-methylstyrene, or the like.

<Ethylene-Based Polymer Particles>

The ethylene-based polymer particles obtained by the method of production of ethylene-based polymer particles according to the present invention preferably have the below listed characteristics.

(i) Intrinsic viscosity [η] is in the range of 5 to 50 dL/g.

(ii) Average particle diameter is greater than or equal to 10 nm and less than 3,000 nm.

(iii) Crystallinity is at least 70%.

The above intrinsic viscosity [η] is a value measured in decalin at 135° C. The range of intrinsic viscosity [η] is 5 to 50 dL/g, preferably is 10 to 45 dL/g, and further preferably is 15 to 40 dL/g. Stretched fiber strength is insufficient when the intrinsic viscosity is less than 5 dL/g. When the intrinsic viscosity exceeds 50 dL/g, bonding of the grain boundaries of the olefin powder is insufficient during press or stretching, and uniform stretching becomes difficult.

The aforementioned ethylene-based polymer particles are formed as agglomerations of fine particles, and average particle diameter of the fine particles is determined by observation using a scanning electron microscope (SEM).

Average particle diameter of the fine particles of the ethylene-based polymer particles is greater than or equal to 10 nm and less than 3,000 nm, preferably greater than or equal to 10 nm and less than 2,000 nm, and further preferably greater than or equal to 10 nm and less than 1,000 nm. When ethylene-based polymer particles having a structure in the above range of average particle diameter are contacted each other, contact area becomes wide due to the high specific surface area, and pressure bonding readily occurs between particles during molding by the solid-phase stretch-molding method. As a result, breakage at the interfaces between particles during stretching is hard to be generated, and it becomes possible to mold at a high stretch ratio.

Because the aforementioned ethylene-based polymer particle is formed from an agglomeration of fine particles and wide spaces are present between fine particles, the ethylene-based polymer particles undergo uniform pressure bonding history during pressure bonding and molding, and thus uniform structure having few defects can be formed. As a result, breakage due to defects during stretching is hard to be generated, and it becomes possible to mold at a high stretch ratio.

The crystallinity of the ethylene-based polymer particles is the value calculated based on the heat of fusion observed using a differential scanning calorimeter (DSC). The lower limit of the crystallinity of the ethylene-based polymer particles is normally 70%, preferably is 75%, and further preferably is 80%. As the crystallinity increases, a molded article with higher strength may be obtained, and deformation and warping, i.e. volume contraction or the like, are less likely to occur. Thus although it is meaningless to set a corresponding value for the upper limit of the crystallinity, if the upper limit of the crystallinity were to be set, the upper limit of the crystallinity would be 99%, preferably 97%, and further preferably 95%.

The ethylene-based polymer particles of the present invention may be obtained by polymerization or copolymerization of the cited olefins in the presence of the aforementioned olefin polymerization catalyst.

Of these, examples of the ethylene-based polymer particles of the present invention include an ethylene homopolymer and a crystalline copolymer mainly comprising ethylene and obtained by copolymerizing ethylene and a small amount of α-olefins such as propylene, 1-butene, 4-methyl-1-pentene, 1-pentene, 1-hexene, 1-octene and 1-decene. In view of increasing the crystallinity and in view of stretchability in later-mentioned solid-phase stretch-molding, the ethylene homopolymer is preferable. However, if creep resistance is required in the molded product, copolymer with propylene or the like is preferred. Depending on the utilized olefin polymerization catalyst, ethylene-based polymers having branched structures may be obtained even from ethylene homopolymers. However, due to use of a supported type olefin polymerization catalyst containing a specified transition metal compound, the ethylene-based polymer of the present invention is thought to have extremely little such branching. If a polymerization method capable of obtaining this type of polymer exists, the degree of freedom of control of molecular structure becomes high, and this is advantageous for improving the properties of below described solid-phase stretch-molded article or the like.

<Stretch-Molded Article Obtained from Ethylene-Based Polymer and Production Method Thereof>

The stretch-molded article obtained from the ethylene-based polymer according to the present invention is prepared by molding the ethylene-based polymer particle using the known polyethylene stretch-molding method. The stretch-molded article of the present invention is obtained from the ethylene-based polymer particles polymerized using the olefin polymerization catalyst comprising the fine particles (i.e., (A) component) obtained through the specific steps as an essential constituent component. Thus the stretch-molded article with little entanglement of polymer chains of the ethylene-based polymer can be obtained, and it becomes possible to mold at a high stretch ratio. As a result, degree of orientation of the obtained molded article becomes high, and high strength is realized. Because the ethylene-based polymer particle is formed from an agglomeration of fine particles and wide spaces are present between fine particles, the ethylene-based polymer particles undergo uniform pressure bonding history during pressure bonding and molding, and thus uniform structure having few defects can be formed. Thus, breakage due to defects during stretching is hard to be generated, and it becomes possible to mold at a high stretch ratio. As a result, degree of orientation of the obtained molded article becomes high, and high strength is realized.

The stretch-molded article of the present invention uses ethylene-based polymer particles having high intrinsic viscosity [η], and thus there is a tendency for the obtained molded article to have high strength. Furthermore, the stretch-molded article of the present invention uses ethylene-based polymer particles having a small average particle diameter. Thus specific surface area is large, contact area between the ethylene-based polymer particles becomes large during stretch-molding, and pressure bonding readily occurs between particles. Thus, breakage at the interfaces between particles during stretching is hard to be generated, and it becomes possible to mold at a high stretch ratio. As a result, degree of orientation of the obtained molded article becomes high, and high strength is realized.

Among stretch-molded articles of the present invention, particularly preferred stretch-molded articles are obtained by the solid-phase stretch-molding method. Since the solid-phase stretch-molding is a molding method without a solvent, molding facility is relatively simple and adverse influence on environments is small. Providing a stretch-molded article by this type of method is thought to contribute highly to society.

Extremely high stretchability is exerted when the ethylene-based polymer particles of the present invention is subjected to solid-phase stretch-molding. It is thus possible to obtain articles having high strength, such as a fiber, film, sheet, biomaterial such as bone replacement material, and the like.

Any known conditions can be used without limitation for the solid-phase stretch-molding except that the above-described ethylene-based polymer must be used. For example, the ethylene-based polymer of the present invention is pressure bonded under a pressure of 1 MPa or more to mold a sheet, and the sheet is then stretched under tension at a relatively high temperature, or stretched under pressure applied using a roll or the like. Temperature of molding steps such as the pressure bonding step, stretching step, and the like is preferably less than or equal to the melting point of the particles of the ethylene-based polymer. However, molding may be performed at a temperature greater than or equal to the melting point as long as melt flow does not occur. This temperature range preferably has an upper limit equal to the melting point of the ethylene-based polymer of the present invention plus 5° C. and a lower limit equal to the melting point minus 30° C.

Stretchability (i.e. stretch ratio) of the molded article using the ethylene-based polymer of the present invention and physical properties (i.e. stretch ratio, maximum stress during stretching, and strength and elastic modulus of the stretch-molded article) of the obtained stretch-molded article are determined as in the below described examples.

When using the ethylene-based polymer particles of the present invention, a stretch-molded article could be obtained at a stretch ratio greater than or equal to 50, preferably greater than or equal to 80, further preferably greater than or equal to 100, and particularly preferably greater than or equal to 120.

By use of the ethylene-based polymer particles of the present invention, tensile stress during stretching is low in comparison to the conventional polymer. There is thus a tendency to be able to stretch more uniformly. Stress during stretching is preferably less than or equal to 30 MPa, further preferably is less than or equal to 25 MPa, still further preferably is less than or equal to 23 MPa, still further preferably is less than or equal to 20 MPa, and particularly preferably is less than or equal to 16 MPa.

Due to the ability to mold at a high stretch ratio, the stretch-molded article of the present invention is anticipated to have high tensile elastic modulus and tensile strength. Tensile elastic modulus of the obtained stretch-molded article is preferably greater than or equal to 80 GPa, is further preferably greater than or equal to 120 GPa, and is particularly preferably greater than or equal to 140 GPa. Moreover, strength of the obtained stretch-molded article is preferably greater than or equal to 2 GPa, is further preferably greater than or equal to 2.5 GPa, and is particularly preferably greater than or equal to 3 GPa.

EXAMPLES

Next, the present invention will be described based on examples, but it is needless to say that the present invention is not limited to the following examples unless deviating from the gist.

For the below described examples, average particle diameter of the fine particles, the intrinsic viscosity [η], crystallinity, and average particle diameter of the ethylene-based polymer particles, and various types of physical properties of the stretch-molded article were measured according to the below listed methods.

(Average Particle Diameter of Fine Particles)

Average particle diameter of the fine particles was measured by the dynamic light scattering method using a Zetasizer Nano ZS (manufactured by Sysmex Corporation) at 25° C. temperature in toluene solution.

(Intrinsic Viscosity [η])

Intrinsic viscosity [η] was measured by dissolving the ultrahigh molecular weight ethylene-based polymer particles in decalin, and then performing measurement in decalin at 135° C. temperature.

(Crystallinity and Melting Point)

Crystallinity and melting point were measured by the below described method using DSC (model DSC 6220, manufactured by SII Nano Technology Inc.).
Weight: about 5 mg
Heat-up rate: 10° C./minute
Measurement temperature range: 0° C. to 200° C.
Melting point: temperature at the top of the peak of fusion
Crystallinity: From 70° C. to 180° C., the amount of differential heat is obtained by subtracting the baseline. Crystallinity is the value obtained by dividing the obtained differential heat value by 290 J/g (i.e. heat of fusion of 100% crystalline polyethylene).

(Scanning Electron Microscope (SEM))

Average particle diameter of the ethylene-based polymer particles was measured at 10,000× magnification using a scanning electron microscope (model JSM-6510LV, manufactured by JEOL Ltd.). 10 polymer particles were selected from within the observed image, and average particle diameter was calculated for the selected particles.

(Stretch Ratio)

The ethylene-based polymer particles were pressed at a temperature of 136° C. and a pressure of 7 MPa for 30 minutes to manufacture a sheet with a thickness of about 500 μm, and the obtained sheet was then cut into a rectangular shape that was 35 mm length and 7 mm breadth.

A 10 mm diameter cylindrically shaped injection molded product was produced using high density polyethylene, and this molded product was halved along the center axis (hereinafter, referred to as billet). The cut sheet was sandwiched and fixed between the halved plane faces of the billet.

A Capillary Rheometer IIB (manufactured by Toyo Seiki Seisaku-sho, Ltd.) was heated to 120° C., and the previously produced billet was set within the cylinder. The push rod was used to push on the billet from the top part at a rate of 2 mm/second to perform compression stretching by causing the billet to pass through a nozzle having a concave taper shape. Ratio of the cross-sectional areas calculated based on the cylinder diameter and the discharge port diameter of the concave shaped taper nozzle was 6:1. The sheet was stretched six-fold in the longitudinal direction by passing through the nozzle.

Thereafter, a sheet sample was cut from the stretched sheet obtained in the pre-stretching, and the sheet sample was marked by standard lines spaced 5 mm apart. The obtained sheet sample was set (7 mm chuck spacing) in a tensile tester (Universal Testing Instrument Model 1123, manufactured by Instron), and uniaxial stretching was performed in the same direction as the pre-stretching under 135° C. temperature and 14 mm/minute tensile speed conditions. The measurement was performed 3 to 5 times, distance between the standard lines at break was divided by the initial distance between the standard lines (5 mm), and the resultant value was taken to be the second stretch ratio.

The second stretch ratio was multiplied by 6, which was the stretch ratio in the compression stretching, to give a value which was evaluated as the stretch ratio.

(Strength of the Stretch-Molded Article)

A tensile tester (Universal Testing Instrument Model 1123, manufactured by Instron) was used to measure tensile strength in the stretch direction of the stretch-molded article cut into a rectangular strip shape (23° C. temperature, 30 mm chuck spacing, 30 mm/minute tensile speed conditions).

Example 1

Preparation of Component (a-1)

76.2 g (0.80 mol) of anhydrous magnesium chloride, 332 g of dry decane, 260.4 g (2.0 mol) of 2-ethylhexyl alcohol, and 119.4 g (0.4 mol) of 2-octyldodecyl alcohol were loaded into a 2 L glass vessel equipped with an agitator and sufficiently purged with nitrogen. The mixture was reacted for 4 hours at 155° C. to produce a uniform transparent solution. Thereafter, this uniform transparent solution was diluted using dry decane to obtain 0.2 mmol/mL (Mg atom basis) of uniform transparent component (a-1).

Preparation of Component (A-1)

1 L of dry toluene was loaded into a 2 L glass vessel equipped with an agitator and sufficiently purged with nitrogen. Liquid temperature was maintained at 50° C., and 4.0 mmol (Mg atom basis) of the component (a-1) was added. Thereafter, 16 mmol (Al atom basis) of triisobutylaluminum was slowly added dropwise to synthesize the fine particle component (A-1). Part of this reaction liquid was sampled, and average particle diameter of the fine particle measured by the dynamic light scattering method was 40 nm.

Ethylene Polymerization

Figure 2:
FIG. 2 is a photograph of the inside of the polymerization reactor after completion of the polymerization reaction of Example 1.

Ethylene was fed into the reaction liquid containing the component (A-1), and the liquid phase and the gas phase were saturated with ethylene. Thereafter, liquid temperature was lowered to 10° C., 0.002 mmol (Zr atom basis) of the below listed transition metal compound (B-1) was added, and polymerization reaction was performed for 30 minutes at 10° C. After completion of the polymerization, the reaction mixture was charged into 4 L of methanol to which hydrochloric acid had been added, and the entire mass of polymer was made to precipitate. After recovery by filtration, the polymer was subjected to preliminary drying at 80° C. under vacuum for 1 hour. Then, the polymer was vacuum dried further for 10 hours at 110° C. 22.3 g of polyethylene was obtained. Catalytic activity was 22.3 kg/mmol-Zr·h, and [η] was 18.7 dL/g. Average particle diameter of the fine particles composing the polymer particles was found to be 190 nm (FIG. 1) by scanning electron microscope observation. Polymer fouling was not observed (FIG. 2) when the condition of the polymerization reactor was checked.

By using the obtained polyethylene a press sheet was produced in the manner described for the stretch ratio measurement method, and stretch ratio and strength of stretch-molded article were measured. The results are shown in Table 1.

Component (B-1)

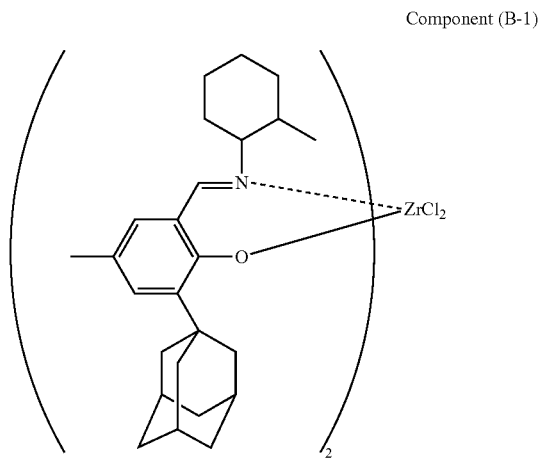

Example 2

Preparation of Component (A-2)

500 mL of dry toluene was loaded into a 1 L autoclave equipped with an agitator and sufficiently purged with nitrogen. Liquid temperature was maintained at 50° C., and 0.32 mmol (Mg atom basis) of the component (a-1) synthesized in the same manner as Example was added. Thereafter, 1.28 mmol (Al atom basis) of triisobutylaluminum was slowly added dropwise to synthesize the fine particle component (A-2). Part of this reaction liquid was sampled, and average particle diameter of the fine particle measured by the dynamic light scattering method was 40 nm.

Ethylene Polymerization

Figure 3:
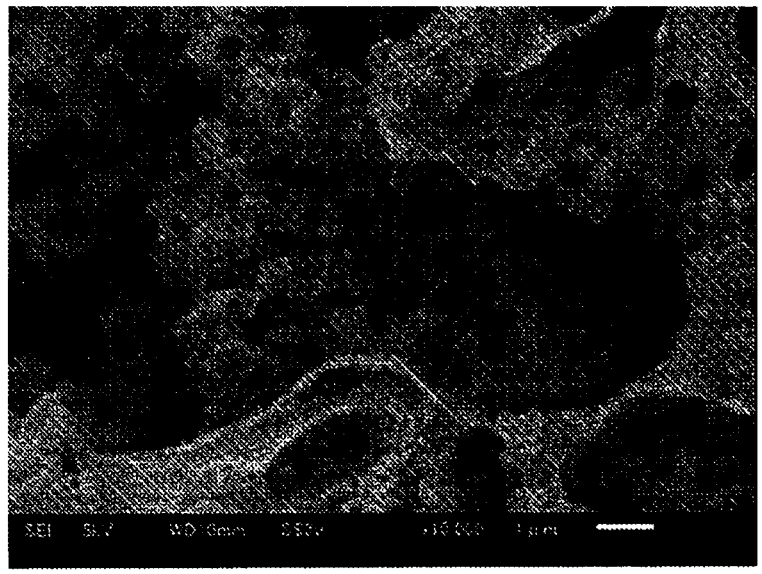
FIG. 3 is an SEM photograph of the ethylene polymer particles of Example 2.
Figure 4:
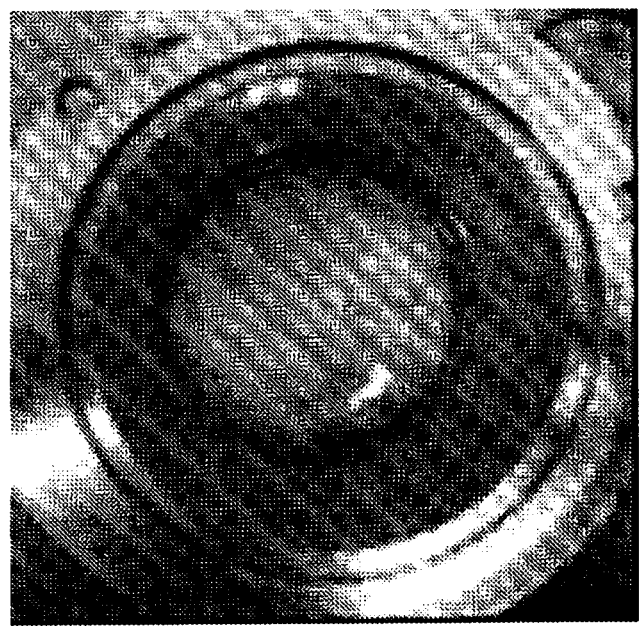
FIG. 4 is a photograph of the inside of the polymerization reactor after completion of the polymerization reaction of Example 2.

Ethylene was fed into the reaction liquid containing the component (A-2), and the liquid phase and the gas phase were saturated with ethylene. Thereafter, 0.0004 mmol (Zr atom basis) of the transition metal compound (B-1) was added, and polymerization reaction was performed for 30 minutes at 50° C. while feeding ethylene so as to reach a total pressure of 0.8 MPa. After completion of the polymerization, the obtained polymer was washed using hexane. Then the polymer was subjected to preliminary drying at 80° C. under vacuum for 1 hour. Then the polymer was vacuum dried further for 10 hours at 110° C. 62.8 g of polyethylene was obtained. Catalytic activity was 314.0 kg/mmol-Zr·h, and [η] was 26.7 dL/g. Average particle diameter of the fine particles composing the polymer particles was found to be 390 nm (FIG. 3) by scanning electron microscope observation. Polymer fouling was not observed (FIG. 4) when the condition of the polymerization reactor was checked.

The obtained polyethylene was used to produce a press sheet by the same method as described in Example 1, and the stretch ratio and strength of the stretch-molded article were measured. The results are shown in Table 1.

Example 3

Preparation of Component (A-3)

500 mL of dry toluene was loaded into a 1 L autoclave equipped with an agitator and sufficiently purged with nitrogen. Liquid temperature was maintained at 50° C., and 0.16 mmol (Mg atom basis) of the component (a-1) synthesized in the same manner as Example was added. Thereafter, 0.64 mmol (Al atom basis) of triisobutylaluminum was slowly added dropwise to synthesize the fine particle component (A-3). Part of this reaction liquid was sampled, and average particle diameter of the fine particle measured by the dynamic light scattering method was 40 nm.

Ethylene Polymerization

Figure 5:
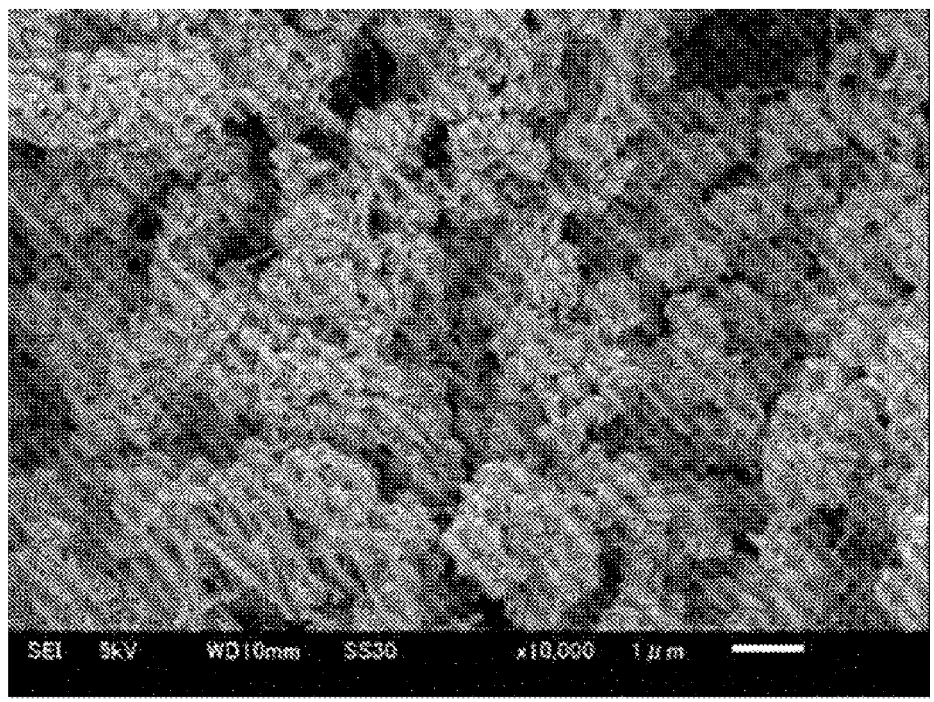
FIG. 5 is an SEM photograph of the ethylene polymer particles of Example 3.
Figure 6:
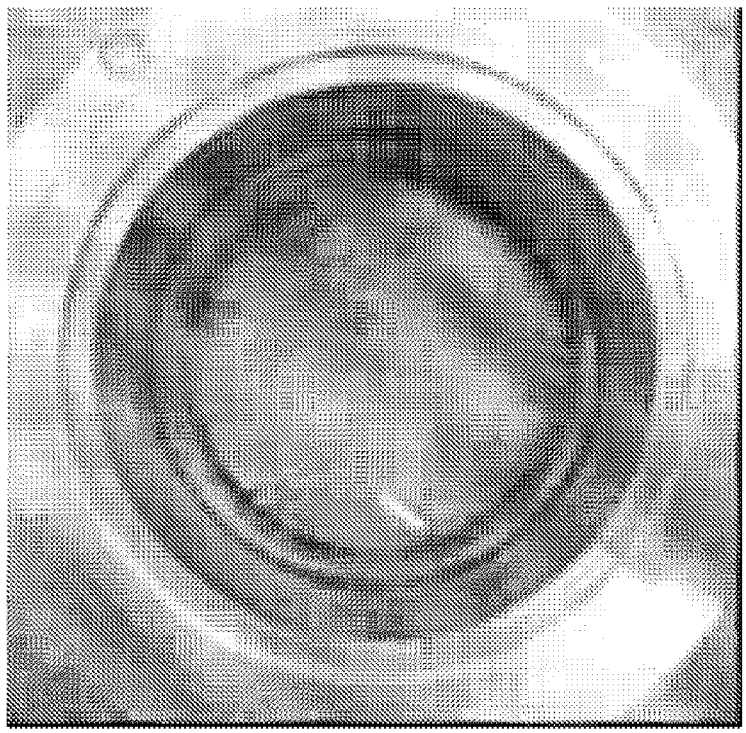
FIG. 6 is a photograph of the inside of the polymerization reactor after completion of the polymerization reaction of Example 3.

Ethylene was fed into the reaction liquid containing the component (A-3), and the liquid phase and the gas phase were saturated with ethylene. Thereafter, 0.0002 mmol (Zr atom basis) of below listed transition metal compound (B-2) was added, and polymerization reaction was performed for 30 minutes at 50° C. while feeding ethylene so as to reach a total pressure of 0.3 MPa. After completion of the polymerization, the obtained polymer was washed using hexane. Then the polymer was subjected to preliminary drying at 80° C. under vacuum for 1 hour. Then the polymer was vacuum dried further for 10 hours at 110° C. 34.8 g of polyethylene was obtained. Catalytic activity was 348.4 kg/mmol-Zr·h, and [η] was 34.8 dL/g. Average particle diameter of the fine particles composing the polymer particles was found to be 300 nm (FIG. 5) by scanning electron microscope observation. Polymer fouling was not observed (FIG. 6) when the condition of the polymerization reactor was checked.

The obtained polyethylene was used to produce a press sheet by the same method as described in Example 1, and the stretch ratio and strength of the stretch-molded article were measured. The results are shown in Table 1.

Component (B-2)

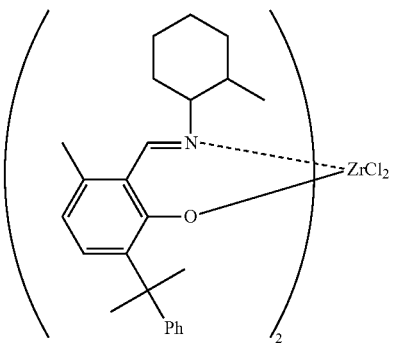

Example 4

Figure 7:
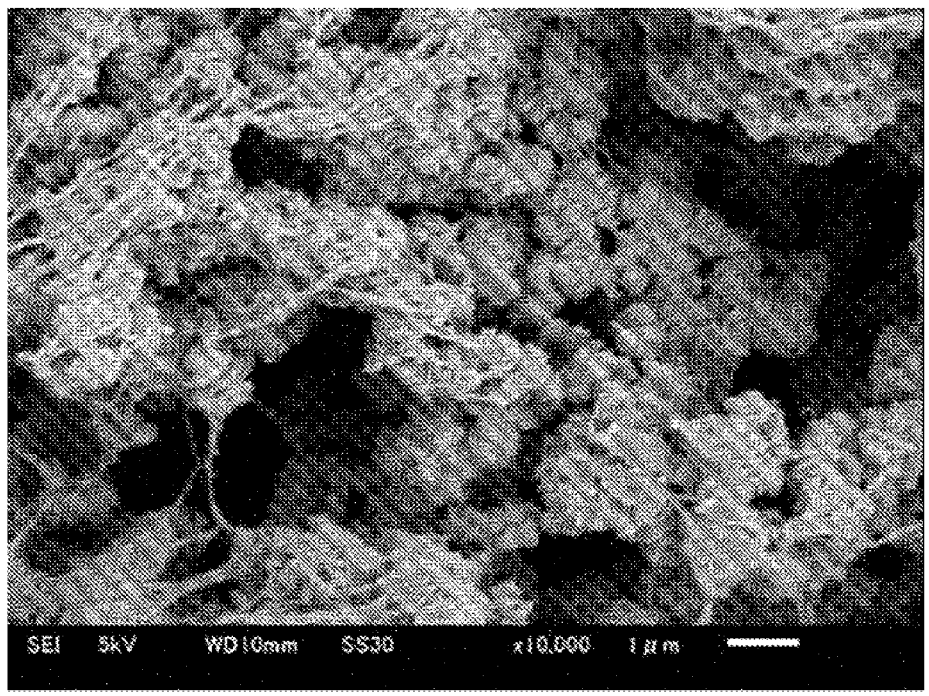
FIG. 7 is an SEM photograph of the ethylene polymer particles of Example 4.
Figure 8:
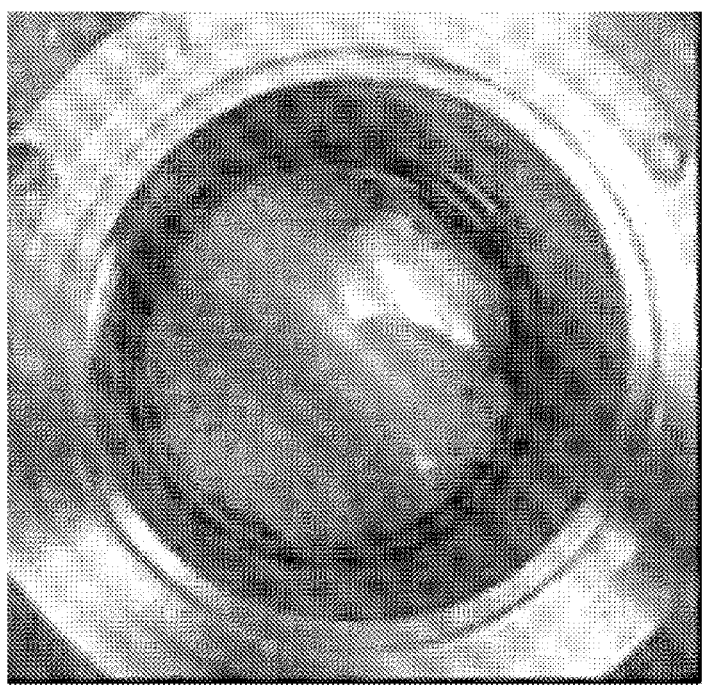
FIG. 8 is a photograph of the inside of the polymerization reactor after completion of the polymerization reaction of Example 4.

Ethylene was fed into the reaction liquid containing the component (A-3) prepared in Example 3, and the liquid phase and the gas phase were saturated with ethylene. Thereafter, 0.0002 mmol (Zr atom basis) of the transition metal compound (B-2) was added, and polymerization reaction was performed for 30 minutes at 65° C. while feeding ethylene so as to reach a total pressure of 0.3 MPa. After completion of the polymerization, the obtained polymer was washed using hexane. Then the polymer was subjected to preliminary drying at 80° C. under vacuum for 1 hour. Then the polymer was vacuum dried further for 10 hours at 110° C. 30.4 g of polyethylene was obtained. Catalytic activity was 304.0 kg/mmol-Zr·h, and [η] was 28.4 dL/g. Average particle diameter of the fine particles composing the polymer particles was found to be 310 nm (FIG. 7) by scanning electron microscope observation. Polymer fouling was not observed (FIG. 8) when the condition of the polymerization reactor was checked.

The obtained polyethylene was used to produce a press sheet by the same method as described in Example 1, and the stretch ratio and strength of the stretch-molded article were measured. The results are shown in Table 1.

Example 5

Preparation of Component (a-2)

47.6 g (0.50 mol) of anhydrous magnesium chloride, 65 g of dry decane, 97.6 g (0.75 mol) of 2-ethylhexyl alcohol, and 223.9 g (0.75 mol) of 2-octyldodecyl alcohol were loaded into a 1 L glass vessel equipped with an agitator and sufficiently purged with nitrogen. The mixture was reacted for 4 hours at 155° C. to produce a uniform transparent solution. Thereafter, this uniform transparent solution was diluted using dry decane to obtain 0.2 mmol/mL (Mg atom basis) of uniform transparent component (a-2).

Preparation of Component (A-4)

500 mL of dry toluene was loaded into a 1 L autoclave equipped with an agitator and sufficiently purged with nitrogen. Liquid temperature was maintained at 50° C., and 0.75 mmol (Mg atom basis) of the component (a-2) was added. Thereafter, 2.25 mmol (Al atom basis) of triisobutylaluminum was slowly added dropwise to synthesize the fine particle component (A-4). Part of this reaction liquid was sampled, and average particle diameter of the fine particle measured by the dynamic light scattering method was 30 nm.

Ethylene Polymerization

Figure 9:
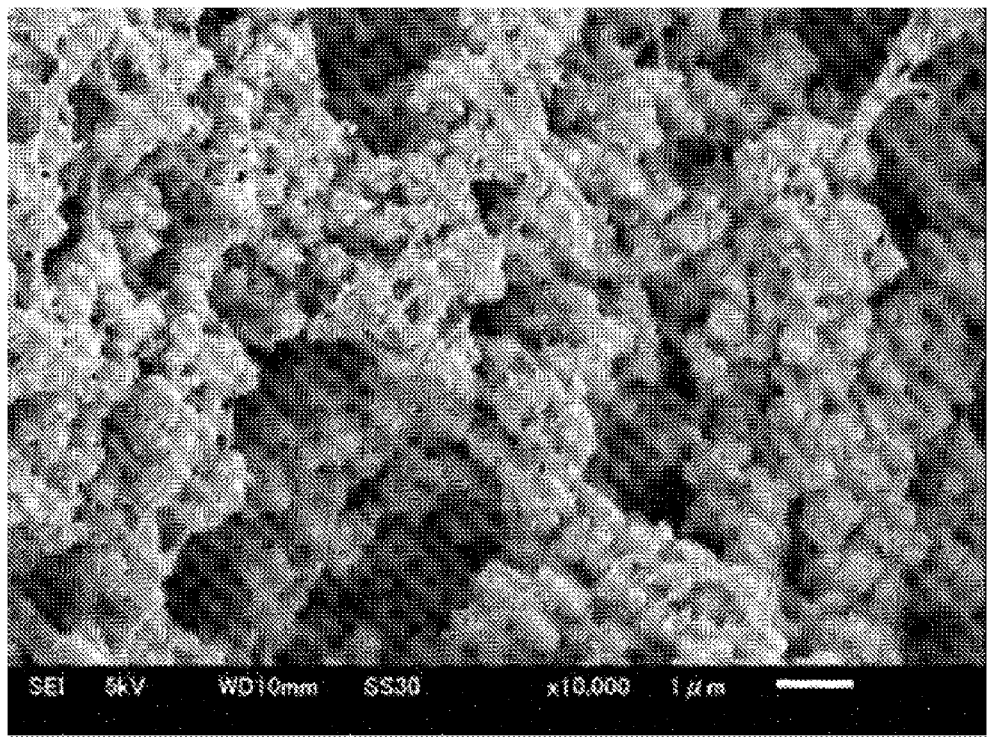
FIG. 9 is an SEM photograph of the ethylene polymer particles of Example 5.
Figure 10:
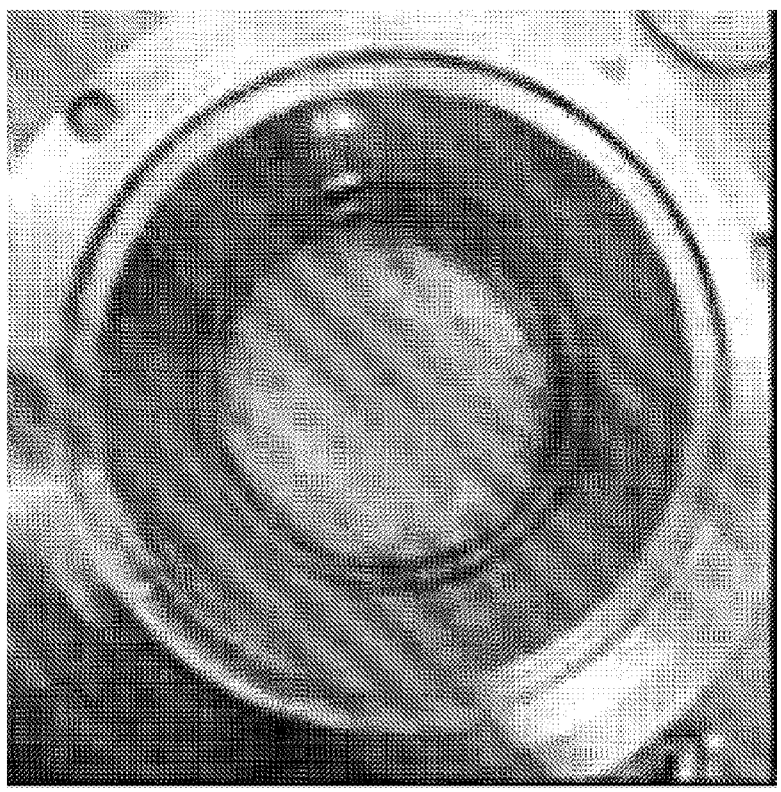
FIG. 10 is a photograph of the inside of the polymerization reactor after completion of the polymerization reaction of Example 5.

Ethylene was fed into the reaction liquid containing the component (A-4), and the liquid phase and the gas phase were saturated with ethylene. Thereafter, 0.0015 mmol (Ti atom basis) of below listed transition metal compound (B-3) was added, and polymerization reaction was performed for 30 minutes at 50° C. while feeding ethylene so as to reach a total pressure of 0.3 MPa. After completion of the polymerization, the obtained polymer was washed using hexane. Then the polymer was subjected to preliminary drying at 80° C. under vacuum for 1 hour. Then the polymer was vacuum dried further for 10 hours at 110° C. 28.5 g of polyethylene was obtained. Catalytic activity was 38.0 kg/mmol-Ti·h, and [η] was 23.8 dL/g. Average particle diameter of the fine particles composing the polymer particles was found to be 250 nm (FIG. 9) by scanning electron microscope observation. Polymer fouling was not observed (FIG. 10) when the condition of the polymerization reactor was checked.

The obtained polyethylene was used to produce a press sheet by the same method as described in Example 1, and the stretch ratio and strength of the stretch-molded article were measured. The results are shown in Table 1.

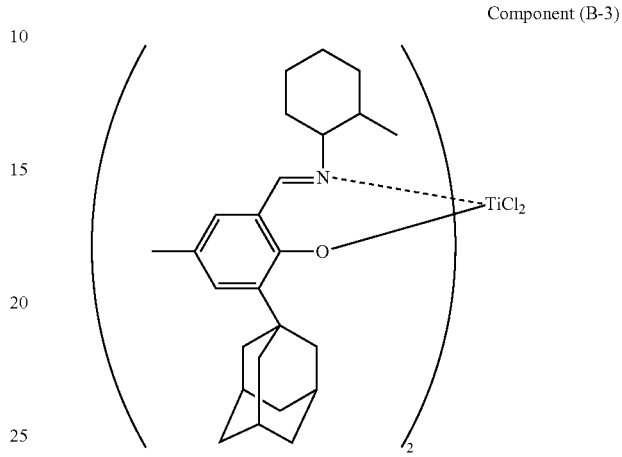

Component (B-3)

Example 6

Preparation of Component (A-5)

750 mL of dry toluene and 20.0 mmol (Al atom basis) of triisobutylaluminum were loaded into a 1 L glass vessel equipped with an agitator and sufficiently purged with nitrogen. While the mixture was strongly stirred using a homogenizer (model CLEARMIX CLM-1.5S, manufactured by M Technique Co., Ltd.) at a rotation rate of 15,000 rpm and while liquid temperature was maintained at 20° C., 20 mmol (Mg atom basis) of component (a-1) synthesized in the same manner as Example 1 was slowly added dropwise, and the mixture was allowed to react for 15 minutes. Thereafter, liquid temperature was raised to 50° C., and reaction was performed for 3 minutes to synthesize the fine particle component (A-5). Part of this reaction liquid was sampled, and average particle diameter of the fine particle measured by the dynamic light scattering method was 50 nm.

Figure 11:
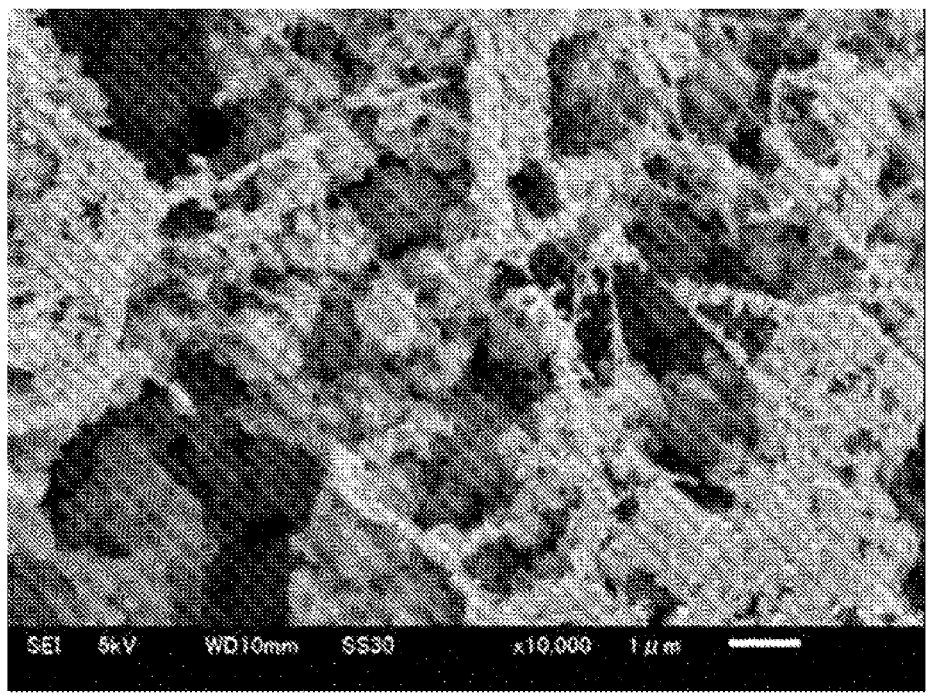
FIG. 11 is an SEM photograph of the ethylene polymer particles of Example 6.
Figure 12:
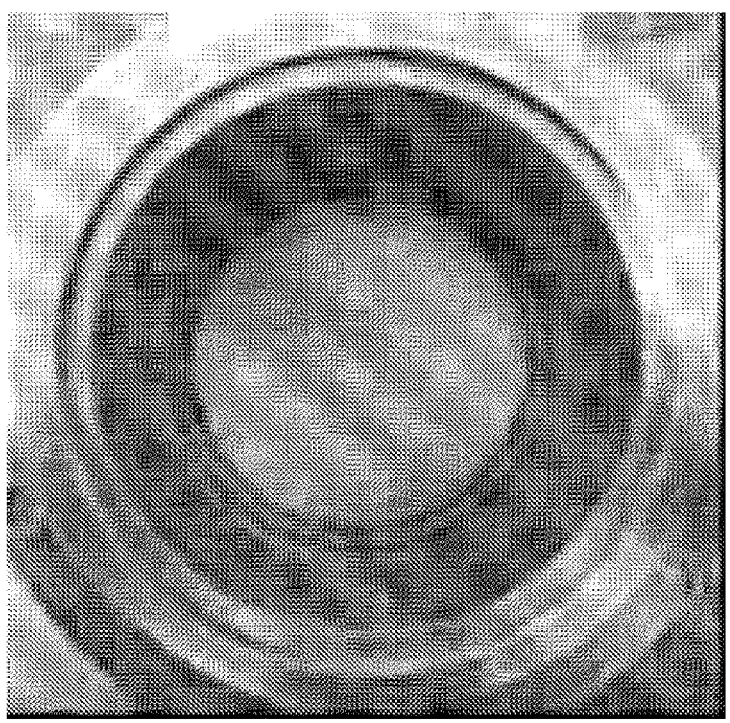
FIG. 12 is a photograph of the inside of the polymerization reactor after completion of the polymerization reaction of Example 6.

Ethylene Polymerization 500 mL of dry toluene was loaded into a 1 L autoclave equipped with an agitator and sufficiently purged with nitrogen. Then ethylene was fed, and the liquid phase and the gas phase were saturated with ethylene. Thereafter, 0.05 mmol (Al atom basis) of triisobutylaluminum, 0.50 mmol (Mg atom basis) of the component (A-5), and 0.001 mmol (Ti atom basis) of the transition metal compound (B-3) were added, and polymerization reaction was performed for 30 minutes at 50° C. while feeding ethylene gas so as to reach a total pressure of 0.3 MPa. After completion of the polymerization, the obtained polymer was washed using hexane. Then the polymer was subjected to preliminary drying at 80° C. under vacuum for 1 hour. Then the polymer was vacuum dried further for hours at 110° C. 24.9 g of polyethylene was obtained. Catalytic activity was 49.8 kg/mmol-Ti·h, and [η] was 24.8 dL/g. Average particle diameter of the fine particles composing the polymer particles was found to be 220 nm (FIG. 11) by scanning electron microscope observation. Polymer fouling was not observed (FIG. 12) when the condition of the polymerization reactor was checked.

The obtained polyethylene was used to produce a press sheet by the same method as described in Example 1, and the stretch ratio and strength of the stretch-molded article were measured. The results are shown in Table 1.

Example 7

Preparation of Component (A-6)

500 mL of dry toluene was loaded into a 1 L autoclave equipped with an agitator and sufficiently purged with nitrogen. Liquid temperature was maintained at 50° C., and 1.0 mmol (Mg atom basis) of the component (a-1) synthesized in the same manner as Example 1 was added. Thereafter, 3.0 mmol (Al atom basis) of triisobutylaluminum was slowly added dropwise to synthesize the fine particle component (A-6). Part of this reaction liquid was sampled, and average particle diameter of the fine particle measured by the dynamic light scattering method was 40 nm.

Ethylene Polymerization

Figure 13:
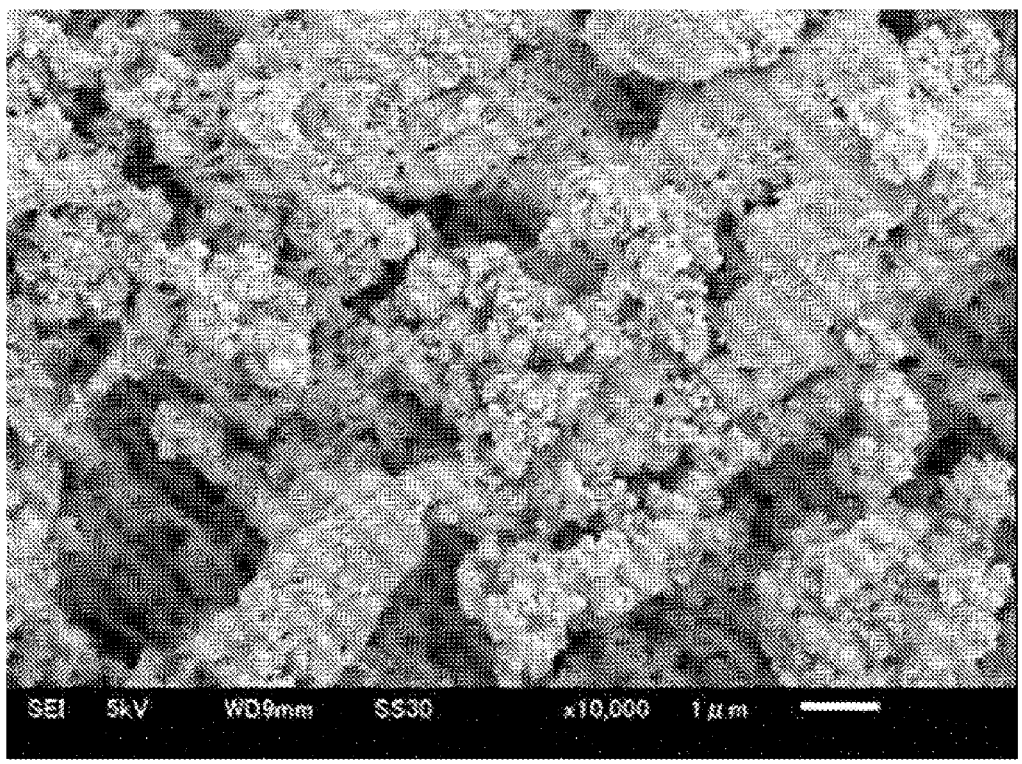
FIG. 13 is an SEM photograph of the ethylene polymer particles of Example 7.
Figure 14:
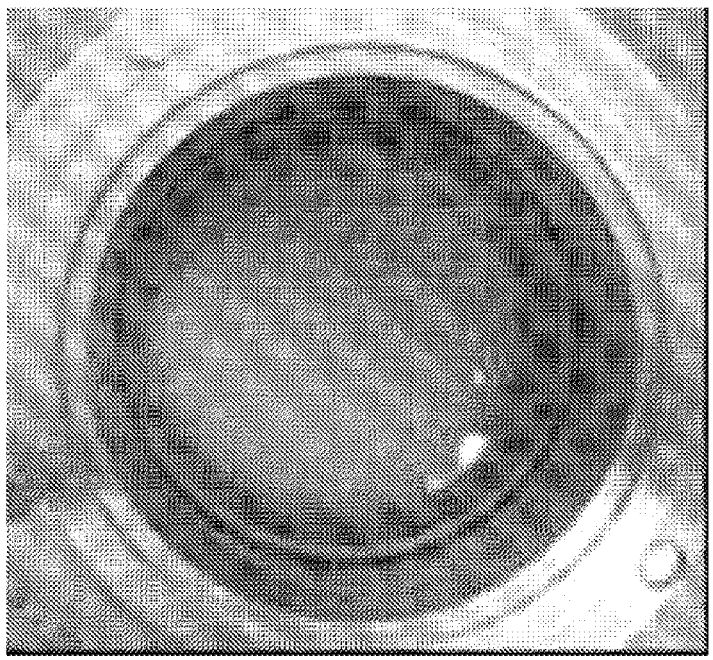
FIG. 14 is a photograph of the inside of the polymerization reactor after completion of the polymerization reaction of Example 7.

Ethylene containing 500 ppm of hydrogen was fed into the reaction liquid containing the component (A-6), and the liquid phase and gas phase were saturated. Thereafter, 0.005 mmol (Ti atom basis) of below listed transition metal compound (B-4) was added, and polymerization reaction was performed for 30 minutes at 50° C. while feeding ethylene containing 500 ppm of hydrogen so as to reach a total pressure of 0.8 MPa. After completion of the polymerization, the obtained polymer was washed using hexane. Then the polymer was subjected to preliminary drying at 80° C. under vacuum for 1 hour. Then the polymer was vacuum dried further for 10 hours at 110° C. 43.3 g of polyethylene was obtained. Catalytic activity was 17.3 kg/mmol-Ti·h, and [η] was 23.8 dL/g. Average particle diameter of the fine particles composing the polymer particles was found to be 150 nm (FIG. 13) by scanning electron microscope observation. Polymer fouling was not observed (FIG. 14) when the condition of the polymerization reactor was checked.

The obtained polyethylene was used to produce a press sheet by the same method as described in Example 1, and the stretch ratio and strength of the stretch-molded article were measured. The results are shown in Table 1.

Component (B-4)

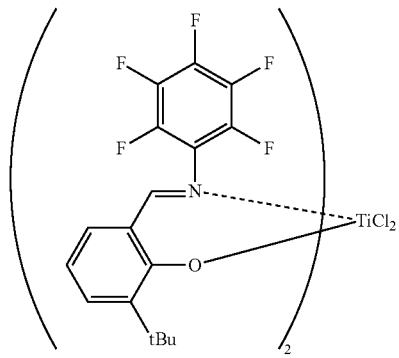

Example 8

Figure 15:
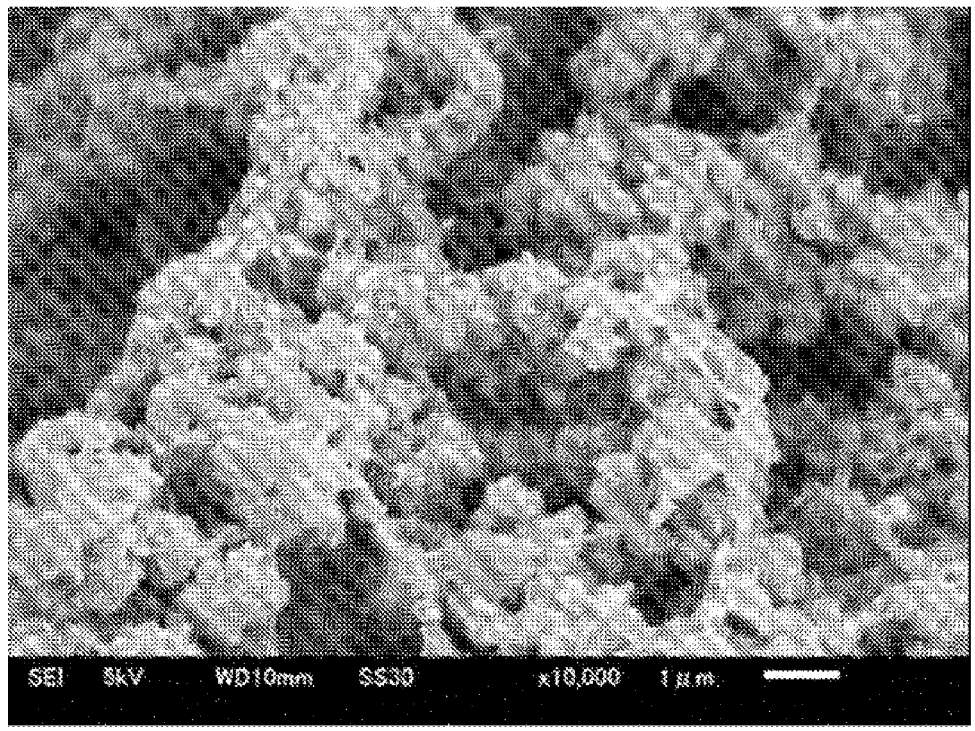
FIG. 15 is an SEM photograph of the ethylene polymer particles of Example 8.
Figure 16:
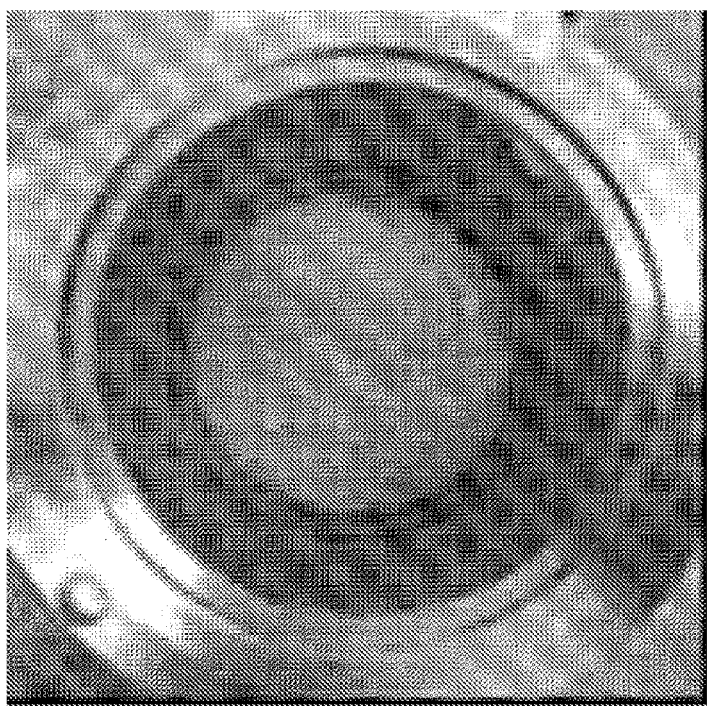
FIG. 16 is a photograph of the inside of the polymerization reactor after completion of the polymerization reaction of Example 8.

500 mL of dry toluene was loaded into a 1 L autoclave equipped with an agitator and sufficiently purged with nitrogen. Then ethylene containing 500 ppm of hydrogen was fed to saturate the liquid phase and gas phase. Thereafter, 0.04 mmol (Al atom basis) of triisobutylaluminum, 0.40 mmol (Mg atom basis) of the component (A-5) produced in Example 6, and 0.002 mmol (Ti atom basis) of the transition metal compound (B-4) were added, and while ethylene containing 500 ppm of hydrogen was fed so as to maintain total pressure at 0.8 MPa, the polymerization reaction was performed for 30 minutes at 50° C. After completion of the polymerization, the obtained polymer was washed using hexane. Then the polymer was subjected to preliminary drying at 80° C. under vacuum for 1 hour. Then the polymer was vacuum dried further for 10 hours at 110° C. 26.5 g of polyethylene was obtained. Catalytic activity was 26.5 kg/mmol-Ti·h, and [η] was 27.5 dL/g. Average particle diameter of the fine particles composing the polymer particles was found to be 230 nm (FIG. 15) by scanning electron microscope observation. Polymer fouling was not observed (FIG. 16) when the condition of the polymerization reactor was checked.

The obtained polyethylene was used to produce a press sheet by the same method as described in Example 1, and the stretch ratio and strength of the stretch-molded article were measured. The results are shown in Table 1.

Example 9

Preparation of Component (a-3)

47.6 g (0.50 mol) of anhydrous magnesium chloride, 65 g of dry decane, 97.6 g (0.75 mol) of 2-ethylhexyl alcohol, and 223.9 g (0.75 mol) of 2-octyldodecyl alcohol were loaded into a 1 L glass vessel equipped with an agitator and sufficiently purged with nitrogen. The mixture was reacted for 4 hours at 155° C. to produce a uniform transparent component (a-3).

Preparation of Component (A-7)

100 mL (100 mmol; Mg atom basis) of the component (a-3) and 89.6 g (300 mmol) of 2-octyldodecyl alcohol were loaded into a 1 L glass vessel equipped with an agitator and sufficiently purged with nitrogen, and the reaction was performed for 4 hours at 155° C. Thereafter, the reaction mixture was cooled down to 0° C., and 50 mL of dry decane, and 560 mL of dry chlorobenzene were added. While the mixture was strongly stirred using a homogenizer (model CLEARMIX CLM-1.5S, manufactured by M Technique Co., Ltd.) at a rotation rate of 15,000 rpm, and while liquid temperature was maintained at 0° C., 138 mmol of triethylaluminum was slowly added dropwise. Thereafter, the liquid temperature was raised to 80° C. over 4 hours, and while temperature was maintained at 80° C., 158 mmol of triethylaluminum was again slowly added dropwise. The mixture was reacted further for 1 hour. After completion of the reaction, the solid portion was recovered by filtration and washed sufficiently using dry toluene, and dry toluene was added to synthesize the fine particle component (A-7). Part of this reaction liquid was sampled, and average particle diameter of the fine particle measured by the dynamic light scattering method was 150 nm.

Preparation of Solid Catalyst Component (E)

100 mL of dry toluene was loaded into a 300 mL glass vessel equipped with an agitator and sufficiently purged with nitrogen. 5.0 mmol (Mg atom basis) of the fine particle component (A-7) prepared as above were added. Thereafter, 0.025 mmol (Zr atom basis) of a toluene solution of below listed transition metal compound (B-5) was added dropwise, and the solid catalyst component (E) was synthesized by reaction for 1 hour at room temperature.

Figure 17:
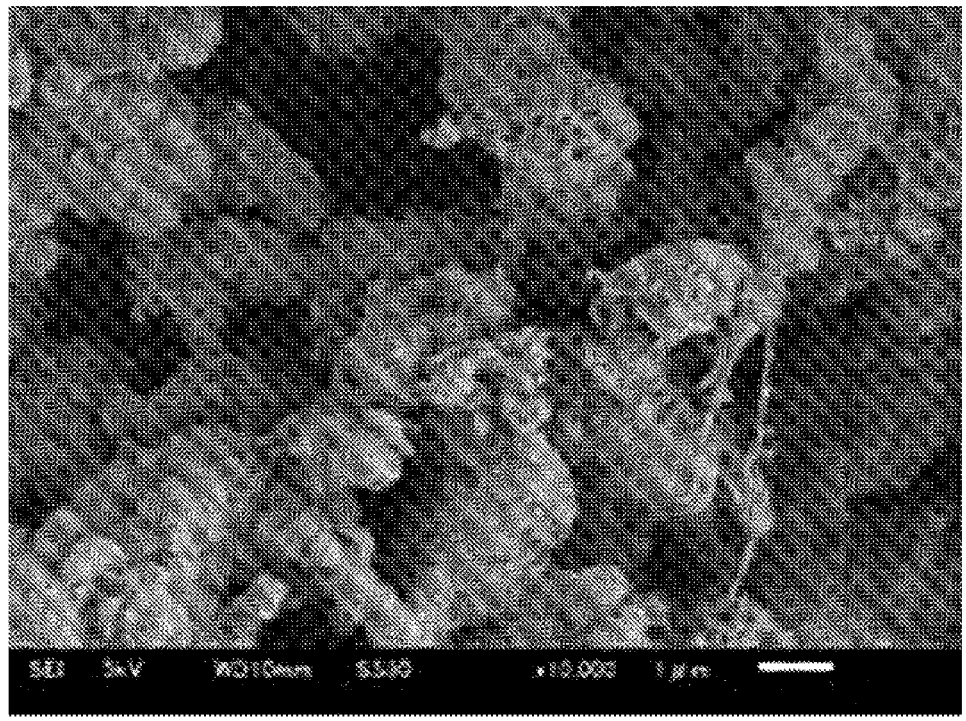
FIG. 17 is an SEM photograph of the ethylene polymer particles of Example 9.

Ethylene Polymerization 500 mL of dry heptane was loaded into a 1 L autoclave equipped with an agitator and sufficiently purged with nitrogen. Then ethylene was fed, and the liquid phase and the gas phase were saturated with ethylene. Thereafter, 1.25 mmol (Al atom basis) of triethylaluminum and 0.00015 mmol (Zr atom basis) of the solid catalyst component (E) were added. While ethylene gas was fed so as to maintain total pressure at 0.8 MPa, the polymerization reaction was performed for 1 hour at 65° C. After completion of the polymerization, the obtained polymer was washed using hexane. Then the polymer was subjected to preliminary drying at 80° C. under vacuum for 1 hour. Then the polymer was vacuum dried further for hours at 110° C. 15.6 g of polyethylene was obtained. Catalytic activity was 103.7 kg/mmol-Zr·h, and [η] was 20.0 dL/g. Average particle diameter of the fine particles composing the polymer particles was found to be 1050 nm (FIG. 17) by scanning electron microscope observation. Polymer fouling was not observed when the condition of the polymerization reactor was checked.

The obtained polyethylene was used to produce a press sheet by the same method as described in Example 1, and the stretch ratio and strength of the stretch-molded article were measured. The results are shown in Table 1.

Component (B-5)

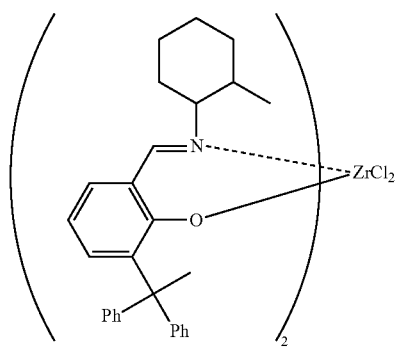

Example 10

Preparation of Component (a-4)

95.2 g (1.0 mol) of anhydrous magnesium chloride, 442 mL of dry decane, and 390.6 g (3.0 mol) of 2-ethylhexyl alcohol were loaded into a 2 L glass vessel equipped with an agitator and sufficiently purged with nitrogen. The mixture was reacted for 4 hours at 145° C. to produce a uniform transparent solution. Thereafter, this uniform transparent solution was diluted using dry decane to obtain a 0.2 mmol/mL (Mg atom basis) solution. Thereafter, 500 mL of dry toluene was loaded into a 1 L autoclave equipped with an agitator and sufficiently purged with nitrogen. Liquid temperature was maintained at 50° C., 0.80 mL of the previously obtained solution was added, 0.96 mmol of isobutyl alcohol was slowly also added dropwise, and the mixture was stirred for 15 minutes to obtain the component (a-4).

Preparation of Component (A-8)

1.68 mmol (Al atom basis) of triethylaluminum was slowly added dropwise to the entire amount of the component (a-4) obtained by the above preparation method and the fine particle component (A-8) was synthesized. Part of this reaction liquid was sampled, and average particle diameter of the fine particle measured by the dynamic light scattering method was 70 nm.

Ethylene Polymerization

Figure 18:
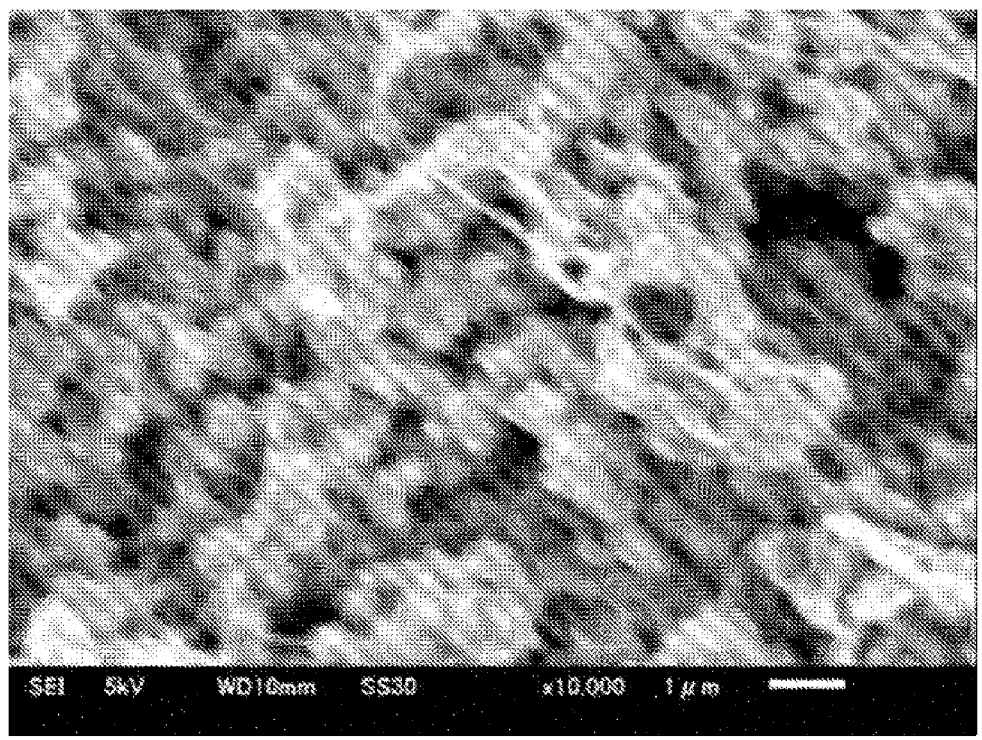
FIG. 18 is an SEM photograph of the ethylene polymer particles of Example 10.
Figure 19:
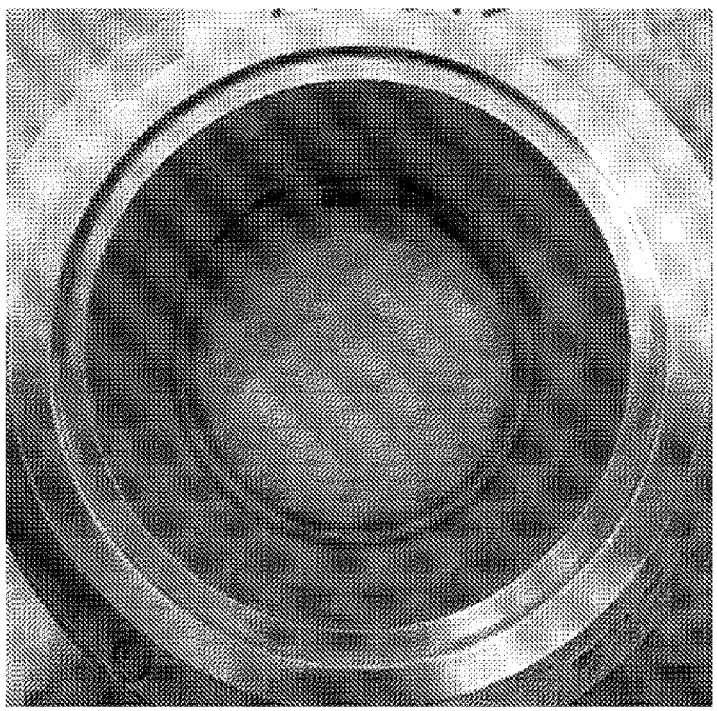
FIG. 19 is a photograph of the inside of the polymerization reactor after completion of the polymerization reaction of Example 10.

Ethylene was fed into the reaction liquid containing the component (A-8), and the liquid phase and the gas phase were saturated with ethylene. Thereafter, 0.0001 mmol (Zr atom basis) of the transition metal compound (B-2) was added, and polymerization reaction was performed for 30 minutes at 50° C. while feeding ethylene so as to reach a total pressure of 0.3 MPa. After completion of the polymerization, the obtained polymer was washed using hexane. Then the polymer was subjected to preliminary drying at 80° C. under vacuum for 1 hour. Then the polymer was vacuum dried further for 10 hours at 110° C. 14.8 g of polyethylene was obtained. Catalytic activity was 296.2 kg/mmol-Zr·h, and [η] was 29.7 dL/g. Average particle diameter of the fine particles composing the polymer particles was found to be 690 nm (FIG. 18) by scanning electron microscope observation. Polymer fouling was not observed (FIG. 19) when the condition of the polymerization reactor was checked.

The obtained polyethylene was used to produce a press sheet by the same method as described in Example 1, and the stretch ratio and strength of the stretch-molded article were measured. The results are shown in Table 1.

Example 11

Preparation of Component (a-5)

95.2 g (1.0 mol) of anhydrous magnesium chloride, 442 mL of dry decane, and 390.6 g (3.0 mol) of 2-ethylhexyl alcohol were loaded into a 2 L glass vessel equipped with an agitator and sufficiently purged with nitrogen. The mixture was reacted for 4 hours at 145° C. to produce a uniform transparent solution. Thereafter, this uniform transparent solution was diluted using dry decane to obtain a 0.2 mmol/mL (Mg atom basis) solution. Thereafter, 500 mL of dry heptane was loaded into a 1 L autoclave equipped with an agitator and sufficiently purged with nitrogen. Liquid temperature was maintained at 50° C., 0.8 mL of the previously obtained solution was added, 0.96 mmol of isobutyl alcohol was slowly also added dropwise, and the mixture was stirred for 15 minutes to obtain the component (a-5).

Preparation of Component (A-9)

1.68 mmol (Al atom basis) of triethylaluminum was slowly added dropwise to the entire amount of the component (a-5) obtained by the above preparation method and the fine particle component (A-9) was synthesized. Part of this reaction liquid was sampled, and average particle diameter of the fine particle measured by the dynamic light scattering method was 80 nm.

Ethylene Polymerization

Figure 20:
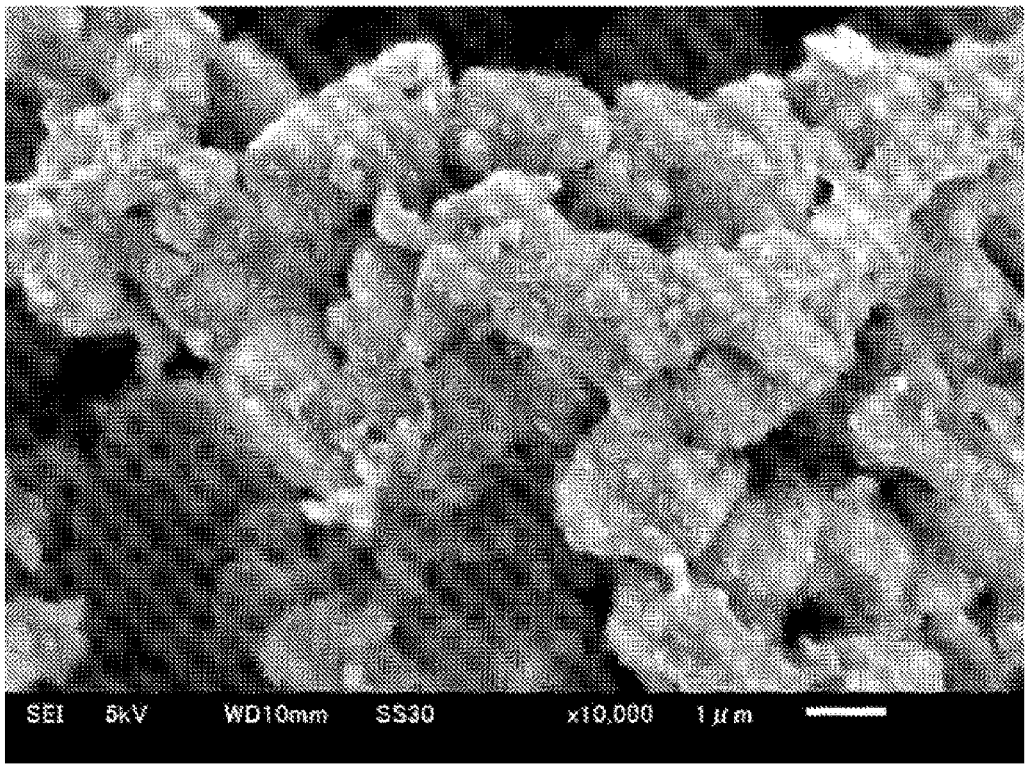
FIG. 20 is an SEM photograph of the ethylene polymer particles of Example 11.
Figure 21:
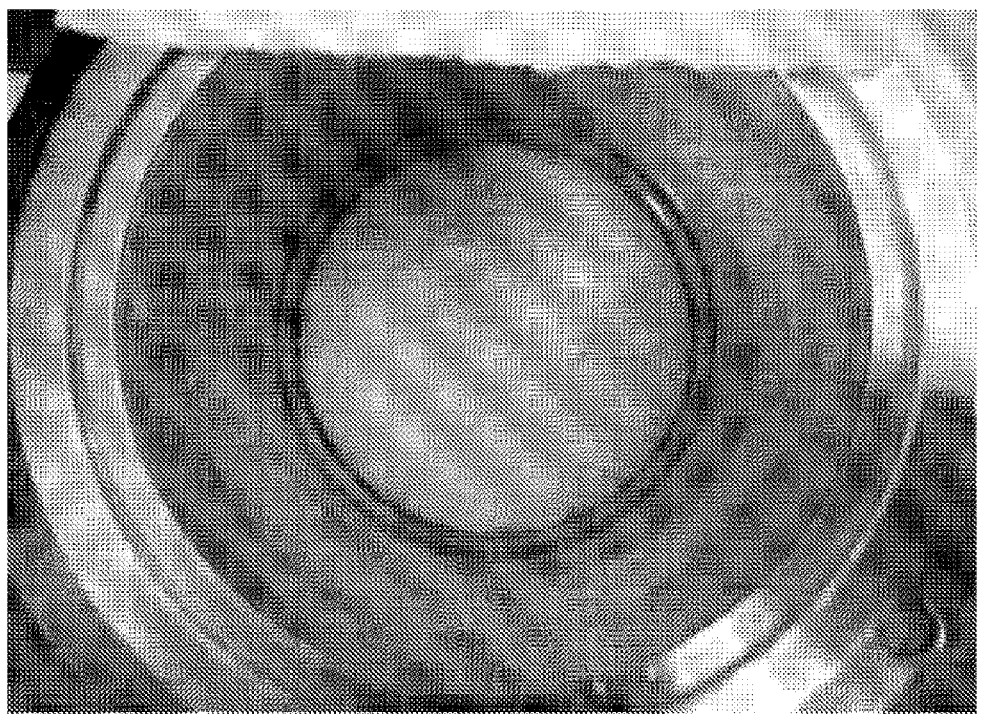
FIG. 21 is a photograph of the inside of the polymerization reactor after completion of the polymerization reaction of Example 11.

Ethylene was fed into the reaction liquid containing the component (A-9), and the liquid phase and the gas phase were saturated with ethylene. Thereafter, 0.0001 mmol (Zr atom basis) of the transition metal compound (B-2) was added, and polymerization reaction was performed for 30 minutes at 50° C. while feeding ethylene so as to reach a total pressure of 0.3 MPa. After completion of the polymerization, the obtained polymer was washed using hexane. Then the polymer was subjected to preliminary drying at 80° C. under vacuum for 1 hour. Then the polymer was vacuum dried further for 10 hours at 110° C. 22.6 g of polyethylene was obtained. Catalytic activity was 452.0 kg/mmol-Zr·h, and [η] was 28.6 dL/g. Average particle diameter of the fine particles composing the polymer particles was found to be 840 nm (FIG. 20) by scanning electron microscope observation. Polymer fouling was not observed (FIG. 21) when the condition of the polymerization reactor was checked.

The obtained polyethylene was used to produce a press sheet by the same method as described in Example 1, and the stretch ratio and strength of the stretch-molded article were measured. The results are shown in Table 1.

Example 12

Preparation of Component (A-10)

500 mL of dry toluene was loaded into a 1 L autoclave equipped with an agitator and sufficiently purged with nitrogen. Liquid temperature was maintained at 50° C., and 0.24 mmol (Mg atom basis) of the component (a-1) synthesized in the same manner as Example 1 was added. Thereafter, 0.96 mmol (Al atom basis) of triisobutylaluminum was slowly added dropwise to synthesize the fine particle component (A-10). Part of this reaction liquid was sampled, and average particle diameter of the fine particle measured by the dynamic light scattering method was 40 nm.

Ethylene Polymerization

Figure 22:
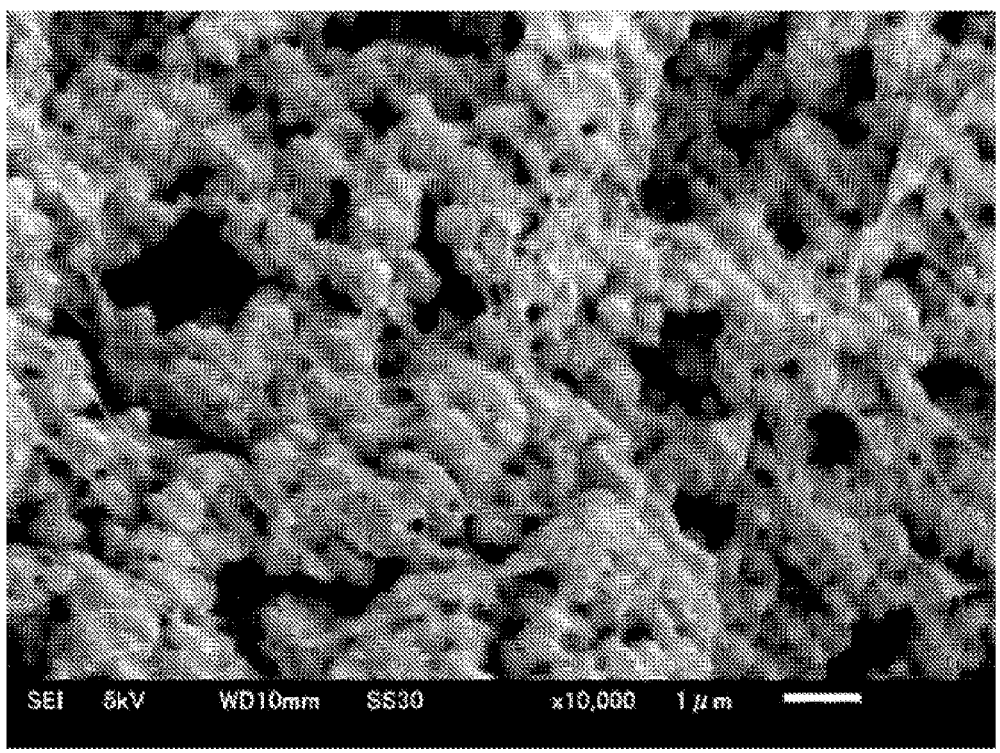
FIG. 22 is an SEM photograph of the ethylene polymer particles of Example 12.
Figure 23:
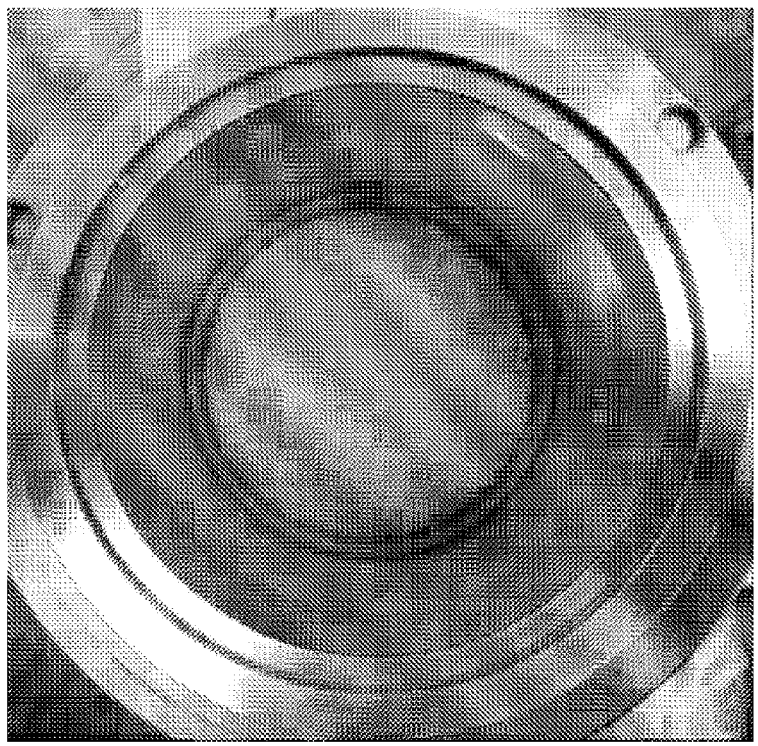
FIG. 23 is a photograph of the inside of the polymerization reactor after completion of the polymerization reaction of Example 12.

Ethylene was fed into the reaction liquid containing the component (A-10), and the liquid phase and the gas phase were saturated with ethylene. Thereafter, 0.0003 mmol (Zr atom basis) of the transition metal compound (B-2) was loaded. While ethylene gas containing 1,000 ppm of hydrogen was fed at an ethylene flow rate of 0.5 L/minute, the polymerization reaction was performed for 15 minutes at 50° C. After completion of the reaction, the reactor was depressurized, and then while ethylene was fed to be a total pressure of 0.3 MPa, the polymerization reaction was performed for 25 minutes at 50° C. After completion of the polymerization, the obtained polymer was washed using hexane. Then the polymer was subjected to preliminary drying at 80° C. under vacuum for 1 hour. Then the polymer was vacuum dried further for hours at 110° C. 41.8 g of polyethylene was obtained. Catalytic activity was 209.0 kg/mmol-Zr·h. [η] of polyethylene obtained in step (a) was 18.2 dL/g, and total [η] was 33.9 dL/g. Average particle diameter of the fine particles composing the polymer particles was found to be 305 nm (FIG. 22) by scanning electron microscope observation. Polymer fouling was not observed (FIG. 23) when the condition of the polymerization reactor was checked.

The obtained polyethylene was used to produce a press sheet by the same method as described in Example 1, and the stretch ratio and strength of the stretch-molded article were measured. The results are shown in Table 2.

Example 13

Ethylene Polymerization

Figure 24:
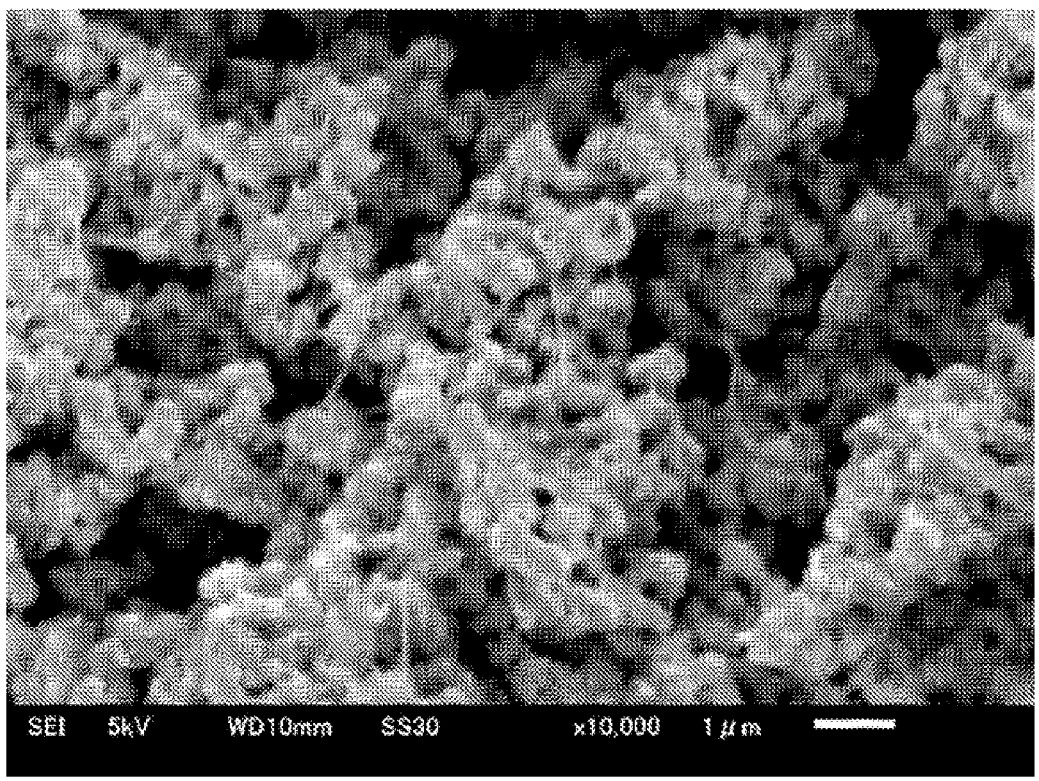
FIG. 24 is an SEM photograph of the ethylene polymer particles of Example 13.
Figure 25:
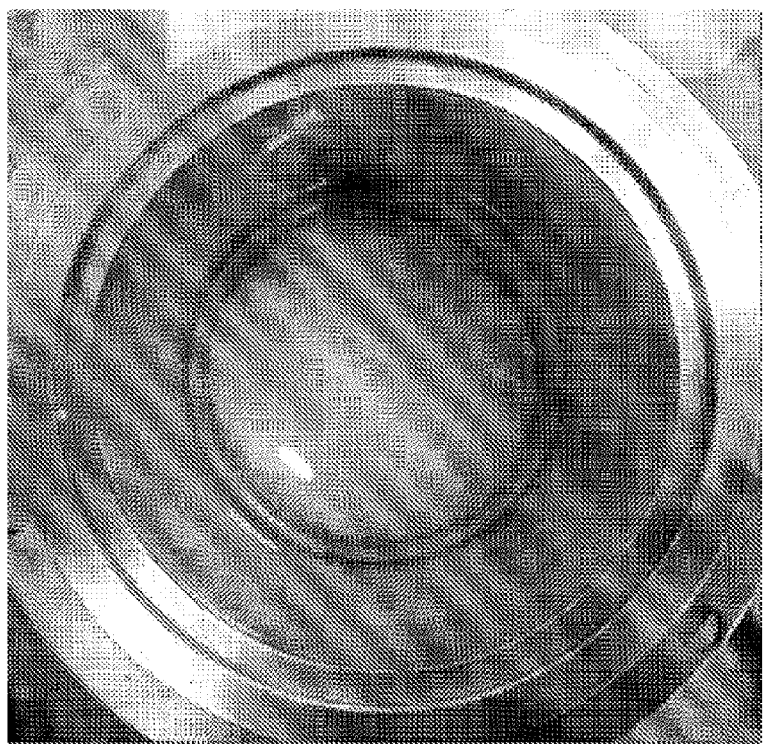
FIG. 25 is a photograph of the inside of the polymerization reactor after completion of the polymerization reaction of Example 13.

Ethylene was fed into the reaction liquid containing the component (A-10), and the liquid phase and the gas phase were saturated with ethylene. Thereafter, 0.0003 mmol (Zr atom basis) of the transition metal compound (B-2) was loaded. While ethylene gas containing 2,000 ppm of hydrogen was fed at an ethylene flow rate of 0.5 L/minute, the polymerization reaction was performed for 15 minutes at 50° C. After completion of the reaction, the reactor was depressurized, and then while ethylene was fed to be a total pressure of 0.3 MPa, the polymerization reaction was performed for 31 minutes at 50° C. After completion of the polymerization, the obtained polymer was washed using hexane. Then the polymer was subjected to preliminary drying at 80° C. under vacuum for 1 hour. Then the polymer was vacuum dried further for hours at 110° C. 34.3 g of polyethylene was obtained. Catalytic activity was 149.0 kg/mmol-Zr·h. [η] of polyethylene obtained in step (a) was 20.8 dL/g, and total [η] was 34.7 dL/g. Average particle diameter of the fine particles composing the polymer particles was found to be 257 nm (FIG. 24) by scanning electron microscope observation. Polymer fouling was not observed (FIG. 25) when the condition of the polymerization reactor was checked.

The obtained polyethylene was used to produce a press sheet by the same method as described in Example 1, and the stretch ratio and strength of the stretch-molded article were measured. The results are shown in Table 2.

Example 14

Ethylene Polymerization

Figure 26:
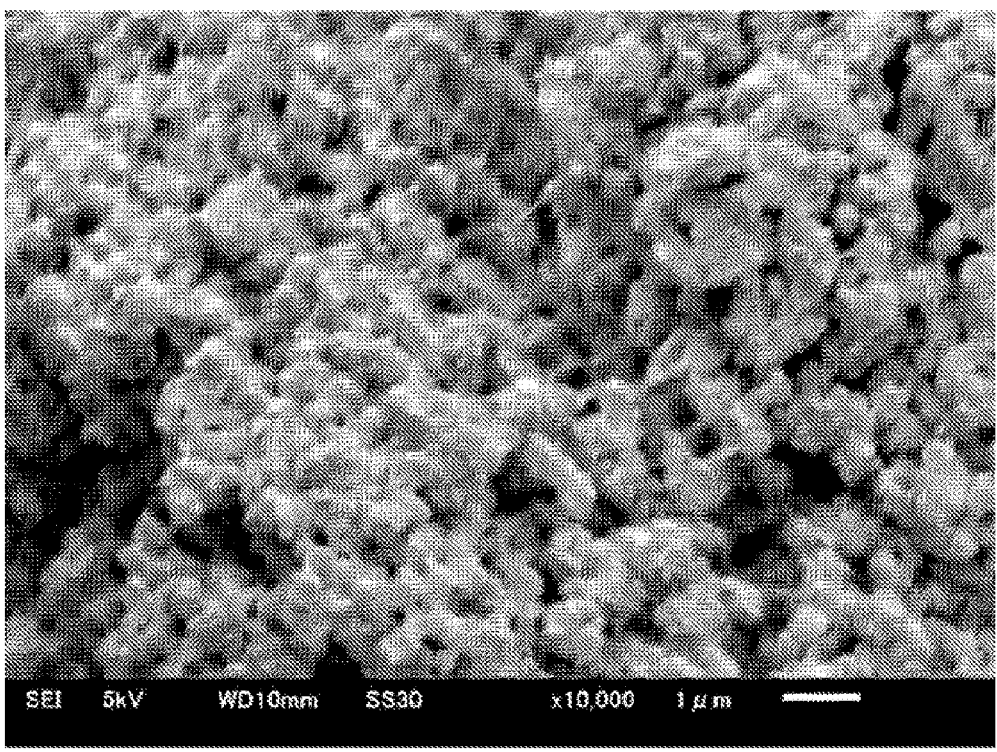
FIG. 26 is an SEM photograph of the ethylene polymer particles of Example 14.
Figure 27:
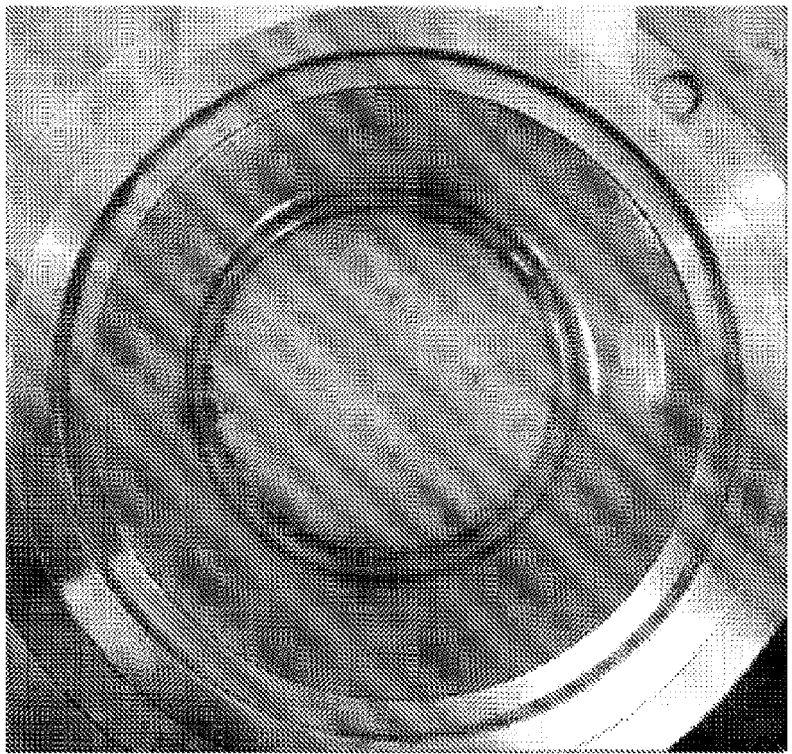
FIG. 27 is a photograph of the inside of the polymerization reactor after completion of the polymerization reaction of Example 14.

Ethylene was fed into the reaction liquid containing the component (A-10), and the liquid phase and the gas phase were saturated with ethylene. Thereafter, 0.0003 mmol (Zr atom basis) of the transition metal compound (B-2) was loaded. While ethylene gas containing 1,000 ppm of hydrogen was fed at an ethylene flow rate of 0.5 L/minute, the polymerization reaction was performed for 7.5 minutes at 50° C. After completion of the reaction, the reactor was depressurized, and then while ethylene was fed to be a total pressure of 0.3 MPa, the polymerization reaction was performed for 23 minutes at 50° C. After completion of the polymerization, the obtained polymer was washed using hexane. Then the polymer was subjected to preliminary drying at 80° C. under vacuum for 1 hour. Then the polymer was vacuum dried further for hours at 110° C. 42.7 g of polyethylene was obtained. Catalytic activity was 280.2 kg/mmol-Zr·h. [η] of polyethylene obtained in step (a) was 18.2 dL/g, and total [η] was 34.1 dL/g. Average particle diameter of the fine particles composing the polymer particles was found to be 286 nm (FIG. 26) by scanning electron microscope observation. Polymer fouling was not observed (FIG. 27) when the condition of the polymerization reactor was checked.

The obtained polyethylene was used to produce a press sheet by the same method as described in Example 1, and the stretch ratio and strength of the stretch-molded article were measured. The results are shown in Table 2.

Comparative Example 1

Figure 28:
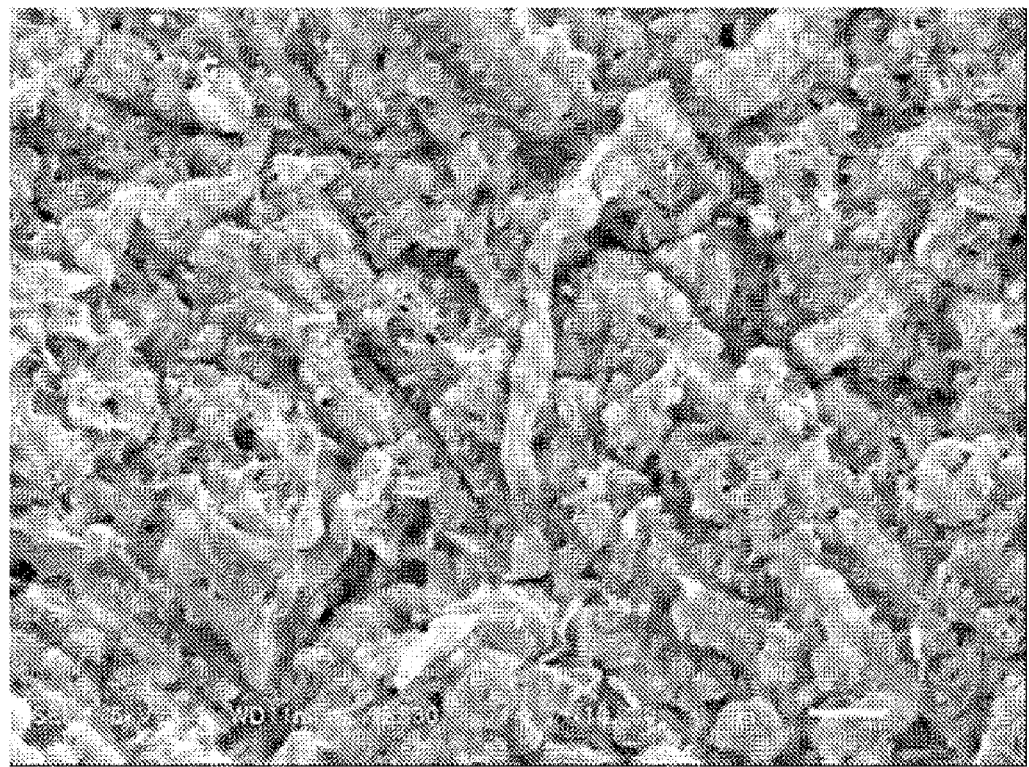
FIG. 28 is an SEM photograph of the ethylene polymer of Comparative Example 1.

500 mL of dry toluene was loaded into a 1 L glass vessel equipped with an agitator and sufficiently purged with nitrogen. Then ethylene was fed, and the liquid phase and the gas phase were saturated with ethylene. Liquid temperature was lowered to 5° C., and 0.50 mmol (Al atom basis) of methylaluminoxane (sometimes referred to hereinafter as MAO) and 0.0008 mmol (Zr atom basis) of the transition metal compound (B-1) were added, and the polymerization reaction was performed for 30 minutes at 10° C. After completion of the polymerization, the reaction mixture was charged into 2 L of methanol to which hydrochloric acid had been added, and the entire mass of polymer was made to precipitate. After recovery by filtration, the polymer was subjected to preliminary drying at 80° C. under vacuum for 1 hour. Then, the polymer was vacuum dried further for 10 hours at 110° C. 5.5 g of polyethylene was obtained. Catalytic activity was 24.9 kg/mmol-Zr·h, and [η] was 38.5 dL/g. When the obtained polymer particles were observed using a scanning electron microscope, agglomerates having fine-particle morphology were not observed (FIG. 28).

The obtained polyethylene was used to produce a press sheet by the same method as described in Example 1, and the stretch ratio and strength of the stretch-molded article were measured. The results are shown in Table 3.

Figure 29:
FIG. 29 is a photograph of the inside of the polymerization reactor after completion of the polymerization reaction of Comparative Example 1.

The phenomenon of attachment of the polymer to the polymerization reactor wall, i.e. so-called fouling, occurred for the present catalyst system (FIG. 29). Moreover, stretchability of the obtained polyethylene was low, and strength of the stretch-molded article was low.

Comparative Example 2

Figure 30:
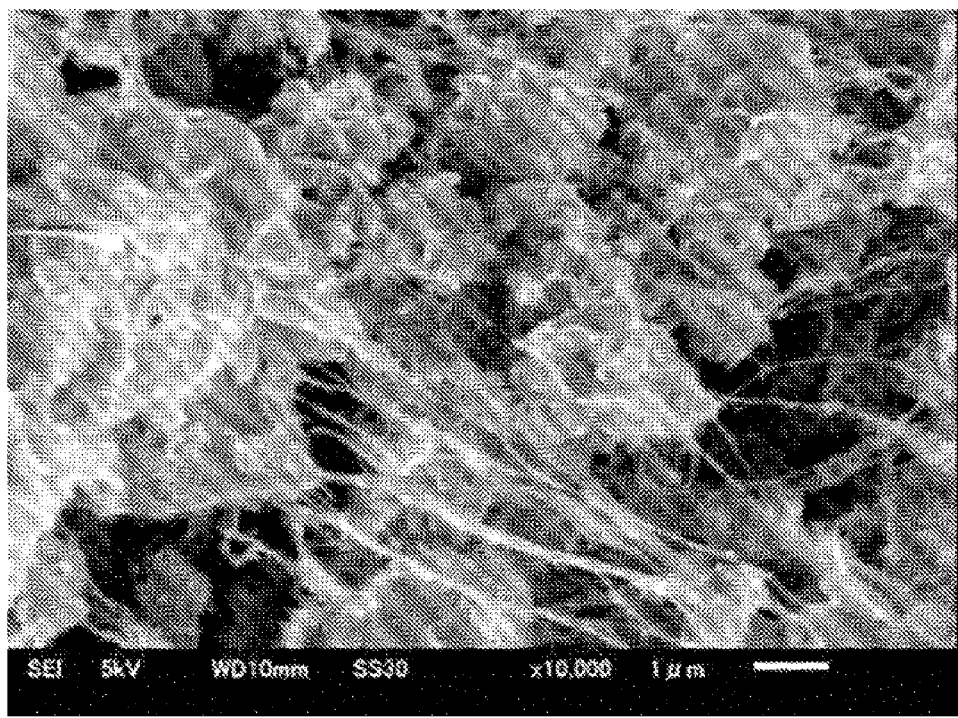
FIG. 30 is an SEM photograph of the ethylene polymer of Comparative Example 2.

500 mL of dry toluene was loaded into a 1 L autoclave equipped with an agitator and sufficiently purged with nitrogen. Then ethylene gas was fed to saturate the liquid phase and gas phase. Thereafter, 1.25 mmol (Al atom basis) of methylaluminoxane and 0.001 mmol (Ti atom basis) of the transition metal compound (B-4) were added, and the polymerization reaction was performed for 30 minutes at 50° C. while feeding ethylene so as to reach a total pressure of 0.3 MPa. After completion of the polymerization, the reaction mixture was charged into 2 L of methanol to which hydrochloric acid had been added, and the entire mass of polymer was made to precipitate. After recovery by filtration, the polymer was subjected to preliminary drying at 80° C. under vacuum for 1 hour. Then, the polymer was vacuum dried further for 10 hours at 110° C. 9.9 g of polyethylene was obtained. Catalytic activity was 19.5 kg/mmol-Ti·h, and [η] was 36.5 dL/g. When the obtained polymer particles were observed using a scanning electron microscope, agglomerates having fine-particle morphology were not observed (FIG. 30).

The obtained polyethylene was used to produce a press sheet by the same method as described in Example 1, and the stretch ratio and strength of the stretch-molded article were measured. The results are shown in Table 3.

Figure 31:
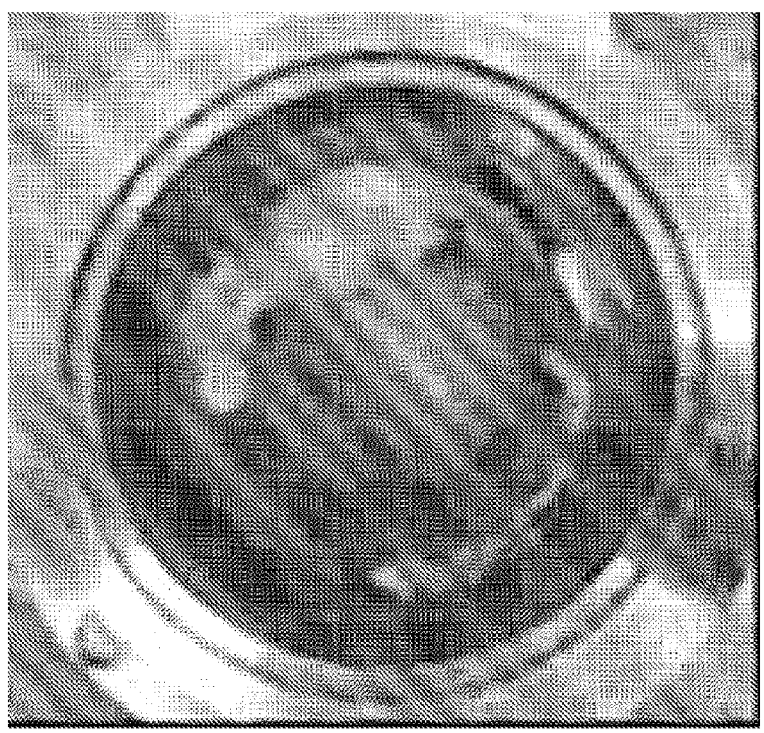
FIG. 31 is a photograph of the inside of the polymerization reactor after completion of the polymerization reaction of Comparative Example 2.

Stretchability of the obtained polyethylene and strength of the stretch-molded article were high. However, the phenomenon of attachment of the polymer to the polymerization reactor wall, i.e. so-called fouling, occurred for the present catalyst system (FIG. 31).

Comparative Example 3

Preparation of Solid Component (W)

Under flowing nitrogen, 30 g of silica gel ($SiO_2$) (5 μm average particle diameter, dried for 5 hours at 150° C.) was suspended in 470 mL of dry toluene. Thereafter, in an ice bath, 130 mL of a toluene solution of methylaluminoxane (3.07 mmol/mL, Al atom basis) was added dropwise over 30 minutes at 0° C. After completion of dropwise addition, the mixture was stirred for 30 minutes in the ice bath. Thereafter, the mixture was heated to 95° C. and was allowed to react for 4 hours. After completion of the reaction, the supernatant liquid was removed by decantation, and the obtained solid component was washed three times using dry toluene to prepare a toluene slurry of the solid component (W).

A part of the solid component (W) obtained was collected to examine the concentration. It was found that the slurry concentration was 0.15 g/mL, and Al concentration was 1.20 mmol/mL, Al/Si ratio was 0.81 (mole ratio). Average particle diameter by Coulter counter was 5.3 μm.

Preparation of Solid Catalyst Component (X)

150 mL of dry toluene was loaded into a 300 mL glass vessel equipped with an agitator and sufficiently purged with nitrogen. Then 1.34 g (solids basis) of the toluene slurry of the solid component (W) prepared in the above was added. Thereafter, 40.0 mL of a toluene solution of the transition metal compound (B-1) (0.001 mmol/mL, Zr atom basis) was added dropwise, and the mixture was reacted for 1 hour at room temperature. After completion of the reaction, the supernatant liquid was removed by decantation, and the obtained solid component was washed three times using dry toluene and two times using dry decane to prepare a decane slurry of the solid catalyst component (X). A part of the decane slurry of the solid catalyst component (X) obtained was collected to examine the concentration. It was found that Zr concentration was 0.000363 mmol/mL, and Al concentration was 0.0919 mmol/mL.

Figure 32:
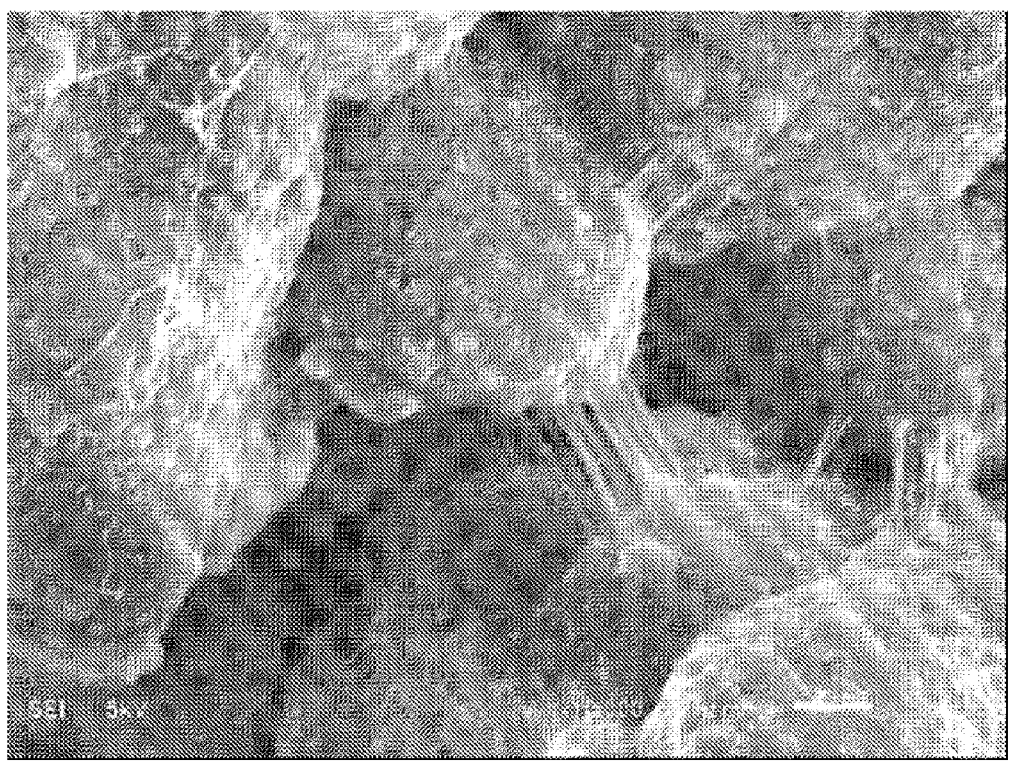
FIG. 32 is an SEM photograph of the ethylene polymer of Comparative Example 3.
Figure 33:
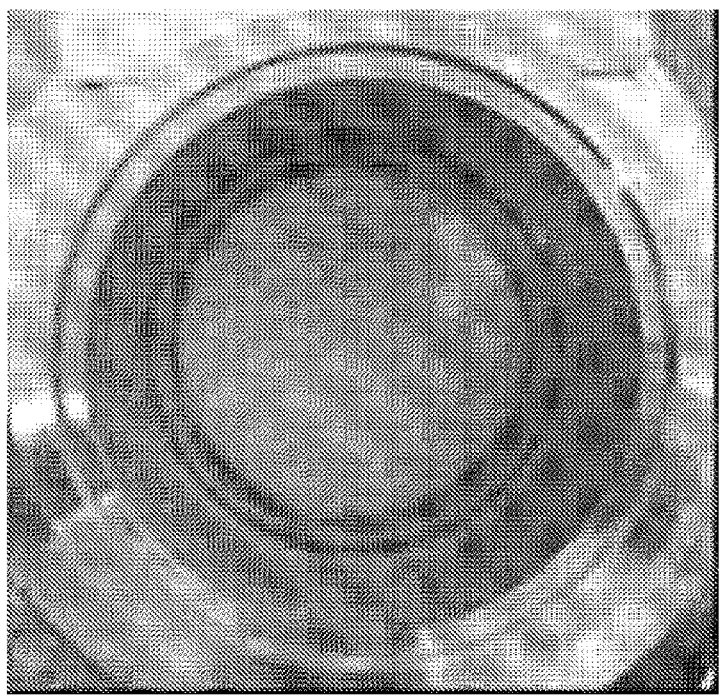
FIG. 33 is a photograph of the inside of the polymerization reactor after completion of the polymerization reaction of Comparative Example 3.

Ethylene Polymerization 500 mL of dry heptane was loaded into a 1 L autoclave equipped with an agitator and sufficiently purged with nitrogen. Then ethylene was fed, and the liquid phase and the gas phase were saturated with ethylene. Thereafter, 0.35 mmol (Al atom basis) of triisobutylaluminum and 0.002 mmol (Zr atom basis) of the solid catalyst component (X) prepared in the aforementioned manner were added. After 25 mL of hydrogen was further added, the polymerization reaction was performed for 1 hour at 50° C. while ethylene was fed so as to maintain total pressure at 0.8 MPa. After completion of the polymerization, the obtained polymer was washed using hexane. Then the polymer was subjected to preliminary drying at 80° C. under vacuum for 1 hour. Then the polymer was vacuum dried further for 10 hours at 110° C. 63.1 g of polyethylene was obtained. Catalytic activity was 31.6 kg/mmol-Zr·h, and [η] was 19.2 dL/g. When the obtained polymer particles were observed using a scanning electron microscope, agglomerates having fine-particle morphology were not observed (FIG. 32). Polymer fouling was not observed (FIG. 33) when the condition of the polymerization reactor was checked.

The obtained polyethylene was used to produce a press sheet by the same method as described in Example 1, and the stretch ratio and strength of the stretch-molded article were measured. The results are shown in Table 3. The obtained polyethylene had low stretchability, and strength of the stretch-molded article was low.

Comparative Example 4

Preparation of Solid Component (Y)

95.2 g (1.0 mol) of anhydrous magnesium chloride, 442 mL of dry decane, and 390.6 g (3.0 mol) of 2-ethylhexyl alcohol were loaded into a 2 L glass vessel equipped with an agitator and sufficiently purged with nitrogen. The mixture was reacted for 4 hours at 145° C. to produce a uniform transparent solution. Thereafter, 100 mL (100 mmol, Mg atom basis) of the uniform transparent solution and 610 mL of dry decane were added to another 1 L glass vessel equipped with an agitator and sufficiently purged with nitrogen. While the mixture was strongly stirred using a homogenizer (model CLEARMIX CLM-1.5S, manufactured by M Technique Co., Ltd.) at a rotation rate of 10,000 rpm and while liquid temperature was maintained at 0° C., 104 mmol of triethylaluminum was slowly added dropwise. Thereafter, the liquid temperature was raised to 80° C. over 4 hours, and while temperature was maintained at 80° C., 202 mmol of triethylaluminum was again slowly added dropwise. The mixture was reacted further for 1 hour. After completion of the reaction, the solid portion was recovered by filtration and washed sufficiently using dry toluene. Then 200 mL of dry toluene was added to produce a toluene slurry of the solid component (Y). Part of this toluene slurry was sampled, and particle diameter of the solid component (Y) measured by the dynamic light scattering method was 750 nm.

Preparation of Solid Catalyst Component (Z)

100 mL of dry toluene was loaded into a 300 mL glass vessel equipped with an agitator and sufficiently purged with nitrogen. 5.0 mmol (Mg atom basis) of the toluene slurry of the solid component (Y) prepared as above were added. Thereafter, 7.0 mL of a toluene solution of transition metal compound (B-2) (0.001 mmol/mL, Zr atom basis) was added dropwise, and the mixture was reacted for 1 hour at room temperature. After completion of the reaction, the supernatant liquid was removed by decantation, and the obtained solid component was washed three times using dry toluene and two times using dry decane to prepare a decane slurry of the solid catalyst component (Z). A part of the decane slurry of the solid catalyst component (Z) obtained was collected to examine the concentration. It was found that Zr concentration was 0.000234 mmol/mL.

Figure 34:
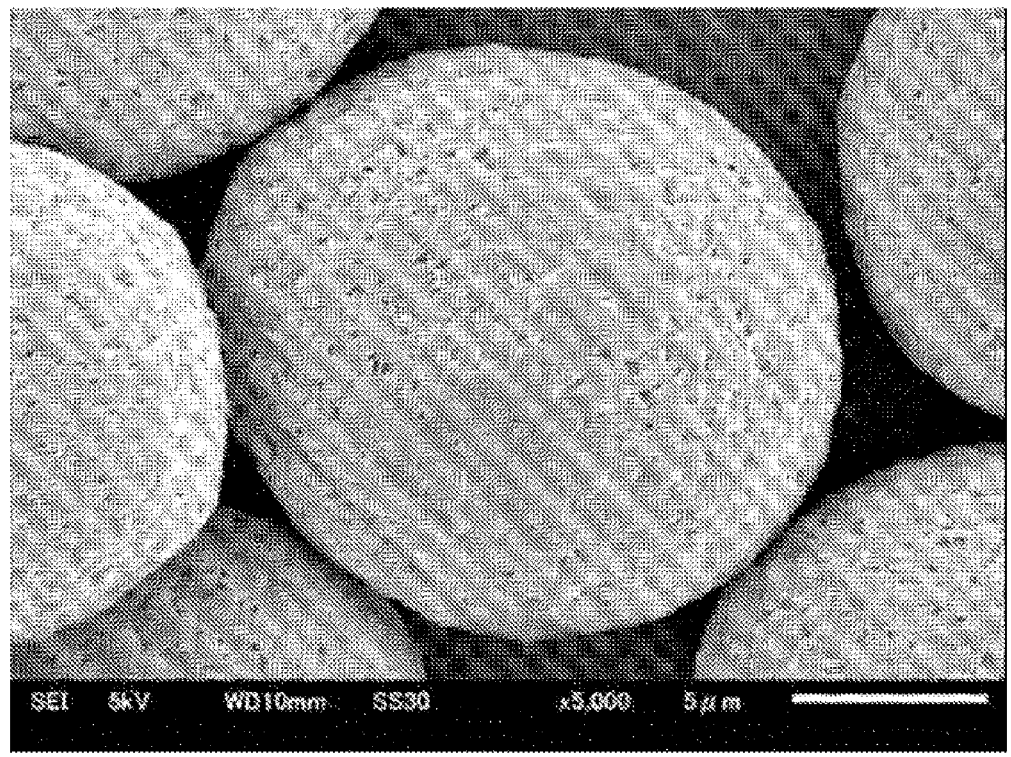
FIG. 34 is an SEM photograph of the ethylene polymer of Comparative Example 4.
Figure 35:
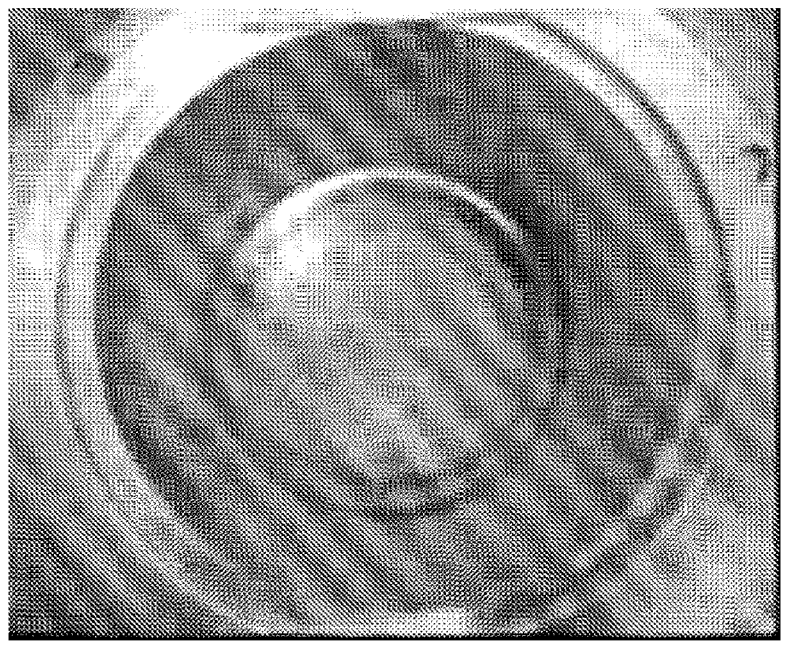
FIG. 35 is a photograph of the inside of the polymerization reactor after completion of the polymerization reaction of Comparative Example 4.

Ethylene Polymerization 500 mL of dry heptane was loaded into a 1 L autoclave equipped with an agitator and sufficiently purged with nitrogen. Then ethylene was fed, and the liquid phase and the gas phase were saturated with ethylene. Thereafter, 1.00 mmol (Al atom basis) of triethylaluminum and 0.0001 mmol (Zr atom basis) of the solid catalyst component (Z) were added. While ethylene was fed so as to maintain total pressure at 0.8 MPa, the polymerization reaction was performed for 3 hours at 70° C. After completion of the polymerization, the obtained polymer was washed using hexane. Then the polymer was subjected to preliminary drying at 80° C. under vacuum for 1 hour. Then the polymer was vacuum dried further for 10 hours at 110° C. 49.9 g of polyethylene was obtained. Catalytic activity was 166.2 kg/mmol-Zr·h, and [η] was 27.5 dL/g. When the obtained polymer particles were observed using a scanning electron microscope, agglomerates having fine-particle morphology were not observed (FIG. 34). Polymer fouling was not observed (FIG. 35) when the condition of the polymerization reactor was checked.

The obtained polyethylene was used to produce a press sheet by the same method as described in Example 1, and the stretch ratio and strength of the stretch-molded article were measured. The results are shown in Table 3. The obtained polyethylene had low stretchability, and strength of the stretch-molded article was low.

TABLE 1

| | Support | | | | | |
|---|---|---|---|---|---|---|
| | Type | Particle diameter (nm) | Complex | Temperature ° C. | Pressure MPa | Time min |
| Example 1 | A-1 | 40 | B-1 | 10 | atm. pressure | 30 |
| Example 2 | A-2 | 40 | B-1 | 50 | 0.8 | 30 |
| Example 3 | A-3 | 40 | B-2 | 50 | 0.3 | 30 |
| Example 4 | A-3 | 40 | B-2 | 65 | 0.3 | 30 |
| Example 5 | A-4 | 30 | B-3 | 50 | 0.3 | 30 |
| Example 6 | A-5 | 50 | B-3 | 50 | 0.3 | 30 |
| Example 7 | A-6 | 40 | B-4 | 50 | 0.8 | 30 |
| Example 8 | A-5 | 50 | B-4 | 50 | 0.8 | 30 |
| Example 9 | A-7 | 150 | B-5 | 65 | 0.8 | 60 |
| Example 10 | A-8 | 70 | B-2 | 50 | 0.3 | 30 |
| Example 11 | A-9 | 80 | B-2 | 50 | 0.3 | 30 |

| | Activity kg/mmol·h | [η] dL/g | Fine particle diameter nm | Stretch Ratio fold | Strength GPa | Fouling |
|---|---|---|---|---|---|---|
| Example 1 | 22.3 | 18.7 | 190 | 180 | 3.2 | ◯ |
| Example 2 | 314.0 | 26.7 | 390 | 209 | 2.8 | ◯ |
| Example 3 | 348.4 | 34.8 | 300 | 186 | 2.7 | ◯ |
| Example 4 | 304.0 | 28.4 | 310 | 194 | 3.2 | ◯ |
| Example 5 | 38.0 | 23.8 | 250 | 197 | 4.2 | ◯ |
| Example 6 | 49.8 | 24.8 | 220 | 183 | 3.2 | ◯ |
| Example 7 | 17.3 | 23.8 | 150 | 195 | 4.3 | ◯ |
| Example 8 | 26.5 | 27.5 | 230 | 192 | 3.9 | ◯ |
| Example 9 | 103.7 | 20 | 1050 | 167 | 2.1 | ◯ |
| Example 10 | 296.2 | 29.7 | 690 | 173 | 3.1 | ◯ |
| Example 11 | 452.0 | 28.6 | 840 | 176 | 2.6 | ◯ |

TABLE 2

| | Support | | | Step (a) temp. ° C. | Step (b) temp. ° C. | Step (a) flow rate L/min | Step (b) pressure MPa | Step (a) time min | Step (b) time min |
|---|---|---|---|---|---|---|---|---|---|
| | Type | Particle diameter (nm) | Complex | | | | | | |
| Example 12 | A-10 | 40 | B-2 | 50 | 50 | 0.5 | 0.3 | 15 | 25 |
| Example 13 | A-10 | 40 | B-2 | 50 | 50 | 0.5 | 0.3 | 15 | 31 |
| Example 14 | A-10 | 40 | B-2 | 50 | 50 | 0.5 | 0.3 | 7.5 | 23 |

TABLE 2-continued

|  | Activity kg/mmol·h | Step (a) [η] dL/g | Total [η] dL/g | Fine particle diameter nm | Stretch Ratio fold | Strength GPa | Fouling |
|---|---|---|---|---|---|---|---|
| Example 12 | 209.0 | 18.2 | 33.9 | 305 | 193 | 3.5 | ○ |
| Example 13 | 149.0 | 20.8 | 34.7 | 257 | 181 | 3.3 | ○ |
| Example 14 | 280.2 | 18.2 | 34.1 | 286 | 184 | 3.4 | ○ |

TABLE 3

| | Support | | | | | |
|---|---|---|---|---|---|---|
| | Type | Particle diameter (nm) | Complex | Temperature °C. | Pressure MPa | Time min |
| Comparative Example 1 | — | — | B-1 | 10 | atm. pressure | 30 |
| Comparative Example 2 | — | — | B-4 | 50 | 0.3 | 30 |
| Comparative Example 3 | W | 5300 | B-1 | 50 | 0.8 | 60 |
| Comparative Example 4 | Y | 750 | B-2 | 70 | 0.8 | 180 |

| | Activity kg/mmol·h | [η] dL/g | Fine particle diameter nm | Stretch Ratio fold | Strength GPa | Fouling |
|---|---|---|---|---|---|---|
| Comparative Example 1 | 24.9 | 38.5 | not observed | 147 | 2.2 | X |
| Comparative Example 2 | 19.5 | 36.5 | not observed | 162 | 3.5 | X |
| Comparative Example 3 | 31.6 | 19.2 | not observed | 116 | 1.4 | ○ |
| Comparative Example 4 | 166.2 | 27.5 | not observed | 103 | 1.3 | ○ |

As made clear by comparison of the examples and comparative examples, no fouling was observed by the ultrahigh molecular weight polyethylene polymerized in the examples of the present invention, and thus there is the possibility of industrial production of the ethylene-based polymer particles, and there was a tendency for strength of the obtained stretch-molded article to be high.

INDUSTRIAL APPLICABILITY

By use of the method of production of ethylene-based polymer particles according to the present invention, fouling of the polymerization reactor walls and agitator blade by the ethylene-based polymer particles can be suppressed to the minimum degree, and this is economically advantageous in industrial production due to lack of plant shutdown or the like. Moreover, when the ethylene-based polymer particles obtained by this method are stretch-molded, a high strength molded article can be obtained. Thus the ethylene-based polymer particles can be used advantageously for a battery separator, gel spun fiber, sheet, or the like.

Since strength is particularly high for a stretch-molded article formed using the solid-phase stretch-molding method, use for solid-phase stretch-molding applications is advantageous.

The invention claimed is:
1. A method of production of ethylene-based polymer particles; wherein the method comprises the step of: homopolymerizing ethylene or copolymerizing ethylene and a linear or branched α-olefin having 3 to 20 carbon atoms in the presence of an olefin polymerization catalyst comprising:
(A) fine particles having an average particle diameter greater than or equal to 1 nm and less than or equal to 300 nm obtained at least by the following two steps:
(Step 1) causing contact between a metal halide and an alcohol in a hydrocarbon solvent wherein the alcohol is a combination of two types of alcohols selected from alcohols having 1 to 25 carbon atoms and difference in carbon number of the two types of alcohols is greater than or equal to 4;
(Step 2) causing contact between a component obtained by (Step 1) and an organoaluminum compound and/or an organoaluminumoxy compound; and
(B) a transition metal compound represented in following General Formula (I) or (II):

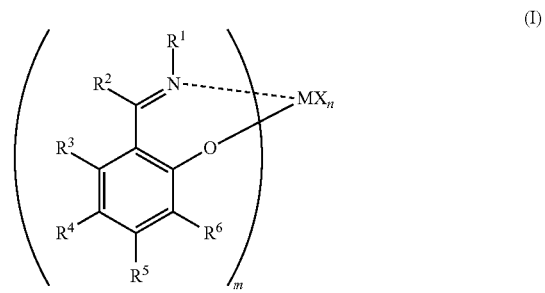

(I)

wherein in Formula (I), M is a transition metal atom of Group 4 or 5 in the periodic table;
m is an integer ranging from 1 to 4;
$R^1$ to $R^5$ are the same or different and are a hydrogen atom, halogen atom, hydrocarbon group, heterocyclic compound residue, oxygen-containing group, nitrogen-containing group, boron-containing group, sulfur-containing group, phosphorous-containing group, silicon-containing group, germanium-containing group, or tin-containing group, wherein a ring is optionally formed by bonding together of at least 2 such groups;
$R^6$ is selected from the group consisting of a hydrogen atom, hydrocarbon groups having 1 to 4 carbon atoms and composed of only primary or secondary carbon atoms, aliphatic hydrocarbon groups having at least 4 carbon atoms, aryl group-substituted alkyl groups, monocyclic or bicyclic alicyclic hydrocarbon groups, aromatic hydrocarbon groups, and halogen atoms;
n is a number satisfying valence number of M;
X is a hydrogen atom, halogen atom, hydrocarbon group, oxygen-containing group, sulfur-containing group, nitrogen-containing group, boron-containing group, aluminum-containing group, phosphorous-containing group, halogen-containing group, heterocyclic compound residue, silicon-containing group, germanium-containing group, or tin-containing group; wherein multiple groups indicated by X may be the same or different when n is greater than or equal to 2; and optionally multiple groups indicated by X form a ring by mutual bonding

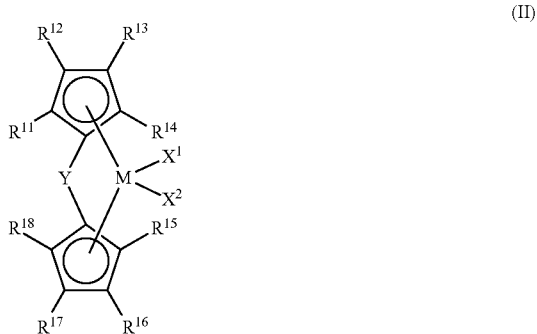

(II)

wherein in Formula (II), M is titanium, zirconium, or hafnium;

$R^{11}$ to $R^{18}$ may be the same or different and are a hydrogen atom, halogen atom, hydrocarbon group, heterocyclic compound residue, oxygen-containing group, nitrogen-containing group, boron-containing group, sulfur-containing group, phosphorous-containing group, silicon-containing group, germanium-containing group, or tin-containing group, wherein two or more adjacent groups may be optionally bonded together to form a ring;

$X^1$ and $X^2$ are the same or different and are a hydrocarbon group, oxygen-containing group, sulfur-containing group, silicon-containing group, hydrogen atom, or halogen atom; and Y is a divalent hydrocarbon group, divalent halogenated hydrocarbon group, divalent silicon-containing group, divalent germanium-containing group, divalent tin-containing group, —O—, —CO—, —S—, —SO—, —SO$_2$—, —Ge—, —Sn—, —NR—, —P(R)—, —P(O)(R)—, —BR—, or —AlR— wherein R is the same or different and is a hydrogen atom, halogen atom, hydrocarbon group, halogenated hydrocarbon group, or alkoxy group; and wherein an intrinsic viscosity [η] of the ethylene-based polymer particles, measured in decalin at 135° C., is from 5 to 50 dL/g.

2. The method of production of ethylene-based polymer particles according to claim 1; wherein the two types of alcohols are a combination of an alcohol having 2 to 12 carbon atoms and an alcohol having 13 to 25 carbon atoms.

3. The method of production of ethylene-based polymer particles according to claim 1; wherein the two types of alcohols are a combination of two types of alcohols selected from alcohols having 2 to 12 carbon atoms.

4. The method of production of ethylene-based polymer particles according to claim 1; wherein M in General Formula (I) of the transition metal compound (B) is a transition metal atom of Group 4 in the periodic table;

m is 2;

$R^1$ is a group selected from linear or branched hydrocarbon groups having 1 to 20 carbon atoms, alicyclic hydrocarbon groups having 3 to 20 carbon atoms, and aromatic hydrocarbon groups having 6 to 20 carbon atoms;

$R^2$ to $R^5$ may be the same or different and are a hydrogen atom, halogen atom, or hydrocarbon group;

$R^6$ is selected from aliphatic hydrocarbon groups having at least 5 carbon atoms, aryl group-substituted alkyl groups, monocyclic or bicyclic alicyclic hydrocarbon groups, and aromatic hydrocarbon groups; and X is a hydrogen atom, halogen atom, or hydrocarbon group.

5. The method of production of ethylene-based polymer particles according to claim 1; wherein the homopolymerization of ethylene, or the copolymerization of ethylene with a linear or branched α-olefin having 3 to 20 carbon atoms, is performed in a multi-stage polymerization.

6. Ethylene-based polymer particles obtained by the production method according to claim 1; wherein an average particle diameter of the ethylene-based polymer particles is within a range greater than or equal to 10 nm and less than 3,000 nm.

7. A method of production of a stretch-molded article comprising forming a stretch-molded article from ethylene-based polymer particles obtained by the production method according to claim 1.

8. A method of production of a stretch-molded article according to claim 7 obtained by a solid-phase stretch-molding method.

9. A stretch-molded article obtained by the method according to claim 7.

* * * * *